(12) United States Patent
McAlister

(10) Patent No.: US 9,231,267 B2
(45) Date of Patent: Jan. 5, 2016

(54) SYSTEMS AND METHODS FOR SUSTAINABLE ECONOMIC DEVELOPMENT THROUGH INTEGRATED FULL SPECTRUM PRODUCTION OF RENEWABLE ENERGY

(75) Inventor: Roy E. McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 0 days.

(21) Appl. No.: 12/857,541

(22) Filed: Aug. 16, 2010

(65) Prior Publication Data

US 2011/0081586 A1 Apr. 7, 2011

Related U.S. Application Data

(63) Continuation-in-part of application No. 12/707,651, filed on Feb. 17, 2010, now Pat. No. 8,075,748, and a continuation-in-part of application No. PCT/US2010/024497, filed on Feb. 17, 2010, and a (Continued)

(51) Int. Cl.
*H01M 8/06* (2006.01)
*H01M 8/18* (2006.01)
(Continued)

(52) U.S. Cl.
CPC ............... *H01M 8/186* (2013.01); *C25B 1/00* (2013.01); *C25B 1/12* (2013.01); *C25B 3/00* (2013.01); *C25B 11/03* (2013.01); *C25B 13/02* (2013.01); *C25B 15/02* (2013.01); *F03D 9/007* (2013.01);
(Continued)

(58) Field of Classification Search
CPC .......... C25B 11/03; C25B 15/02; C25B 1/00; C25B 1/12; C25B 3/00; C25B 13/02; F03D 9/007; H01M 8/186; H01M 2250/407; H02J 15/00; H02J 3/382; H02J 3/383; H02J 3/386; H02J 2001/004; Y02E 10/763; Y02E 10/72; Y02E 60/528
USPC ........................................................ 429/422
See application file for complete search history.

(56) References Cited

U.S. PATENT DOCUMENTS 2,208,157 A 7/1940 Fritz
2,398,828 A * 4/1946 Gray .............................. 405/53

(Continued)

FOREIGN PATENT DOCUMENTS

CN 101306302 A 11/2008
DE 2934647 A1 3/1981

(Continued)

OTHER PUBLICATIONS

First Action Interview Office Action for U.S. Appl. No. 13/027,235; Applicant: McAlister Technologies, LLC.; Date of Mailing: Oct. 20, 2011. pp. 1-4.

(Continued)

*Primary Examiner* — Gary Harris
(74) *Attorney, Agent, or Firm* — Perkins Coie LLP

(57) ABSTRACT

In one embodiment of the present invention, a method for providing an energy supply using a renewable energy source is provided comprising: providing a first source of renewable energy, wherein the first source of renewable energy is intermittent or does not provide a sufficient amount of energy; providing energy from the first source of renewable energy to an electrolyzer to produce an energy carrier through electrolysis; selectably reversing the electrolyzer for use as a fuel cell; and providing the energy carrier to the electrolyzer for the production of energy.

21 Claims, 23 Drawing Sheets

Related U.S. Application Data continuation-in-part of application No. 12/707,653, filed on Feb. 17, 2010, now Pat. No. 8,172,990, application No. 12/857,541, which is a continuation-in-part of application No. PCT/US2010/024498, filed on Feb. 17, 2010, and a continuation-in-part of application No. 12/707,656, filed on Feb. 17, 2010, now Pat. No. 8,075,749, and a continuation-in-part of application No. PCT/US2010/024499, filed on Feb. 17, 2010.

(60) Provisional application No. 61/153,253, filed on Feb. 17, 2009, provisional application No. 61/237,476, filed on Aug. 27, 2009, provisional application No. 61/304,403, filed on Feb. 13, 2010.

(51) Int. Cl.

| | |
|---|---|
| *C25B 11/03* | (2006.01) |
| *C25B 13/02* | (2006.01) |
| *F03D 9/00* | (2006.01) |
| *H02J 15/00* | (2006.01) |
| *C25B 15/02* | (2006.01) |
| *C25B 1/00* | (2006.01) |
| *C25B 1/12* | (2006.01) |
| *C25B 3/00* | (2006.01) |
| *H02J 3/38* | (2006.01) |
| *H02J 1/00* | (2006.01) |

(52) U.S. Cl.
CPC ............... *H02J 3/382* (2013.01); *H02J 3/383* (2013.01); *H02J 3/386* (2013.01); *H02J 15/00* (2013.01); *H01M 2250/407* (2013.01); *H02J 2001/004* (2013.01); *Y02E 10/563* (2013.01); *Y02E 10/72* (2013.01); *Y02E 10/763* (2013.01); *Y02E 60/366* (2013.01); *Y02E 60/528* (2013.01); *Y02E 60/563* (2013.01); *Y02E 70/10* (2013.01); *Y02E 70/20* (2013.01); *Y02E 70/30* (2013.01)

(56) References Cited

U.S. PATENT DOCUMENTS

| | | | |
|---|---|---|---|
| 3,888,896 | A | 6/1975 | Espino et al. |
| 4,105,755 | A | 8/1978 | Darnell et al. |
| 4,124,481 | A | 11/1978 | Ramer |
| 4,172,506 | A | 10/1979 | Terry |
| 4,200,505 | A | 4/1980 | Day et al. |
| 4,319,635 | A | 3/1982 | Jones |
| 4,341,607 | A | 7/1982 | Tison |
| 4,341,608 | A | 7/1982 | St. John |
| 4,382,189 | A | 5/1983 | Wilson |
| 4,386,801 | A | 6/1983 | Chapman et al. |
| 4,389,288 | A | 6/1983 | Vaughan |
| 4,395,316 | A | 7/1983 | St. John |
| 4,437,954 | A | 3/1984 | Sammells |
| 4,455,045 | A | 6/1984 | Wheeler |
| 4,468,235 | A | 8/1984 | Hill |
| 4,601,508 | A | 7/1986 | Kerian |
| 4,611,847 | A | 9/1986 | Sullivan |
| 4,620,900 | A | 11/1986 | Kimura et al. |
| 4,736,111 | A | 4/1988 | Linden |
| 4,746,160 | A | 5/1988 | Wiesemeyer |
| 4,896,507 | A | 1/1990 | Hosford |
| 4,902,307 | A | 2/1990 | Gavalas et al. |
| 4,978,162 | A | 12/1990 | Labbe |
| 4,985,055 | A | 1/1991 | Thorne et al. |
| 5,024,818 | A | 6/1991 | Tibbetts et al. |
| 5,058,945 | A | 10/1991 | Elliott, Sr. et al. |
| 5,119,897 | A | 6/1992 | Moriwake |
| 5,132,007 | A | 7/1992 | Meyer et al. |
| 5,222,698 | A | 6/1993 | Nelson et al. |
| 5,259,870 | A | 11/1993 | Edlund |
| 5,280,990 | A | 1/1994 | Rinard |
| 5,323,061 | A | 6/1994 | Immler et al. |
| 5,343,699 | A | 9/1994 | McAlister |
| 5,407,245 | A | 4/1995 | Geropp |
| 5,498,059 | A | 3/1996 | Switlik |
| 5,560,443 | A | 10/1996 | DuBose |
| 5,617,504 | A | 4/1997 | Sciacca et al. |
| 5,662,389 | A | 9/1997 | Truglio et al. |
| 5,719,990 | A | 2/1998 | Yang |
| 5,806,553 | A | 9/1998 | Sidwell |
| 5,986,429 | A | 11/1999 | Mula, Jr. |
| 6,015,065 | A | 1/2000 | McAlister |
| 6,068,328 | A | 5/2000 | Gazdzinski |
| 6,081,183 | A | 6/2000 | Mading et al. |
| 6,083,377 | A | 7/2000 | Lin et al. |
| 6,090,266 | A | 7/2000 | Roychowdhury |
| 6,092,861 | A | 7/2000 | Whelan |
| 6,155,212 | A | 12/2000 | McAlister |
| 6,200,069 | B1 | 3/2001 | Miller |
| 6,216,599 | B1 | 4/2001 | Cavanagh |
| 6,220,193 | B1 | 4/2001 | Dilks |
| 6,309,010 | B1 | 10/2001 | Whitten |
| 6,378,932 | B1 | 4/2002 | Fasel et al. |
| 6,402,810 | B1 | 6/2002 | Mayer et al. |
| 6,409,252 | B1 | 6/2002 | Andrus |
| 6,446,597 | B1 | 9/2002 | McAlister |
| 6,468,684 | B1 | 10/2002 | Chisholm et al. |
| 6,500,313 | B2 | 12/2002 | Sherwood |
| 6,502,533 | B1 | 1/2003 | Meacham |
| 6,503,584 | B1 | 1/2003 | McAlister |
| 6,516,754 | B2 | 2/2003 | Chadwick |
| 6,525,431 | B1 | 2/2003 | Clucas et al. |
| 6,606,860 | B2 | 8/2003 | McFarland |
| 6,749,043 | B2 | 6/2004 | Brown et al. |
| 6,755,899 | B2 | 6/2004 | Nagai |
| 6,756,140 | B1 | 6/2004 | McAlister |
| 6,757,591 | B2 | 6/2004 | Kramer |
| 6,784,562 | B2 | 8/2004 | Gennesseaux |
| 6,838,782 | B2 | 1/2005 | Vu |
| 6,854,788 | B1 | 2/2005 | Graham |
| 6,897,575 | B1 | 5/2005 | Yu |
| 6,926,345 | B2 | 8/2005 | Ortega et al. |
| 6,979,049 | B2 | 12/2005 | Ortega et al. |
| 6,984,305 | B2 | 1/2006 | McAlister |
| 7,152,908 | B2 | 12/2006 | Shahbazi |
| 7,165,804 | B2 | 1/2007 | Shahbazi |
| 7,185,944 | B2 | 3/2007 | Shahbazi |
| 7,207,620 | B2 | 4/2007 | Cosgrove et al. |
| 7,210,467 | B2 | 5/2007 | Kweon et al. |
| 7,211,905 | B1 | 5/2007 | McDavid, Jr. |
| 7,237,827 | B2 | 7/2007 | Shahbazi |
| 7,243,980 | B2 | 7/2007 | Vala |
| 7,254,944 | B1 | 8/2007 | Goetzinger et al. |
| 7,427,189 | B2 | 9/2008 | Eyb |
| 7,592,383 | B2 | 9/2009 | Fukui |
| 7,632,338 | B2 | 12/2009 | Cipollini |
| 7,797,183 | B2 | 9/2010 | Dias et al. |
| 7,827,974 | B2 | 11/2010 | Beckmann |
| 7,931,784 | B2 | 4/2011 | Medoff |
| 8,165,968 | B2 | 4/2012 | Ramesh et al. |
| 8,187,549 | B2 | 5/2012 | McAlister |
| 8,187,550 | B2 | 5/2012 | McAlister |
| 8,285,635 | B2 | 10/2012 | Rhodes, III |
| 8,313,556 | B2 | 11/2012 | McAlister |
| 8,595,020 | B2 | 11/2013 | Marino |
| 2001/0035093 | A1 | 11/2001 | Yokota |
| 2002/0007845 | A1 | 1/2002 | Collette et al. |
| 2003/0000213 | A1* | 1/2003 | Christensen et al. ............ 60/670 |
| 2003/0012985 | A1* | 1/2003 | McAlister ...................... 429/12 |
| 2003/0018487 | A1 | 1/2003 | Young et al. |
| 2003/0039608 | A1 | 2/2003 | Shah et al. |
| 2003/0062270 | A1 | 4/2003 | McAlister |
| 2004/0089439 | A1 | 5/2004 | Treverton et al. |
| 2004/0124095 | A1* | 7/2004 | Fujimura et al. ............. 205/629 |
| 2004/0126632 | A1 | 7/2004 | Pearson |
| 2005/0003247 | A1 | 1/2005 | Pham |
| 2005/0015287 | A1 | 1/2005 | Beaver |
| 2005/0048334 | A1* | 3/2005 | Sridhar et al. ................ 429/21 |
| 2005/0109394 | A1 | 5/2005 | Anderson |

(56) References Cited

U.S. PATENT DOCUMENTS

| | | | |
|---|---|---|---|
| 2006/0005738 A1 | 1/2006 | Kumar | |
| 2006/0005739 A1 | 1/2006 | Kumar | |
| 2006/0011472 A1* | 1/2006 | Flick | 204/276 |
| 2006/0048770 A1 | 3/2006 | Meksvanh et al. | |
| 2006/0049063 A1 | 3/2006 | Murphy et al. | |
| 2006/0100897 A1 | 5/2006 | Halloran et al. | |
| 2006/0162554 A1 | 7/2006 | Kelley | |
| 2006/0257310 A1 | 11/2006 | Tada et al. | |
| 2006/0286518 A1 | 12/2006 | Yoder | |
| 2007/0138006 A1 | 6/2007 | Oakes et al. | |
| 2007/0220887 A1* | 9/2007 | Monostory et al. | 60/641.2 |
| 2008/0050800 A1 | 2/2008 | McKeeman et al. | |
| 2008/0078675 A1 | 4/2008 | Kawahara et al. | |
| 2008/0088135 A1 | 4/2008 | Novo Vidal | |
| 2008/0102329 A1* | 5/2008 | Hollinger | 429/17 |
| 2008/0115415 A1 | 5/2008 | Agrawal et al. | |
| 2008/0138675 A1 | 6/2008 | Jang et al. | |
| 2008/0245672 A1 | 10/2008 | Little et al. | |
| 2008/0303348 A1 | 12/2008 | Witters | |
| 2008/0318092 A1 | 12/2008 | Sridhar et al. | |
| 2009/0016948 A1 | 1/2009 | Young | |
| 2009/0169452 A1 | 7/2009 | Constantz et al. | |
| 2009/0215137 A1 | 8/2009 | Hawkins et al. | |
| 2009/0217584 A1 | 9/2009 | Raman et al. | |
| 2009/0222307 A1 | 9/2009 | Beaver | |
| 2009/0235587 A1 | 9/2009 | Hawkes et al. | |
| 2009/0263540 A1 | 10/2009 | Allen et al. | |
| 2009/0266075 A1 | 10/2009 | Westmeier et al. | |
| 2009/0276265 A1 | 11/2009 | Ahmed et al. | |
| 2010/0101231 A1 | 4/2010 | Westmeier | |
| 2010/0107994 A1 | 5/2010 | Moriarty et al. | |
| 2010/0306002 A1 | 12/2010 | Dias et al. | |
| 2011/0041784 A1 | 2/2011 | McAlister | |
| 2011/0061295 A1 | 3/2011 | McAlister | |
| 2011/0070510 A1 | 3/2011 | McAlister | |
| 2011/0198211 A1 | 8/2011 | McAlister | |
| 2011/0200897 A1 | 8/2011 | McAlister | |
| 2011/0230573 A1 | 9/2011 | McAlister | |
| 2012/0271677 A1 | 10/2012 | Rhodes, III | |
| 2012/0323619 A1 | 12/2012 | Risz et al. | |

FOREIGN PATENT DOCUMENTS

| | | |
|---|---|---|
| DE | 3014357 A1 | 10/1981 |
| DE | 3016410 A1 | 11/1981 |
| DE | 3044666 A1 | 7/1982 |
| EP | 0485922 A1 | 5/1992 |
| EP | 2103682 | 9/2009 |
| GB | 2 248 230 A | 1/1992 |
| GB | 2387641 A | 10/2003 |
| JP | 04-076211 | 3/1992 |
| JP | 05-223268 | 8/1993 |
| JP | 06147098 | 5/1994 |
| JP | 07-113567 | 5/1995 |
| JP | 2000-205044 | 7/2000 |
| JP | 2000-297700 | 10/2000 |
| JP | 2002-119822 A | 4/2002 |
| JP | 2006-128006 | 5/2006 |
| JP | 4357969 B2 | 11/2009 |
| KR | 10-0808736 | 2/2008 |
| KR | 10-090119098 | 11/2009 |
| WO | WO-01-56938 | 8/2001 |
| WO | WO-2006119118 A2 | 11/2006 |
| WO | WO-2006-136860 | 12/2006 |
| WO | WO-2008-115933 | 9/2008 |

OTHER PUBLICATIONS

International Search Report and Written Opinion for Application No. PCT/US11/024813; Applicant: McAlister Technologies, LLC; Date of Mailing: Nov. 30, 2011. pp. 1-12.

Non-Final Office Action for U.S. Appl. No. 12/857,554; Applicant: McAlister Technologies, LLC.; Date of Mailing: Nov. 21, 2011. pp. 1-30.

"Features." Accessed: Aug. 12, 2010. <http://www.pre.nl/simapro/simapro_lca_software.htm>. pp. 1-7.

"GaBi Software: Results and Interpretation." Accessed: Aug. 12, 2010. <http://www.gabi-software.com/software/gabi-4/results-and-interpretation/>. p. 1.

California Clean Air Conversions, LLC. Advanced Green Innovations, LLC. "Meeting California's 2010 Vision: Renewable Hydrogen Production and Fleet Conversion" 2010. p. 1.

Fernando, Vincent. "Exxon: Here's Why We Just Spent $41 Billlion on Natural Gas." Business Insider. Published: Dec. 14, 2009. Web. <http://www.businessinsider.com/exxon-heres-why-we-just-spent-41-billion-on-natural-gas-2009-12>. pp. 1-8.

Holdren, John P. "Meeting the Climate-Change Challenge." Lecture Slides. The John H. Chafee Memorial Lecture. Washington DC. Jan. 17, 2008. pp. 1-52.

International Maritime Organization. "Prevention of Air Pollution from Ships." Marine Environment Protection Committee. 59th Session, Agenda Item 4. Apr. 9, 2009. pp. 1-289.

International Search Report and Written Opinion for Application No. PCT/US2010/002260; Applicant: McAlister Technologies, LLC.; Date of Mailing: Apr. 28, 2011. pp. 1-8.

International Search Report and Written Opinion for Application No. PCT/US2010/045664; Applicant: McAlister Technologies, LLC.; Date of Mailing: Apr. 15, 2011. pp. 1-8.

International Search Report and Written Opinion for Application No. PCT/US2010/045674; Applicant: McAlister Technologies, LLC.; Date of Mailing: Apr. 29, 2011. pp. 1-9.

McAlister, Roy. "Maximizing Renewable Energy Efficiencies: A Full Spectrum Approach." Feb. 2009. pp. 1-21.

McAlister, Roy. "Sustainable Hydrogen Hyway." California Clean Air Conversions, LLC. Advanced Green Innovations, LLC. 2010. pp. 1-6.

Murray, Don. "World Energy Park." Starpoint Solar. Presentation. Accessed: Jun. 4, 2009. pp. 1-33.

Zhang et al., "Economic Modelling Approaches to Cost Estimates for the Control of Carbon Dioxide Emissions," Energy Economics, 1998, vol. 20, pp. 101-120.

Environmentally Smart Accounting Using Total Cost Assessment to advance Pollution Prevention, http://infohouse.p2ric.org/ref/31/30606.pdf.

Full Cost Accounting; "A Course Module on Incorporating Environmental and Social Costs into Traditional Business Accounting Systems," http://gdi.ce.cmu.edu/gd/education/FCA_Module_98.pdf.

Management's Discussion and Analysis—Yamana Gold for the Year Ended Dec. 31, 2009, http://www.yamana.com/Theme/Yamana/files/Yamana%20Gold%20Inc%202009%20MD&A%20and%20FS.pdf.

Repurposing Equipment; Cutting Costs, http://www.businessknowledgesource.com/manufacturing/repurposing_equipment_cutting_costs_028706.html.

Muradov et al, "From hydrocarbon to hydrogen-carbon to hydrogen economy", International Journal of Hydrogen Energy, vol. 30, 2005, pp. 225-237.

Turner, John A., "A Realizable Renewable Energy Future", Science, vol. 285, 1999, pp. 687-689.

Environmental Input-Output Assessment of Integrated Second Generation Biofuel Production in Fenno-Scandinavia.

* cited by examiner

SYSTEMS AND METHODS FOR SUSTAINABLE ECONOMIC DEVELOPMENT THROUGH INTEGRATED FULL SPECTRUM PRODUCTION OF RENEWABLE ENERGY

CROSS REFERENCE TO RELATED APPLICATIONS

The present application claims priority to and the benefit of U.S. Provisional Application No. 61/304,403, filed Feb. 13, 2010 and titled FULL SPECTRUM ENERGY AND RESOURCE INDEPENDENCE. The present application is a continuation-in-part of each of the following applications: U.S. patent application Ser. No. 12/707,651, filed Feb. 17, 2010, now U.S. Pat. No. 8,075,748 and titled ELECTROLYTIC CELL AND METHOD OF USE THEREOF; PCT Application No. PCT/US10/24497, filed Feb. 17, 2010 and titled ELECTROLYTIC CELL AND METHOD OF USE THEREOF; U.S. patent application Ser. No. 12/707,653, filed Feb. 17, 2010, now U.S. Pat. No. 8,172,990 and titled APPARATUS AND METHOD FOR CONTROLLING NUCLEATION DURING ELECTROLYSIS; PCT Application No. PCT/US10/24498, filed Feb. 17, 2010 and titled APPARATUS AND METHOD FOR CONTROLLING NUCLEATION DURING ELECTROLYSIS; U.S. patent application Ser. No. 12/707,656, filed Feb. 17, 2010, now U.S. Pat. No. 8,075,749 and titled APPARATUS AND METHOD FOR GAS CAPTURE DURING ELECTROLYSIS; and PCT Application No. PCT/US10/24499, filed Feb. 17, 2010 and titled APPARATUS AND METHOD FOR CONTROLLING NUCLEATION DURING ELECTROLYSIS; each of which claims priority to and the benefit of the following applications: U.S. Provisional Patent Application No. 61/153,253, filed Feb. 17, 2009 and titled FULL SPECTRUM ENERGY; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. Each of these applications is incorporated by reference in its entirety.

BACKGROUND

Renewable resources for producing electricity are often intermittent. Solar energy is a daytime event and the daytime solar-energy-concentration potential varies seasonally. Wind energy is highly variable. Falling water varies seasonally and is subject to extended drought. Biomass is seasonally variant and subject to droughts. Dwellings have greatly varying demands including daily, seasonal, and occasional energy consumption rates. Throughout the world, energy that could be delivered by hydroelectric plants, wind farms, biomass conversion and solar collectors is neglected or wasted because of the lack of a practical way to save energy or electricity until it is needed. Demand by a growing world population for energy has grown to the point of requiring more oil and other fossil resources than can be produced. Cities suffer from smog and global climate changes caused by the combustion of fossil fuels.

Also, burgeoning demands have developed for hydrogen, oxygen, carbon, and other products that can be provided by thermochemistry or electrolytic dissociation of feedstocks such as water, biomass wastes, or organic acids derived from biowaste. For example, the global market for hydrogen is more than $40 billion, and includes ammonia production, refineries, chemical manufacturing and food processing.

Electro-chemical production of fuels, metals, non-metals, and other valuable chemicals has been limited by expensive electricity, low electrolyzer efficiency, high maintenance costs, and cumbersome requirements for energy intensive operations such as compressive pumping of produced gases to desired transmission, storage, and application pressures. Efforts to provide technology for reducing these problems are noted and incorporated hereby in publications such as "Hydrogen Production From Water By Means of Chemical Cycles," by Glandt, Eduardo D., and Myers, Allan L., Department of Chemical and Biochemical Engineering, University of Pennsylvania, Philadelphia, Pa. 19174; Industrial Engineering Chemical Process Development, Vol. 15, No. 1, 1976; "Hydrogen As A Future Fuel, by Gregory, D.P., Institute of Gas Technology; and "Adsorption Science and Technology": Proceedings of the Second Pacific Basin Conference on Adsorption Science and Technology: Brisbane, Australia, 14-18 May 2000, By D. Do Duong, Duong D. Do, Contributor Duong D. Do, Published by World Scientific, 2000; ISBN 9810242638, 9789810242633.

Electrolyzers that allow hydrogen to mix with oxygen present the potential hazard of spontaneous fire or explosion. Efforts including low and high pressure electrolyzers that utilize expensive semi-permeable membrane separation of the gas production electrodes fail to provide cost-effective production of hydrogen and are prone to degradation and failure due to poisoning by impurities. Even in instances that membrane separation is utilized, the potential danger exists for membrane rupture and fire or explosion due to mixing of high-pressure oxygen and hydrogen.

Some commercial electrolyzers use expensive porous electrodes between which is an electrolytic proton exchange membrane (PEM) that only conducts hydrogen ions. (See Proton Energy Company and the Electrolyzer Company of Canada.) This limits the electrode efficiency because of polarization losses, gas accumulation, and reduction of available electrode area for the dissociation of water that can reach the interface of the electrodes and PEM electrolyte. Along with the limited electrode efficiency are other difficult problems including membrane ruptures due to the pressure difference between the oxygen and hydrogen outlets, membrane poisoning due to impurities in the make-up water, irreversible membrane degradation due to contaminants or slight overheating of the membrane, membrane degradation or rupture if the membrane is allowed to dry out while not in service, and degradation of electrodes at the membrane interface due to corrosion by one or more inducements such as concentration cell formation, galvanic cells between catalysts and bulk electrode material, and ground loops. Layering of electrode and PEM materials provide built in stagnation of the reactants or products of the reaction to cause inefficient operation. PEM electrochemical cells require expensive membrane material, surfactants, and catalysts. PEM cells are easily poisoned, overheated, flooded or dried out and pose operational hazards due to membrane leakage or rupture.

In addition to inefficiencies, problems with such systems include parasitic losses, expensive electrodes or catalysts and membranes, low energy conversion efficiency, expensive maintenance, and high operating costs. Compressors or more expensive membrane systems are situationally required to pressurize hydrogen and oxygen and other products of electrolysis. Corollaries of the last mentioned problem are unacceptable maintenance requirements, high repair expenses, and substantial decommissioning costs.

It is therefore an object of some embodiments of the present invention to provide systems and methods for sustainable economic development through integrated full spectrum production of renewable energy, which can include the use of an electrochemical or electrolytic cell, and a method of use thereof, for separated production of gases, including pressurized hydrogen and oxygen, that tolerates impurities and products of operation and that is reversible to address one or more of the problems with current methods set forth above.

SUMMARY

In one embodiment of the present invention, a method for providing an energy supply using a renewable energy source is provided comprising: providing a first source of renewable energy, wherein the first source of renewable energy is intermittent or does not provide a sufficient amount of energy; providing energy from the first source of renewable energy to an electrolyzer to produce an energy carrier through electrolysis; selectably reversing the electrolyzer for use as a fuel cell; and providing the energy carrier to the electrolyzer for the production of energy.

In another embodiment, a system for providing a substantially continuous energy supply using renewable energy resources is provided comprising: a first source of renewable energy; an electrolyzer coupled to the first source of renewable energy for producing an energy carrier, wherein the electrolyzer is configured for selectably reversible operation as a fuel cell using the energy carrier as a fuel; a energy carrier storage coupled to the electrolyzer for receiving the energy carrier from the electrolyzer or providing the energy carrier to the electrolyzer; and an energy storage coupled to the first source of renewable energy and the electrolyzer for selectively receiving energy from the first source of renewable energy and the electrolyzer and for selective providing energy from the first source of renewable energy and the electrolyzer.

In yet another embodiment, a system for providing a substantially continuous energy supply using renewable energy resources is provided comprising: a first source of renewable energy; an electrolyzer coupled to the first source of renewable energy for producing methane, wherein the electrolyzer is configured for selectably reversible operation as a fuel cell; a methane storage coupled to the electrolyzer for receiving the methane from the electrolyzer or providing the methane to the electrolyzer; and an energy storage coupled to the first source of renewable energy and the electrolyzer for selectively receiving energy from the first source of renewable energy and the electrolyzer and for selective providing energy from the first source of renewable energy and the electrolyzer.

Other features and advantages of the present invention will become apparent from the following detailed description. It should be understood, however, that the detailed description and the specific examples, while indicating the preferred embodiments of the present invention, are given by way of illustration only, since various changes and modifications within the spirit and scope of the present invention will become apparent to those skilled in the art from this detailed description.

DETAILED DESCRIPTION

The present application incorporates by reference in its entirety the subject matter of U.S. Provisional Patent Application No. 60/626,021, filed Nov. 9, 2004 and titled MULTI-FUEL STORAGE, METERING AND IGNITION SYSTEM. The present application incorporates by reference in their entirety the subject matter of each of the following U.S. Patent Applications, filed concurrently herewith on Aug. 16, 2010 and titled: METHODS AND APPARATUSES FOR DETECTION OF PROPERTIES OF FLUID CONVEYANCE SYSTEMS (U.S. application Ser. No. 12/806,634, now U.S. Pat. No. 8,441,361); COMPREHENSIVE COST MODELING OF AUTOGENOUS SYSTEMS AND PROCESSES FOR THE PRODUCTION OF ENERGY, MATERIAL RESOURCES AND NUTRIENT REGIMES (U.S. Provisional Application No. 61/401,699); ELECTROLYTIC CELL AND METHOD OF USE THEREOF (U.S. application Ser. No. 12/806,633, now U.S. Pat. No. 8,075,750); SUSTAINABLE ECONOMIC DEVELOPMENT THROUGH INTEGRATED PRODUCTION OF RENEWABLE ENERGY, MATERIALS RESOURCES, AND NUTRIENT REGIMES (U.S. application Ser. No. 12/857,553, now U.S. Pat. No. 8,940,265); SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL (U.S. application Ser. No. 12/857,554, now U.S. Pat. No. 8,808,529); INCREASING THE EFFICIENCY OF SUPPLEMENTED OCEAN THERMAL ENERGY CONVERSION (SOTEC) SYSTEMS (U.S. application Ser. No. 12/857,546, now U.S. Pat. No. 8,991,182); GAS HYDRATE CONVERSION SYSTEM FOR HARVESTING HYDROCARBON HYDRATE DEPOSITS (U.S. application Ser. No. 12/857,228, now U.S. Pat. No. 8,623,107); APPARATUSES AND METHODS FOR STORING AND/OR FILTERING A SUBSTANCE (U.S. application Ser. No. 12/857,515, now U.S. Pat. No. 8,147,599); ENERGY SYSTEM FOR DWELLING SUPPORT (U.S. application Ser. No. 12/857,502, now U.S. Pat. No. 9,097,152); ENERGY CONVERSION ASSEMBLIES AND ASSOCIATED METHODS OF USE AND MANUFACTURE (U.S. application Ser. No. 12/857,433); and INTERNALLY REINFORCED STRUCTURAL COMPOSITES AND ASSOCIATED METHODS OF MANUFACTURING (U.S. application Ser. No. 12/857,461).

In order to fully understand the manner in which the above-recited details and other advantages and objects according to the invention are obtained, a more detailed description of the invention will be rendered by reference to specific embodiments thereof.

Figure 1A:
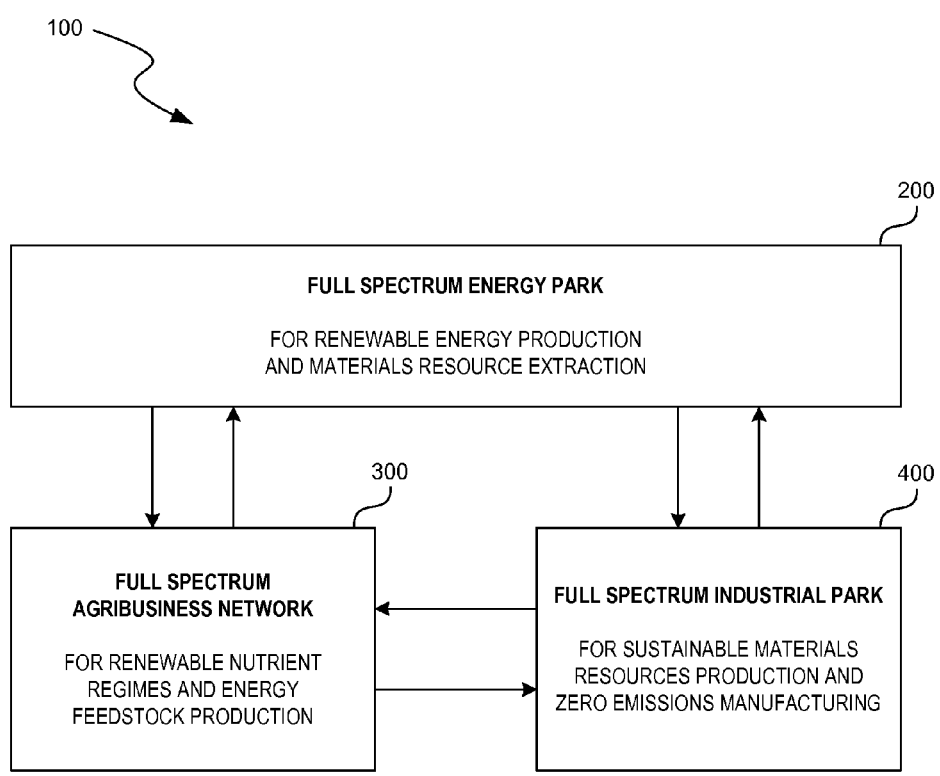
FIG. 1A is a block diagram illustrating a system of integrated energy, agribusiness and industrial sustainable economic development in accordance with aspects of the disclosure.

FIG. 1A shows the Full Spectrum Integrated Production System 100, composed of three interrelated systems, that include The Full Spectrum Energy Park 200 for Renewable Energy Production and Materials Resource Extraction, The Full Spectrum Agribusiness Network 300 for Renewable Nutrient Regimes (human, animal and plant nutrition) and Energy Feedstock Production (biomass, biowaste and biofuel), and Full Spectrum Industrial Park 400 for Sustainable Materials Resource Production and Zero Emissions Manufacturing.

FIG. 1A shows system 100 as the integration of systems 200, 300, and 400 to enable exchange of energy, materials and information among these systems. System 100 integration, and particularly methods within system 200, utilizes the thermodynamic properties of multiple interrelated heat engines thermally coupled to form a thermodynamic whole-system in order to function effectively as a very large heat engine, which is able to achieve increased beneficial production capacity and efficiency. Within system 100, system 200 is particularly dedicated to achieve synergistic linkage among solar thermal, geothermal, ocean thermal, and engine thermal sources so as to increase the total available renewable energy output of the particular site location, and to provide energy and extracted material resources to systems 300 and 400.

The Full Spectrum Energy Park 200 is thermally coupled to function effectively as a single large heat engine, whose systems and subsystems are interrelated to establish energy cascades, using working fluids that are heated in two or more stages. The total available renewable energy output of system 200 is increased by systematically moving working fluids between solar, geologic, engine, and other thermal sources to achieve a cascade effect to optimize the thermodynamic properties (such as temperature, pressure, purity, phase shift, and efficiency of energy conversion) of a working fluid. Energy output of one stage is re-invested in key processes of another stage so as to operate in a regenerative or autogenous manner with increased efficiency and economy of operation.

Full Spectrum Energy Park 200 functions include: harvesting, conversion and storage of kinetic, thermal, and radiant energy forms among renewable energy sources such as solar, wind, moving water, geothermal, biomass, and internal combustion engines so as to establish autogenous or regenerative energy cascades among the systems to create aggregating and synergistic benefits that cannot be achieved by harvesting, conversion and storage of any one renewal energy source alone. Autogenous or regenerative energy methods are practiced in systems 200, 300, and 400. Further, system 200 is directed to materials resource extraction of numerous chemicals for use in systems 300 and 400. For example, thermochemical regeneration is used as a means of extracting carbon as a raw material (extraction can take place in systems 200, 300 and 400) for subsequent manufacturing production of durable goods at system 400. In another example, thermochemical regeneration can also be used as a means of extracting nitrogen and trace minerals for subsequent manufacturing production of plant fertilizers for use in system 300. Further, system 200 is directed to biowaste, biomass and biofuel conversion, typically to achieve bio-methane gas and/or hydrogen gas storage, transport and use on-demand at systems 200, 300 and 400 as fuels for internal combustion engines and/or fuel cells for electrical power generation and/or transportation.

The manipulation of solar thermal, geothermal, ocean thermal, and engine thermal sources provides a highly adaptive integrated platform for installations of system 100 at various climate regions of location, and installations that are both land-based and ocean-based. Engineering for increased location adaptability thereby significantly increases the total availability of renewable energy harvesting, and thus provides an economically viable solution for local, regional, national and global economies.

Food production at system 300 can be installed on both land and ocean sites. Crop farms, cattle farms, ranches, industrial production facilities for pork and chicken, fresh water fisheries, ocean fisheries, dairy farms, and so on can be linked to system 200 as consumers of the energy produced in system 200, but in turn produce waste by-products which are diverted to system 200 for conversion to renewable energy and renewable materials resources. Further, system 300 is directed to increased Energy Feedstock Production for such biofuel crops, such as algae, switch grass and other crops to increase the viability of photosynthesis-based energy harvesting. Method and apparatus for water production, purification, and conservation are used in each of the systems of production 200, 300 and 400. However, these are important components of system 300 in order to satisfy requirements for large quantities of water in food production and to overcome the documented problem of unsustainability due to waste and fouling of water by conventional food production practices.

System integration increases capacity for "sustainability"—defined as increased production of energy, material resources and nutrient regimes using renewable methods to avoid depletion of natural resources and reduce or eliminate destructive environmental impact such as pollution and toxic emissions as by-products of production. Sustainability requires methods of production for energy, materials, and food that are viable for the long-term wellbeing of future generations, not just the immediate short-term benefit of current consumers.

System integration enables the increase in production capacity for "economic scalability"—defined as significant increase of production of energy, materials, and food that is achieved by the ability to replicate numerous aggregative installation sites, and to increase the number of available site locations by greatly improved adaptability to the diverse climate regions (i.e., adaptively harvesting renewable energy by accommodating the varied resource characteristics of temperate, tropical and arctic climates). Such economic scalability is required to increase the earth's carrying capacity to sustain continued rapid human population growth, and rapidly increasing energy requirements of developing nations. For successful use, such production methods and locations must be immediately usable, and must present an economically viable alternative to current production means of energy, materials, and food production as compared to using conventional fossil fuel and/or nuclear energy sources.

System integration further enables a zero-emissions and zero-waste method of energy production 200, materials production 400, and food production 300, wherein: organic waste generated in the system 300 that would otherwise be burned, buried, or dumped in landfills, aquifers, streams, oceans, or emitted into the atmosphere as pollutants is instead systematically channeled into biomass, biowaste, and biofuel conversion systems as found in system 200; energy and material resource extraction in system 200 is passed to system 400 for production of durable goods; energy and material resource extraction in system 200 is also passed to system 300 for production of nutrient regimes for humans, animals and plant life on land and ocean.

System integration establishes a single unit of economic production that intentionally links energy production with food production and materials resource production in such a way that these function as an interdependent whole.

The Full Spectrum Integrated Production System is thus suitable for installation in locations or communities where no comparable renewable energy infrastructure currently exists, or where manufacturing capabilities are deficient and unemployment is the norm, or where food production is deficient and poverty and malnourishment is the norm. The goal of introducing this unified method of economic production is to enable increases in gross domestic product (GDP) with the increased quality of life that accompanies GDP, and systematic job creation with the improved quality of life that accompanies meaningful employment.

Furthermore, system integration establishes a single unit of economic production that intentionally links waste management with energy conversion practices so that they function as an interdependent whole to interrupt conventional waste practices of burn, bury, and dump that lead to pollution and environmental degradation.

The Full Spectrum Integrated Production System introduces use of sustainable waste-to-energy conversion as an integrated practice across the whole system. The goal of this integrated system is to protect the natural environment, conserve finite natural resources, reduce communicable disease, and reduce land, water and air pollution (including reduction in greenhouse gas drivers of climate change, such as methane and $CO_2$).

The Full Spectrum Integrated Production System 100 provides a means to achieve an "industrial ecology," in which the human-systems production environment mimics natural ecosystems: where energy and materials flow among systems and wastes become inputs for new processes in a closed-loop manner, yet the whole system is open to the renewable, sustainable energy provided by sun (solar thermal), earth (geothermal), ocean (ocean thermal), and biomass conversion (engine thermal) systems.

Figure 1B:
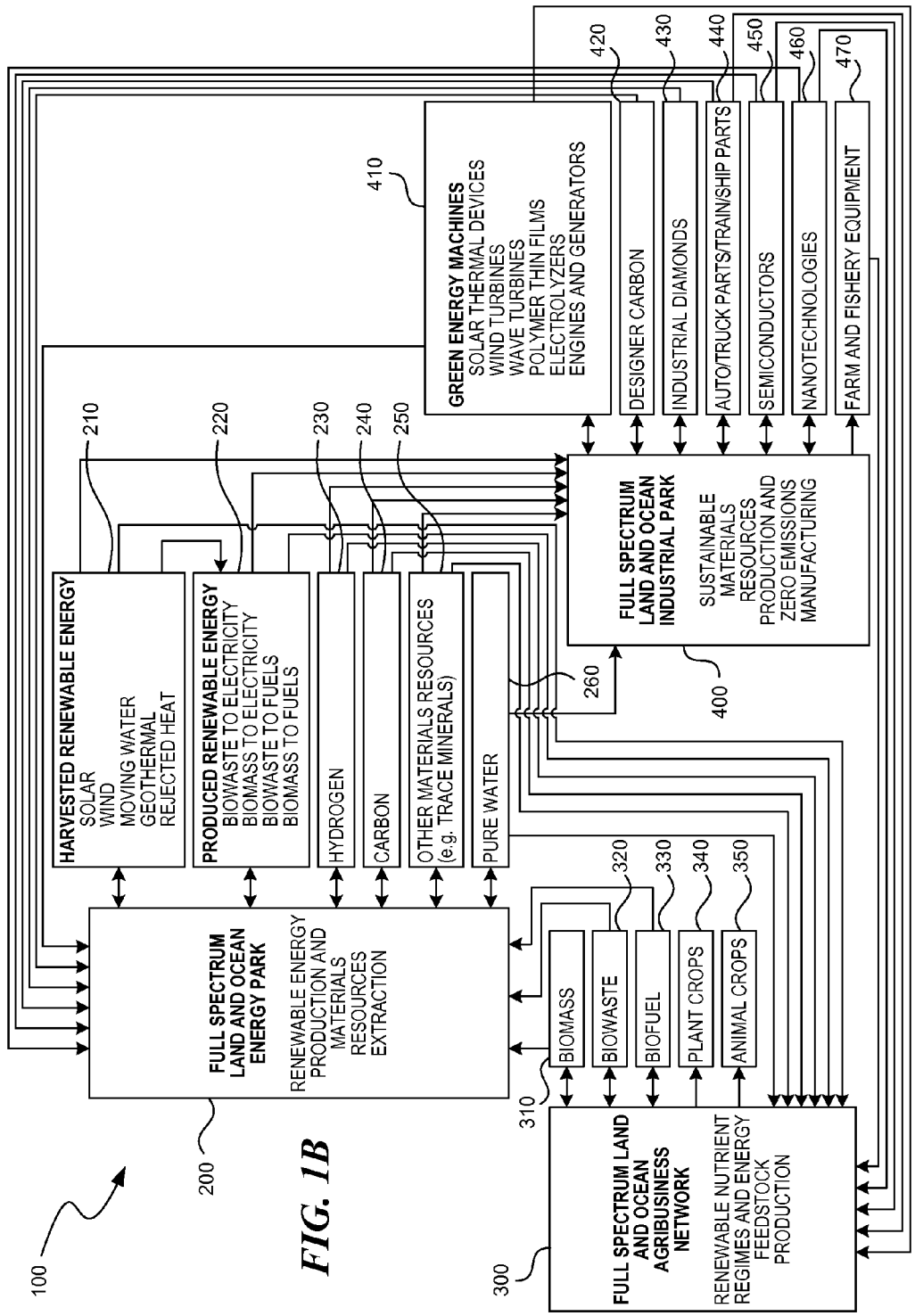
FIG. 1B is a block diagram illustrating a system of sustainable economic development in accordance with aspects of the disclosure.

FIG. 1B is a block diagram illustrating a Full Spectrum Integrated Production System 100 of sustainable economic development, which includes the production of energy (e.g., electricity and fuels) concurrent with the production of nutrient regimes (e.g., products for human, animal, or plant nutrition) and the production of materials resources (e.g., hydrogen and carbon). The system 100 is comprised of integrated and interdependent sub-systems with adaptive control of autogenous cascading energy conversions that captures and reinvests some or all of the energy, substances and/or byproducts of each sub-system. Thus, the continued operation of the system 100 is sustained with the introduction of minimal or no external energy or materials resources. The system 100 is an example of industrial ecology which facilitates sustainable economic development, such as the harnessing of renewable energy, the production of foods, and the production of materials resources, which is greater production of energy, foods, and materials resources than is achievable using conventional techniques, among other benefits.

A Full Spectrum Energy Park 200 coordinates methods of capturing energy from renewable sources 210 (e.g., solar, wind, moving water, geothermal, rejected heat) with methods of producing energy from renewable feedstocks 220 (e.g., biowaste 320, biomass 310) and methods of producing materials resources (e.g., hydrogen 230, carbon 240, other materials resources such as trace minerals 250, pure water 260). Energy is stored, retrieved, and transported using methods of adaptive control of autogenous cascading energy conversions that generate a multiplier effect in the production of energy. During the energy harvesting and production processes, materials resources (e.g., hydrogen and carbon) are extracted from biowaste and biomass feedstocks used in the production of renewable energy. The Full Spectrum Energy Park 200 stores, retrieves, transports, monitors, and controls said energy and said resources to achieve improved efficiencies in the production of energy, materials resources, and nutrient regimes.

Some of the produced energy 210, 220 is provided to the Full Spectrum Agribusiness Network 300. Some of the produced energy 210, 220 is provided to the Full Spectrum Industrial Park 400. Some of the produced energy 210, 220 is reinvested in the Full Spectrum Energy Park 200. Some of the produced energy 201, 220 is provided to external recipients and/or added to the national electricity grid and/or the national gas pipeline.

A Full Spectrum Agribusiness Network 300 receives renewable energy produced by the Full Spectrum Energy Park 200 to power the functions of farming, animal husbandry, and fishery sub-systems. This includes renewable fuels for farm equipment, vehicles, boats and ships, and electricity for light, heat, mechanical equipment, and so on.

The Full Spectrum Agribusiness Network 300 receives materials resources and byproducts such as other materials resources (e.g., trace minerals 250) and pure water 260 produced by the Full Spectrum Energy Park 200 to enrich nutrient regimes in farming, animal husbandry, and fishery sub-systems and to produce increased efficiencies in the production of plant crops 340 and animal crops 350.

The Full Spectrum Agribusiness Network 300 harvests energy feedstock and supplies it to the Full Spectrum Energy Park 200 for use in the production of renewable energy. Suitable feedstock includes biomass 310 (e.g., crop slash), biowaste 320 (e.g., sewage, agricultural waste water, meat packing wastes, effluent from fisheries), biofuel stock 330 (e.g., algae, switchgrass), and so on.

A Full Spectrum Industrial Park 400 ruses renewable energy produced by the Full Spectrum Energy Park 200 to power the functions of sustainable materials resources production and zero-emissions manufacturing. This includes renewable fuels for internal combustion engines (e.g., stationary engines, vehicles) and electricity for light, heat, mechanical equipment, and so on.

The Full Spectrum Industrial Park 400 invests materials resources 230, 240 and byproducts 250 received from the Full Spectrum Energy Park 200 to produce additional materials resources (e.g., designer carbon 420 and industrial diamonds 430).

The Full Spectrum Industrial Park 400 uses materials resources and byproducts received from the Full Spectrum Energy Park 200 to manufacture products such as carbon-based green energy machines 410, including solar thermal devices 410, wind turbines 410, water turbines 410, electrolyzers 410, internal combustion engines and generators 410, automobile, ship and truck parts 440, semiconductors 450, nanotechnologies 460, farm and fishery equipment 470, and so on.

The Full Spectrum Industrial Park 400 provides some or all of these products and byproducts to the Full Spectrum Energy Park 200 and the Full Spectrum Agribusiness Network 300.

The Full Spectrum Energy Park 200 uses solar thermal devices 410, wind turbines 410, water turbines 410, electrolyzers 410, internal combustion engines and generators 410, and so on that are produced and provided by the Full Spectrum Industrial Park 400 to produce renewable energy.

The Full Spectrum Agribusiness Network 300 uses internal combustion engines and generators 410, farm and fishery equipment 470 and other devices produced and provided by the Full Spectrum Industrial Park 400 to produce nutrient regimes.

The energy produced by the Full Spectrum Integrated Production System 100 provides power for all the sub-systems, including reinvesting energy to drive the further production of renewable energy. Concurrently, some or all of the products and byproducts produced in the system 100 are invested in the functions of all the sub-systems. At the same time, the wastes produced by the system 100 are captured and used as feedstock for the functions of all the sub-systems. The integrated and interdependent sub-systems use adaptive controls to manage autogenous cascading energy conversions and autogenous regeneration of materials resources. Thus, the system constantly reinvests renewable energy, sustainable materials resources, and other byproducts into the different sources and processes of the sub-systems (Energy Park, Agribusiness Network, Industrial Park). In this manner, the system 100 harnesses larger amounts of the supplied energy and resource from various resources within the system than is achievable with conventional means. This industrial symbiosis generates a multiplying effect on the amounts of various resources and energy harvested from renewable feedstock and byproduct sources within the system, adding value, reducing costs, and improving the environment, among other benefits.

Figure 1C:
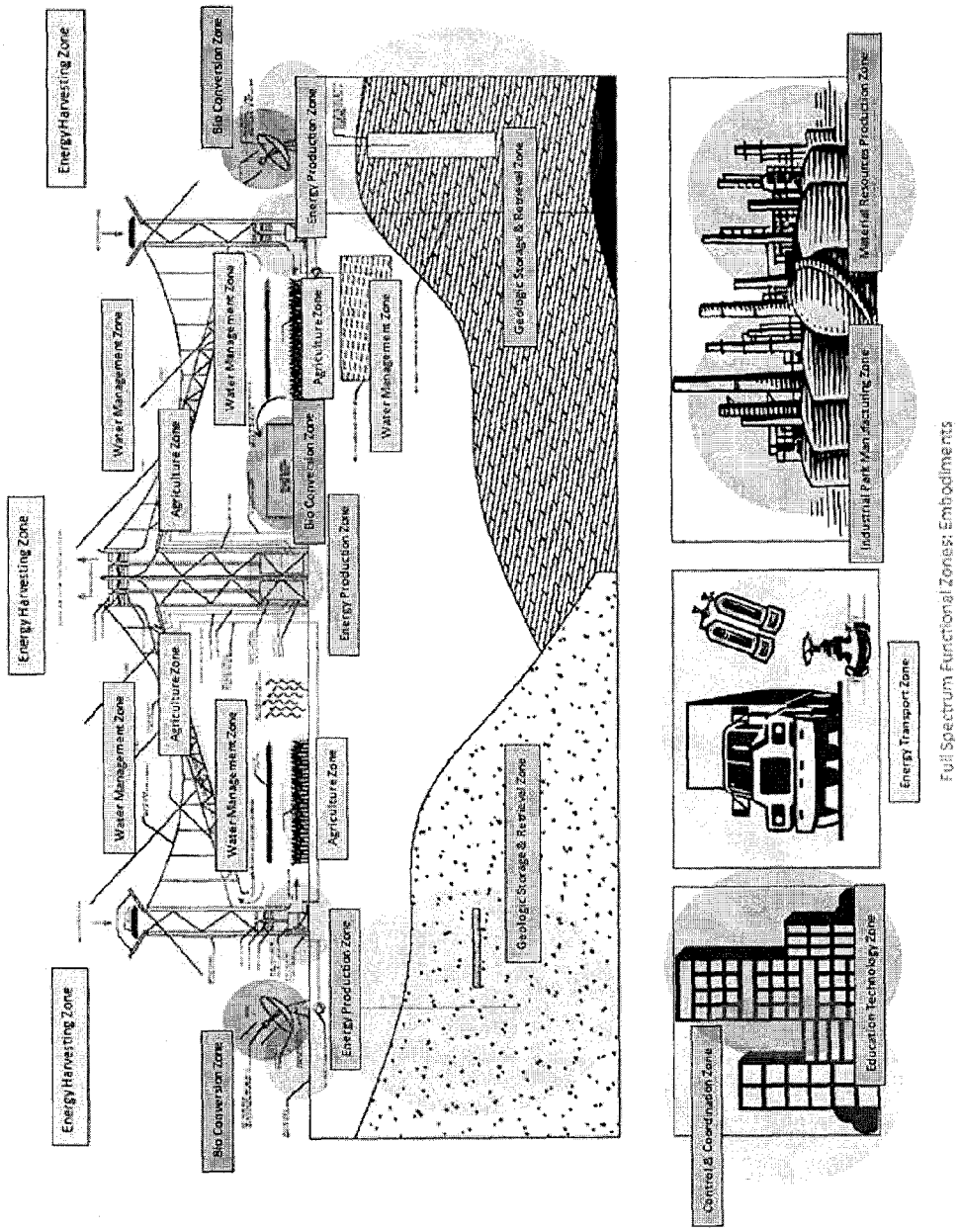
FIG. 1C is a schematic illustrating a land-based system of integrated production of sustainable economic development in accordance with aspects of the disclosure.
Figure 1D:
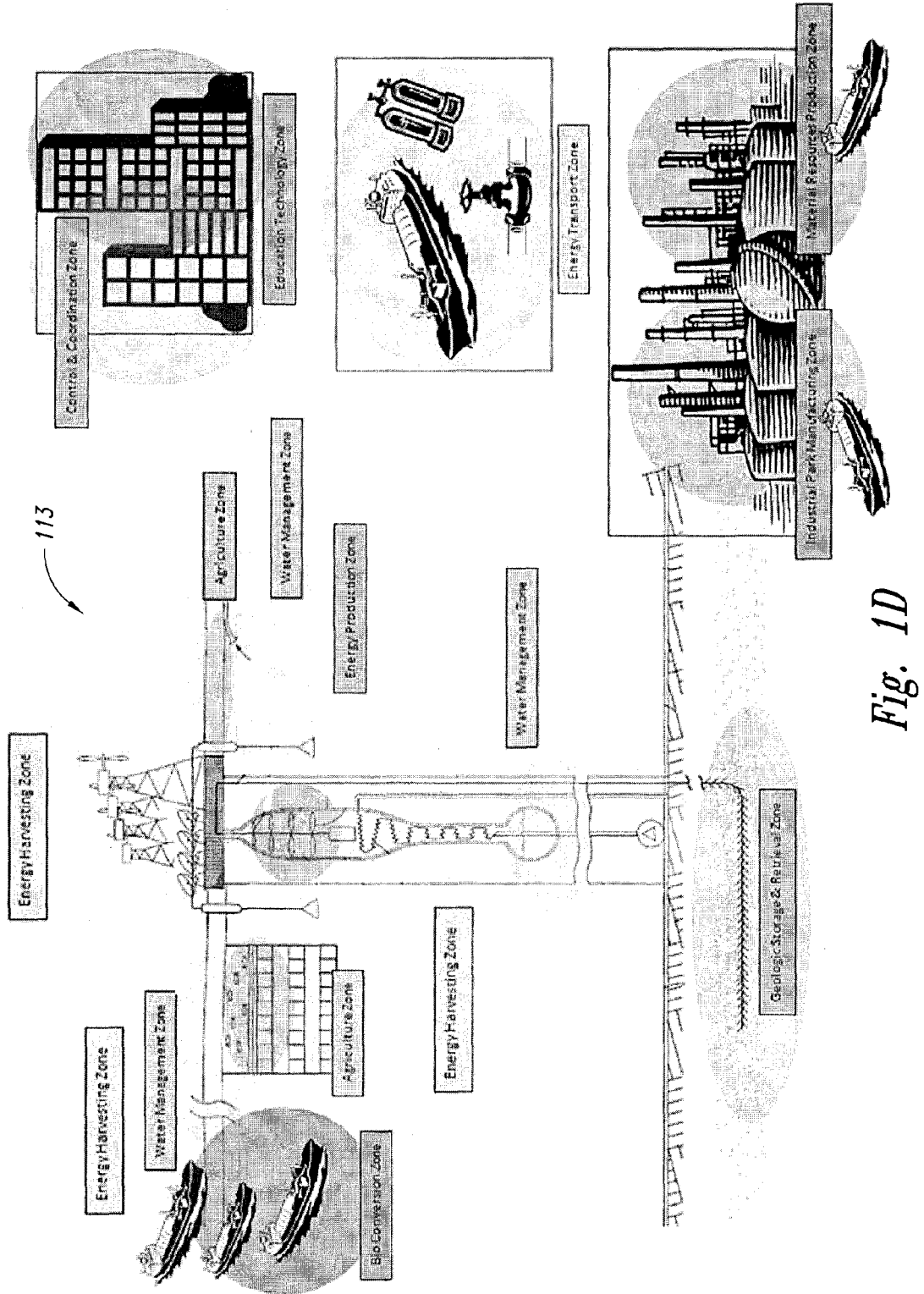
FIG. 1D is a schematic diagram illustrating an ocean-based system of integrated production of sustainable economic development in accordance with aspects of the disclosure.

FIG. 1C is a schematic illustration of a Full Spectrum Integrated Production System 100 showing various exemplary functional zones for a land-based system; FIG. 1D is a schematic illustration of a Full Spectrum Integrated Production System 100 showing various exemplary functional zones for an ocean-based system. The systems shown include an integrated production system on land or ocean with adaptive control of cascading energy conversions and autogenous regeneration of materials resources and production of nutrient regimes. The system includes functional zones for purposes of harvesting and/or generating energy from renewable sources and harvesting material resources from renewable feedstocks that store, retrieve, transport, monitor and control the energy and material resources to achieve improved efficiencies in the production of energy, material resources, and nutrient regimes. Table 1A below expands on exemplary outputs, systems and means associated with the illustrative functional zones.

TABLE 1

| Full Spectrum Integrated Production System Functional Zones | |
|---|---|
| Full Spectrum Integrated Production System Functional Zones | An integrated production system on land or ocean with adaptive control of cascading energy conversions and autogenous regeneration of materials resources and production of nutrient regimes. The system includes functional zones for purposes of: harvesting and/or generating energy from renewable sources harvesting material resources from renewable feedstocks that stores, retrieves, transports, monitors, and controls said energy and material resources to achieve improved efficiencies in the production of energy, material resources, and nutrient regimes. |

| Zone | Outputs | Systems and Means |
|---|---|---|
| Energy Harvesting Zone | Harvested renewable energy from sources such as: solar wind, geothermal moving water biomass & biowaste engine thermal rejected heat | solar thermal devices wind turbines moving water turbines heat conversion devices electrolyzers adaptive control of autogenous cascading energy conversions |
| Energy Production Zone | Renewable: electricity gaseous fuels (e.g., hydrogen, methane, CNG) liquid fuels (e.g., methane, biodiesel, HyBoost) energy carrier feedstock | hydrogen-fueled internal combustion engines generators biomass/biowaste conversion systems electrolyzers |
| Geologic Storage and Retrieval Zone | amplification of heat energy in stored gases reclamation of existing chemical and trace mineral resources mitigation of the variability of renewable energy sources (e.g., solar, wind) | geothermal reservoirs wind turbines gas pressurization systems heat conversion devices |
| Energy Transport Zone | Delivery of: scalable on-demand electricity gaseous fuels (e.g., hydrogen, methane, CNG) liquid fuels (e.g., methane, biodiesel, hydrogen-enriched fuel) energy carrier feedstock materials resources feedstock | energy storage and filtration system pressurized hydrogen and other gases hydrogen-fueled trucks, barges, ships, and trains gas pipeline grid electricity grid |
| Biowaste/Biomass Conversion Zone | energy fuels energy carrier feedstock materials resources feedstock | biodigesters electrolyzers |

TABLE 1-continued

Full Spectrum Integrated Production System Functional Zones

| Zone | Description | Functions |
|---|---|---|
| Agricultural Zone | human, animal, and plan nutrition<br>plant crops<br>animal crops<br>biofuel<br>biomass<br>biowaste | Farms and fisheries with:<br>controlled micro-climates<br>nutrient regimes such as trace minerals and other materials resources to enrich soil and water<br>water reclamation<br>integrated biomass and biowaste harvesting |
| Material Resources Production Zone | chemical and mineral byproducts (e.g., hydrogen, methane, oxides of carbon, oxides of nitrogen, petro-chemicals, ash, nitrogen) additional byproducts (e.g., hydrogen, carbon, designer carbons, oxygen, ammonia, fertilizer, methanol) | autogenous regeneration of materials resources from carrier feedstock |
| Industrial Park Manufacturing Zone | Green machines such as:<br>solar thermal devices<br>wind turbines<br>moving water turbines<br>heat conversion devices<br>electrolyzers<br>polymer thin films<br>engines and generators<br>Other industrial goods:<br>designer carbon<br>industrial diamonds<br>auto, truck, train, & ship parts<br>semiconductors<br>nanotechnologies<br>farm & fishery equipment<br>Consumer durable goods | pre-manufacturing preparation of feedstock materials resources production<br>zero-emissions manufacturing using renewable hydrogen-fueled internal combustion engines (stationary, vehicle) |
| Water Management Zone | water<br>controlled aquatic micro-climate for system processes | production of new water<br>purification of water<br>reclamation of water<br>conservation of water<br>heat sink using water<br>adaptive control of water within the system |
| Control and Coordination Zone | Macro coordination of information across zones to achieve task of zero emissions production of energy, material resources and nutrient regimes | embedded sensing devices in all zones<br>computer monitoring and control using the embedded sensing devices<br>automation<br>robotics<br>information/data management at microscopic levels |
| Education Technology Zone | specialized cross-disciplinary skill development of workforce<br>job creation at each installation site<br>new kinds of energy sector jobs appropriate to integrated renewable energy production, renewable material resource production, and renewable nutrient regime production | integrated training in cross-disciplinary fields application, monitoring, and performance support in the Full Spectrum Integrated Production System environment |

Figure 1E:
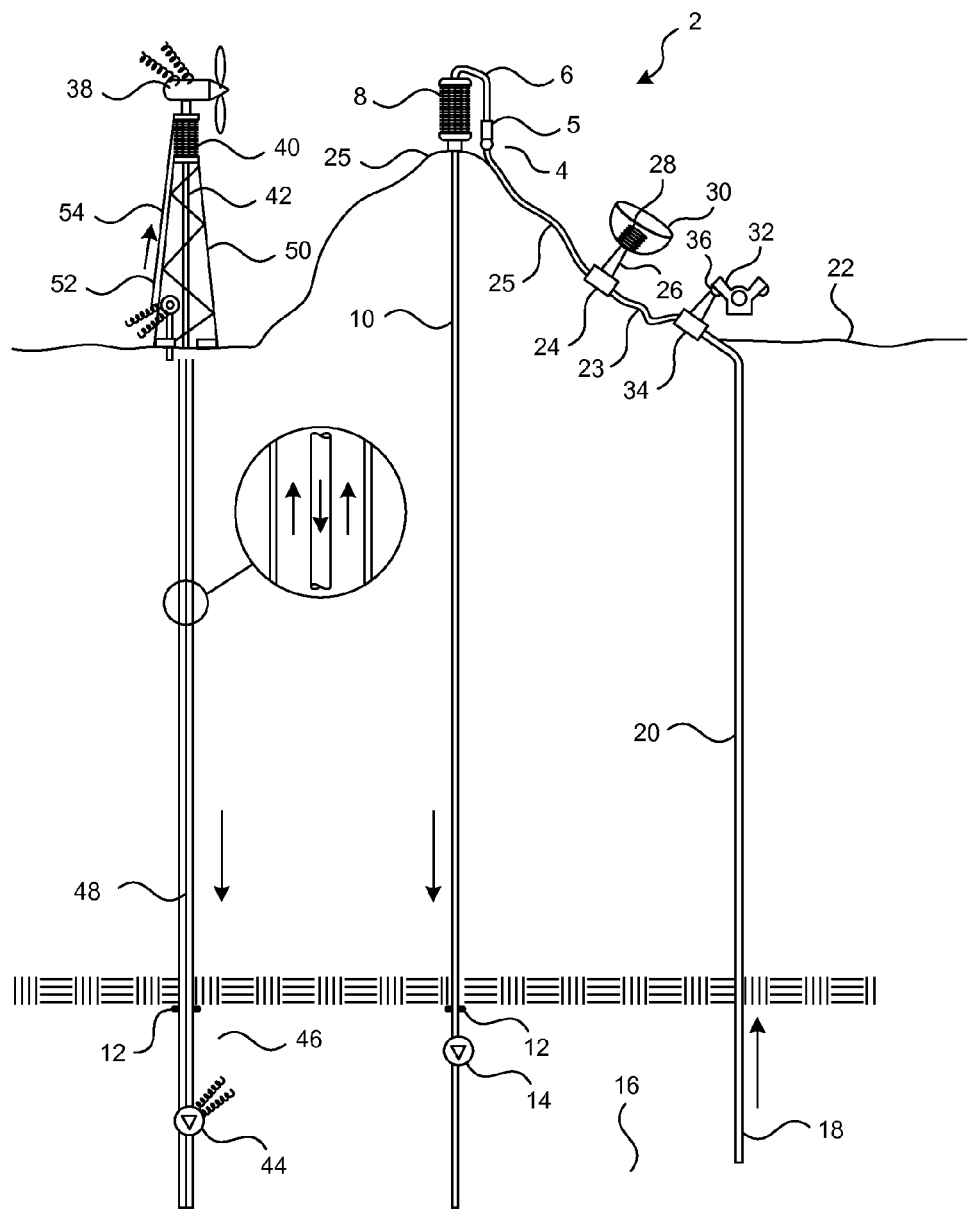
FIG. 1E is a schematic illustration of certain components of a system operated in accordance with the principles of the present invention.

FIG. 1E shows a system 2 by which a suitable gas-expansion motor or engine 4 drives a load such as an electricity generator 5 as shown. Vapors and/or gases leaving expander 4 are conveyed by conduit 6 to heat exchanger 8 for delivery of heat not converted into work by expander 4. Heat exchanger 8 is representative and typical of one or more suitable subsystems to deliver heat to applications such as anaerobic digestion regarding heat additions that may be needed for operation of embodiment 72 of FIG. 2, clothes drying, water heating and space heating for dwellings, melting ice on sidewalks and roadways, various industrial applications requiring heat, drying, curing, and/or dehumidification, and commercial applications such heating water and heat-driven refrigeration, and/or rejection to atmospheric air, evaporatively-cooled atmospheric air, a stream, a lake, or sea water.

Upon removal of sufficient heat by one or more heat exchanges typified at (8), the working fluid is conditioned as a condensate to develop a fluid column or "head" for delivery by conduit 10 to propel fluid motor 14 which is at a lower elevation such as a location below a formation seal 12 in an application with an integral electrical generator. After establishment of the liquid pressure head in conduit 10 fluid motor 14 converts the potential energy of fluid in column 10 into shaft power. In instances that fluid delivered to motor 14 receives heat from a suitable source such as a geothermal formation the working fluid may be vaporized or superheated as it propels motor 14. After this energy conversion step, liquid and/or vapor working fluid exiting from motor 14 is then delivered to further extents of the geothermal formation for re-heating as generally shown by travel path 16. In certain formations it is preferred to utilize one or more horizontal bores towards or to a collection well at 18 for return of heated fluid by insulated conduit 20 to the surface 22. In other instances with suitable geothermal formations it is adequate to provide a side-by-side or coaxial flow of heated working fluid in the same well that down flow of liquid occurs.

After reaching the surface the heated working fluid is routed by conduits 23 and 25 to valves 34 and 24 to one or more optional heat sources such as heat engine 32 or another heat source such as solar heater 30. During times that further heating can be gainfully achieved, the working fluid is routed through valves 34 or 24 to one or more heat exchangers such as 28 and or 36 to receive heat additions from higher temperature sources such as a heat engine 32 or by a suitable solar trap or concentrator 30 as shown. This enables system 2 to achieve higher annual energy conversion capacity and thermal efficiency as a result of such hybridized augmentation of heat transfers of situationally available heat after primary geothermal heat transfer at formation 16.

The hybridized system components shown also enable many new modes of operation including much longer dwell time of working fluid that is reheated as it is stored in formation 16 between peak periods of demand for fuel or electricity. This enables a greater portion of the geothermal formation to deliver heat to the working fluid and thus a higher temperature to be achieved. Further improvements in the efficiency of system 2 occurs when engine generator 32 is used for meeting peak demands and thus greater amounts of heat can be supplied to the working fluid through heat exchanger circuits provided by operation of valve 34 and heat exchanger 36 as shown for recovery of heat rejected by a heat source such as engine 32.

An embodiment of the invention is delivery of vapors and/or gaseous working fluid to provide expansive work in a suitable motor 4 or 52 which delivers depressurized fluid to the highest practical altitude such as applications with combined functions with suitable broadcast towers 50 and wind generators 38, hill tops or mountain ridges 25 to facilitate condensation by heat exchanger(s) 8 or 40 for the purpose of conditioning the working fluid by development the greatest fluid head or vertical height above mixed phase or liquid motor(s) such as 14 or 44. Important improvements on the thermodynamic cycle such as the Rankine-cycle are achieved by development of a dense if not liquid working fluid at considerable height from the zone where work is done by the pressure and kinetic energy of such working fluid at a location near the area where the working fluid is reheated and vaporized. Thus the down-hole energy conversion subsystem 44 can be a liquid impelled motor, a device that harnesses the kinetic energy and pressure of mixed phases of working fluid, or a vapor expansion device that is located in a zone that receives sufficient geothermal heat to produce the desired phase or phases while maintaining or increasing the pressure of such phases This considerably increases the energy conversion capacity and efficiency of system 2 and similar arrangements that accomplish such hybridization improvements of Rankine-cycle operation wherein such liquid is produced at an altitude provided by an embodiment such as a wind turbine tower, a hill or other topographical feature at elevated altitude, a communication tower, and an erected tower.

Generally wind turbine-generators 38 produce more energy if they are placed high above the surface to receive the highest velocity winds. Placing heat exchanger 40 at or near the top of such wind turbine towers improves the cooling capacity for appropriately conditioning the desired phase of the working fluid and avoids many of the causes of ground-level fouling and it provides greater height of fluid column 42 which is delivered to motor-generator 44 by an insulated conduit within coaxial conduit 48 as shown After energy conversion by motor generator 44 such expansively-cooled liquids and or vapors leaving 44 are heated by the surrounding geothermal formation 46 to produce vapors that are conveyed by insulated conduit 48 to motor generator 52 as shown, Fluids exiting from expander 52 are delivered to condenser 40 by conduit 54 as shown.

Figure 2:
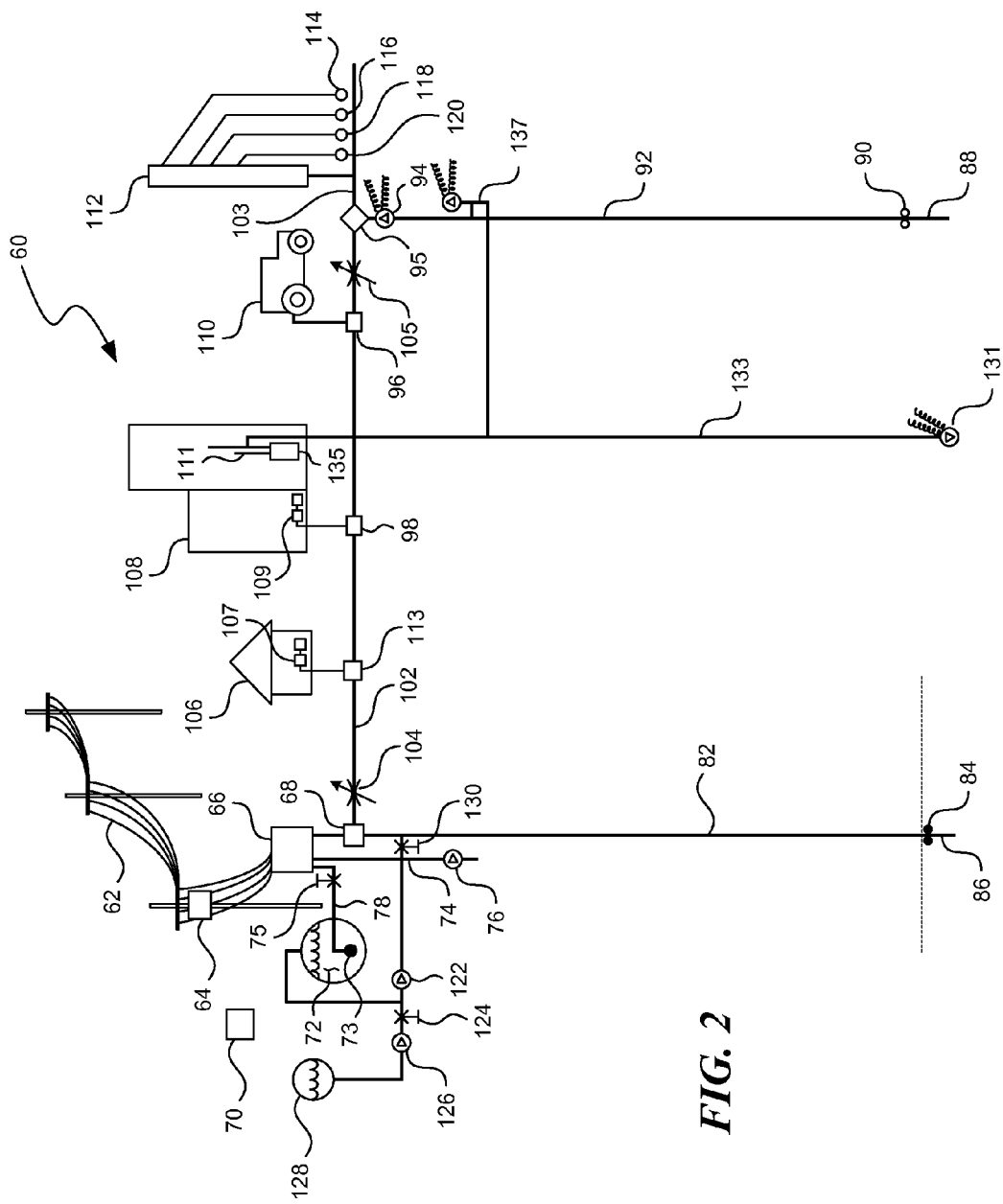
FIG. 2 provides partial longitudinal sections of system components of an embodiment that is operated in accordance with the present invention.
Figure 3:
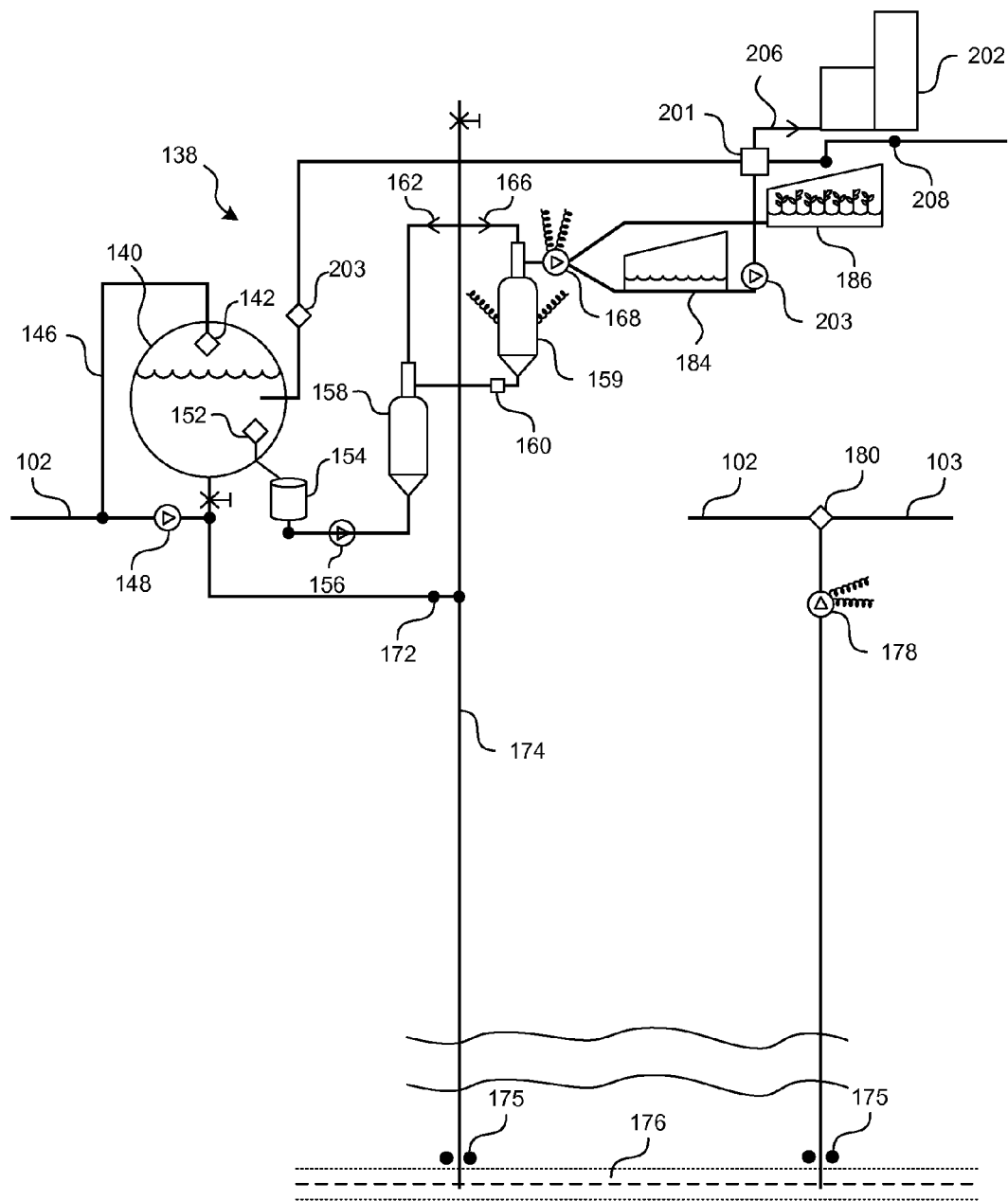
FIG. 3 provides partial longitudinal sections of system components of an embodiment that is operated in accordance with the present invention.

It is preferred to provide for reversible operation of fluid motor 14 as a fluid pump or motor for purposes of enabling it to occasionally operate as an electric motor driven pump to deliver fluids including chemical agents from source 128 of FIG. 2 into the geoformation served. By providing the appropriate manifolding and valve operation, the purposes of improving performance and maintenance operations that may be needed by the various geoformations as described regarding the systems of FIGS. 1E, 2, and 3 are achieved.

In many instances the systems of FIG. 1E, 2 and/or 3 are sufficiently related by operations and the subsurface formation to provide considerable improvement by such operations. However it is practical and often anticipated and encouraged to the operate system of FIG. 1E at considerable distance from the system of FIG. 2 and to provide agents from a subsystem with storage similar to supply tank 128 with occasional use of pump 14 to assist the delivery of such agents to improve the operation of the systems of FIGS. 1 and 2.

As an illustration of hybridization opportunities on nearly every continent for seasonal enhancement of geothermal energy, Table 1B shows that substantial summer energy is available in the longer days and relatively clear-sky conditions such as the Fairbanks area of central Alaska and other northern plains areas compared to warmer areas such as Gainesville, Fla. The Fairbanks area of Alaska and similar areas in Canada receive more solar energy during the long days of sunny summers than eight of the "seemingly warmer" cities of North America as shown.

TABLE 1B

Comparisons of Kilowatt-Hours/Square Meter At Various U.S. Locations

| STATE | CITY | HIGH | LOW | AVERAGE |
| --- | --- | --- | --- | --- |
| AK | Fairbanks | 5.87 | 2.12 | 3.99 |
| AL | Montgomery | 4.69 | 3.37 | 4.23 |
| AR | Little Rock | 5.29 | 3.88 | 4.69 |
| CA | Davis | 6.09 | 3.31 | 5.10 |
| CO | Boulder | 5.72 | 4.44 | 4.87 |
| FL | Gainesville | 5.81 | 4.71 | 5.27 |
| IN | Indianapolis | 5.02 | 2.55 | 4.21 |
| OR | Astoria | 4.76 | 1.99 | 3.72 |
| PA | Pittsburgh | 4.19 | 1.45 | 3.28 |
| WV | Charleston | 4.12 | 2.47 | 3.65 |

Thus, where substantial geothermal energy is available, including wells for purposes such as producing oil and natural gas, disposing of brine or returning natural gas, and in the instances of depleted oil and natural gas wells that access formations that are at elevated temperature, it is worthwhile to provide primary geothermal heating of the working fluid followed by further heating by situationally available higher temperature solar-collection sources. Such opportunities may also involve occasional heat rejection by industrial plants or by heat engines such as piston engines, gas turbines and/or steam turbine systems 32 including heat engines that operate to meet peak loads and must reject large amounts of heat.

Such solar, industrial or peaking-engine augmentation of geothermal energy that provides heating of selected working fluids such as mixture of 2,2,3,3-tetrafluoropropanol and water and/or alcohols such as methanol, ammonia, propane, or Freon to a higher temperature can substantially increase the annual energy production and efficiency of energy conversion systems such as shown in FIG. 1E. In many instances that sufficient depth of geothermal formation exists with desired thermal diffusivity it is preferred to deliver liquid working fluid to fluid motor 44 by conduit 42 for energy conversion and to return the heated and vaporized working fluid through conduit 48 for vapor expansion and energy conversion by motor 52 as a closed working fluid system without allowing the working fluid to contact the formation. In other instances it is preferred to arrange for intimate contact of selected working fluids with the geothermal formation to encourage the formation to yield valuable substances that may be extracted or separated from the working fluid at the surface.

In addition there are critical needs for improved utilization of renewable energy along with energy conservation in southern area climates of the southern hemisphere such as Patagonia and the Kalahari and similarly in northern area climates of the northern hemisphere such as found in parts of Alaska, Canada, Scotland, Scandinavia, Russia and in parts of western Asia. These areas often encounter peak demands in the winter season instead of the summer when abundant solar energy is available.

In such instances it is opportune to improve on or overcome Brayton-cycle limitations due to the large fraction of internally provided motive potential to power a gas or vapor compressor devices. FIG. 2 shows how a high pressure gas is produced substantially by conversion of a liquid to a gas at sufficiently elevated pressure for compact storage and/or for storage in a geological formation that has considerable downhole pressure and/or impedance to fluid entry. Electrolyzer 66 provides pressurized hydrogen and/or carbon dioxide to establish a formation drive and to pressurize deliveries of inventories of methane and/or carbon dioxide from sources such as digester 72. Fluids including mixtures of substances that receives heat from formation 86 provide much greater net capacity for work by expansion in device 94 as shown in FIG. 2.

FIG. 2 shows a system 60 for generating a storable fuel such as hydrogen or methane from methane hydrate deposits and/or anaerobic digester 72 and such hydrogen and/or methane is preferably cyclically or continuously pressurized by higher pressure gases produced by electrolyzer 66 and/or a suitable mechanical compressor 122 and delivered through valves 130 and/or 68 to pressure regulator 104 for distribution by pipeline 102 to markets at considerable distance or delivered to geological formation 86 by conduit 82 for intermittent short-term or long-term storage. In operation, electricity generated by system 2 and/or other sources is transmitted through grid 62 to power conditioner system 64 to provide the proper voltage and rectified current to power electrolyzer 66 to produce hydrogen from the liquor of anaerobic digester 72 and or water taken from a local aquifer 80 by pump 76 and delivered by conduit 74 as shown.

Controller 70 optimizes the system including production of pressurized hydrogen from liquors provided by action of microorganisms in anaerobic digester 72 or by electrolysis of water delivered by conduit 78. Disclosures of such operations and the energy conversion advantages of using liquors provided by action of microorganisms as a function of anaerobic digestion of organic matter are provided in the co-pending patent applications and U.S. Pat. No. 6,984,305 and these disclosures are included herein by reference to technology for greatly reducing the energy required to produce hydrogen compared to conventional electrolysis of water.

It is also contemplated that industrial operation 108 or refining operation 112 would occasionally produce pressurized carbon dioxide, carbon monoxide and/or hydrogen by partial oxidation of a carbon donor or by reaction of a carbon donor with steam as generally shown in Equations 1 and 2.

$$2C + 1.5O_2 \rightarrow CO + CO_2 \quad \text{Equation 1}$$

$$CH_4 + H_2O \rightarrow CO + 3H_2 \quad \text{Equation 2}$$

Utilization of such gases in the process consisting of delivery for storage and/or heat gain in reservoir 86 followed by expansion in motor-generator 94 as shown is an important situational opportunity to provide additional storage and/or heat extraction capacity and further improve the overall energy-utilization efficiency of an energy center such as disclosed in the co-pending patent application 60/847,063; including dairies, canneries, slaughter houses, manufacturing businesses, industrial parks, or communities.

Table 2 compares the functions and atmospheric-pressure boiling temperatures of various candidates for serving as working fluids and/or as chemical and pressurizing agents for facilitating extraction of heat along with other values from geothermal formations. These working fluids may be used as closed cycle fluids that are contained in heat exchange systems or in appropriate instances are delivered into the geothermal formation for enabling intimate contact and improved heat exchange rates.

Throughout the embodiments it is the purpose to cascade energy from the highest availability, temperature, and pressure circumstances in "full-spectrum" energy conversion operations to greatly improve the return on investment and overall energy-utilization efficiency. This includes new results from old technologies and known materials including recycled materials and subsystems that are thus employed.

In many applications it is practical to expend X amount of energy to produce and deliver a fluid to a geothermal formation and achieve storage of X amount of energy. Upon return of the stored fluid a greater amount of energy can be delivered in the combination of thermal, pressure, and chemical potential energy.

In many instances it is intended to mix and mingle mixtures in geothermal formations for purposes of increasing the extent of thermal participation of the formation in the energy conversion and value extraction opportunities that some embodiments of the invention provide. Illustratively it is intended to mix hydrocarbons shown such as ethane, propane, butane, carbon dioxide and/or hydrogen to improve heat transfer and extraction of values in many formations that contain hydrocarbons.

A particularly full spectrum of opportunities results including practical harnessing of full the full solar and subsoil IR spectrum by a wide spectrum of energy conversion principles and components.

TABLE 2

TYPICAL WORKING FLUIDS

| SUBSTANCE | Function | Boiling Point at Atmospheric Pressure (° C.) | (° F.) |
|---|---|---|---|
| Acetone | L, S, V, M, A | 50.5 | 133 |
| Ethanol $C_2H_5OH$ | L, V, M, A | 79 | 172.4 |
| Allyl Alcohol | L, V, M, A | 97.2 | 207 |
| Butyl-n Alcohol- | L, V, M, A | 117 | 243 |
| Methyl Alcohol | L, V, M, A | 64.7 | 151 |
| Propyl Alcohol | L, V, M, A | 97.5 | 207 |
| Ammonia $NH_3$ | L, V, M, A | −35.5 | −28.1 |
| Butane-n | L, V, M | −0.5 | 31.1 |
| Carbon dioxide | V, M | −78.5 | −109.3 |
| Chloroform | L, S, V, M, A | 62.2 | 142 |
| Diethyl ether | L, V, M, A | 34.7 | 94.4 |
| Dowtherm | H | 258 | 496 |
| Ether | L, S, V, M, A | 35 | 95 |
| Ethane $C_2H_6$ | S, V, M | −88 | −127 |
| Ethyl acetate | L, S, V, M | 77.2 | 171 |
| Ethyl bromide | L, S, V, M | 38.4 | 101 |
| Freon R-11 | L, V, M | 23.8 | 74.9 |
| Freon R-12 | L, V, M | −29.8 | −21.6 |
| Freon R-22 | L, V, M | −41.2 | −42.1 |
| Heptane-n | L, S, V, M | 98.4 | 209.2 |
| Hexane-n | L, S, V, M | 68.7 | 155.7 |
| Hydrogen | S, V, H, F | −253 | −423 |
| Methane ($CH_4$) | S, V, M, F | −161 | −258 |
| Methyl acetate | L, S, V, M | 57.2 | 135 |
| Methyl iodide | L, S, V, M | 42.6 | 108 |
| Pentane-n | L, S, V, M | 36 | 96.9 |
| Propane | L, S, V, M | −43 | −45 |
| Water | L, S, V, H, M, A | 100 | 212 |

L (Liquid head);
S (Solvent);
V (Vapor Expansion);
A (Azeotrope)
M (Miscible Agent);
H (Heat transfer agent);
F (Fuel)

Mixtures and solutions of various substances may be utilized to prevent blockage by frozen solids. Ethanol freezes at −117.3° C. (−179° F.). Methanol freezes at −97° C. (−143° F.). Working fluid mixtures and azeotropes illustrate how to provide freeze protection against the coldest temperatures on earth and to create expansion vapors by heat transfer from relatively cool geothermal sources of about 79° C. (174° F.) or warmer. Water boils at 100° C. (212° F.) and ethanol boils at 78.3° C. (173° F.). The binary azeotrope mixture of 95% ethanol and 5% water by volume boils at 78.2° C. (172.8° F.). A ternary azeotrope of 52% methanol, 44% acetonitrile, and 4% water boils at about 67° C. (153° F.) to enable even cooler geothermal formations to be utilized as the liquid azeotrope drives motor-generator 44 and the vapor drives motor-generator 52 in the system embodiments of FIG. 1E.

Downhole utilization of hydrogen and/or hydrogen and hydrocarbon mixtures called "HyBoost" fuels in mines and in geothermal formations to drive engine-generators 131 or fuel cells including high temperature fuel cell 137 provides additional heat at a higher temperature than the host formation to further improve the rate and efficiency of overall energy conversion by the systems of FIGS. 1E and 2. Combined heat and power (CHP) engine 109 can be operated at optimum conditions to meet varying electricity and heat requirements with load leveling as reversible fuel cell 137 produces or is supplied with electricity and heat rejected by the engine or fuel cell is utilized for applications such as drying, cooking, canning, and water heating or sterilization. Very pure supplies of hydrogen and or oxygen produced and pressurized by reversible electrolyzer 135 are preferably utilized for commercial and industrial priorities in the industrial park or community.

Pressurized oxygen from high pressure reversible electrolyzer 135 is also delivered by line 133 to engine generator 131 and/or to fuel cell 137 to produce electricity or drive other loads along with adding heat to formation 86 and/or to provide steam to heat and insulate vapors or gases passing through line 92 to expander-generator 94 as shown. Depending upon the formation temperature, depth, and availability of values such as hydrocarbons that some embodiments of the invention can help extract or produce, such engines or fuel cells 131 and 137 may be closer to the surface along line 92 or at considerable depth, or within the formation where heat addition results in greater extraction and production of values such as hydrocarbons from tars and other resources.

FIG. 3 depicts a new technology embodiment 138 for further reducing the energy required to produce hydrogen and/or methane from anaerobic processing such as thermal dissociation or digestion of organic materials. Activated carbon and exfoliated graphene media have been prepared to catalytically cause release of hydrogen from anaerobic digestion liquors.

It is apparent that certain organic substances such as enzymes produced by microbial digestion of organic materials are more effective in charge transfer processes and/or are aided by the low energy removal of hydrogen by or into the activated carbon and/or are more efficiently presented and/or have longer useful life after being adsorbed and thus modified by activated carbon or exfoliated graphene materials. After such processing to achieve "enzymic activation" these materials cause releases of hydrogen and carbon dioxide from pressurized anaerobic digestion liquors. Further, use of such enzyme activated carbon media in conjunction with electrical impetus as disclosed copending patent applications and in U.S. Pat. No. 6,984,305 or at reduced constant voltage compared to the voltage required for optional electrolysis of water substantially improves the yield of hydrogen per unit of electrical work.

Production of hydrogen with reduced energy expenditure is particularly advantageous for improving the economics of hydrogen extraction from energy crops and organic feedstocks including wastes. Process efficiency improvements are provided by the use of anaerobic digester 140 to produce methane fuel and carbon dioxide while a portion of the liquor that is constantly produced by the digestive process is transferred through filter 152 and preconditioner 154 to pressure pump 156 for delivery to pressure vessel 158 that is packed with enzyme activated carbon media for presentation of the digestion liquor and extraction of hydrogen and/or carbon dioxide for delivery through valve 160 or valve 162 depending upon the pressure and temperature of operation of the separator at the top of 158 as shown.

If desired, gaseous hydrogen can be substantially separated from the carbon dioxide as needed for applications such as nourishment for green plants. Such separation is preferably provided by the process disclosed in U.S. Pat. No. 6,984,305 and hydrogen is conveyed by a conduit and check valve 162 for delivery through well 174 past formation seals 175 to geothermal and/or hydrocarbon reservoir 176. Liquor leaving pressure vessel 158 with substantial amounts of carbon dioxide in solution is delivered to pressure vessel 159 by a conduit and check valve 160 circuit as shown for electrically-stimulated production of additional hydrogen which may be similarly separated, by a suitable process such as disclosed in U.S. Pat. No. 6,984,305 from carbon dioxide and other gases that are present. The system for catalyst aided release of hydrogen from substances prepared by action of microorganisms on biomass includes the organic catalyst(s) disclosed along with inorganic catalysts such as the transition metals and intermetallics involving transition metals. It is a feature to enable further increases in the rate and equipment efficiency for such hydrogen production by application of vibrational, radiative, electromotive, and or magnetic force(s) in sequence with or in conjunction with such catalyst(s) as shown.

Relatively pure hydrogen is delivered through check valve 166 and valve (not shown) to industrial, commercial, and transportation applications delineated for eliminating or minimizing production of carbon dioxide. Remaining hydrogen is added to the hydrogen sourced through check valve 166 for charging formation 176 through well 174. In this process, expander-generator 168 generates electricity as it converts the pressure and kinetic energy in fluid being depressurized as shown.

Depressurized carbon dioxide gas is utilized for various purposes including growing aquatic crops such as algae in converter 184 and enrichment of the atmosphere in greenhouse 186 for increasing the rate and efficiency of photosynthesis and/or as a greenhouse gas constituent along with lesser amounts of co-separated methane to trap solar energy for desired thermal gain in converter 184 or greenhouse 186 as shown. Carbon dioxide in solution in the depressurizing liquid fluid is delivered for enrichment of aqueous plants such as algae in hydroponics converter pond 184 as shown. Spent liquor along with occasionally harvested aqueous crops such as algae may be fed into digester 140 or portions of the harvested crop can be delivered through valve manifold 201 and conduit 206 by pump 203 for processing into various supplements, vitamins, nutrients, fuel alcohols, fats etc, by process plant 202 as shown. Wastewater from plant 202 and other area sources is routed through line 208 to digester 140 by valve manifold 201 as shown.

Methane and carbon dioxide produced by anaerobic digester 140 is delivered through filter 142 and conduit 146 to compressor 148 and through check valve 172 to well 174 for storage and/or to increase the extraction and yield of hydrocarbons from formation 176 and/or to gain geothermal energy for production of work and/or electricity by expander-generator 178 as shown. The flow metering circuit of pressure regulator 150 controls the amount of gaseous recirculation needed to mix, stir, control temperature, and agitate the anaerobic digestion process facilitated in 140 as shown.

Important improvements in energy conversion efficiency for the systems shown in FIGS. 1, 2, and 3 result from pressurization of liquids by pumping followed by further pressurization and/or delivery of gaseous substances derived from such pressurized liquids as a result of electrolysis of water, catalytic gas releases from anaerobic digestion liquors and/or reduced energy releases of gases by electrolysis. Illustrative of the hybridized and improved Brayton-cycle and/or Rankine-cycle efficiency, results from pressurization of fluid from digester tank 72 by pump 73 of the digestion liquor produced in 72 for delivery through valve 75 to electrolyzer 66 because it provides gaseous hydrogen and/or carbon dioxide at essentially the pressure produced by liquid pump 73 as shown.

The electrical power requirement to produce hydrogen from liquors including compounds such as urea along with acetic and buteric acids separated from or produced by digester 72 is greatly reduced compared to conventional electrolysis of water and further improvement is achieved by the development of the desired hydrogen delivery pressure as a result of liquid pressurization by pump 73 compared to application of a gas compressor after such gases are released. Similarly it is advantageous to produce pressurized carbon dioxide for purposes such as sequestration of heat and/or additional hydrocarbons from formation 86 of FIG. 2, separation processes, energy conversion as an expansive gas, and/or for compact storage.

At times that the amount of hydrogen that can be produced by system 60 exceeds the demand by CHP and other applications served by pipeline 102 including loads such as home(s) 106, commercial and manufacturing buildings 108, and farming or transportation needs 110, including very pure hydrogen delivered from electrolyzer 135 by line 111 for fuel cell applications such as hybridized vehicles 110, the surplus hydrogen, methane and or carbon dioxide methane from 72 and 66 are delivered at the pressure required to recharge depleted oil and/or natural gas reservoirs 86 or similar geological formations at greater distance with sufficient overburden and seals to store hydrogen and other gases as shown. In many instances formation 84 is at sufficiently elevated temperature to enable hydrogen and other gases stored in 84 to return to the surface at such elevated temperatures for powering turbogenerator 94 after which hydrogen is delivered through line 102 at lower pressure as established by pressure regulators 104 and/or 105.

Advantages of storing hydrogen and/or methane and/or carbon dioxide in geological formations that contain hydrocarbons include increased production of such hydrocarbons as a result of increased drive pressure, enhanced permeability resulting from the action of very low viscosity and high thermal capacity of hydrogen and/or methane along with increased fluidity of the hydrocarbon values. In addition some embodiments of the invention facilitate delivery of other fluids to enhance production including agents such as propane, carbon dioxide, solvents, and detergent solutions representatively illustrated as being delivered from storage containers such as 128 through pump 126 and valve 124 to a suitable manifold for charging formation 86 through well conduit 82.

Enhanced hydrocarbon production from reservoir 86 resulting from such hydrogen and/or methane and/or carbon dioxide storage and/or related treatment operations as delineated by Table 2 is preferably separated at 95 or 180 into hydrogen characterized fuels for delivery by pipeline 102 and hydrocarbon-rich constituents that are delivered by pipeline 103 for further separation and/or refinement of values by an appropriate system 112 to provide extraction of various constituents and taken to market, storage, or further refinement by pipelines represented by 114, 116, 118, and 120 as shown.

The systems shown in FIGS. 1, 2, and 3 thus greatly increase storage efficiency, the net electricity and/or fuel energy conversion capacity, rate, and efficiency as measured by the total amount of electricity, hydrogen and/or methane fuel and/or hydrocarbon production. Production of electricity, particularly peak power to meet quickly developing demands is readily provided by utilization of hydrogen and/or methane as a fuel for piston, rotary or turbine ICE engine(s) 32 and/or 107 and/or 109. In each instance it is of great advantage to utilize heat rejected by such engines to improve the overall energy utilization efficiency by increasing the temperature of expansive gas to drive motor-generators 4 and/or 178 and to deliver heat for agricultural, industrial, or domestic applications such as the combined heat and power applications shown.

These processes for energy conversion generally comprise the steps of subjecting one or more fluid substances to a suitably prepared and maintained geological formation for purposes selected from the group comprised of heat gain, intermittent storage of chemical and or pressure energy, and extraction of valuable substances from the geological formation followed by hybridized Rankine-cycle or Brayton-cycle expansion of one or more of such fluid substances in an engine to accomplish work, wherein at least one of the fluid substances may be cooled for operation of an improved Brayton cycle and/or condensed to produce liquid that is delivered to an expansion motor or to a lower altitude to drive a liquid or fluid motor to accomplish work The embodiments shown are particularly beneficial for extraction and conversion of geothermal thermal energy and/or values such as hydrocarbons from suitable formations while co-producing electricity and or chemical fuel values. The invention embodiments enable plentiful summer energy to be used to produce storable fuels for later use in the winter along with improved extraction and conversion efficiency of geothermal energy. Some embodiments of the invention facilitate re-use of certain depleted mines along with oil and natural gas wells and enables regeneration of economic opportunities in communities that have been blighted by coal, oil and natural gas depletion or distressed by greenhouse warming problems.

The invention embodiments disclosed provide improved waste disposal operations and greatly reduced energy requirements to produce hydrogen from wastes to improve air and water quality and greatly reduce dependence upon fossil fuels and fissionable fuels that plague communities with radioactive wastes. In areas that have variable wind, tidal or wave conditions it is important to locally convert such renewable energy to chemical fuel potentials such as hydrogen or methane for storage and heat gain in a suitable geothermal formation.

Geothermal formations suitable for fuel and/or carbon dioxide storage may also be linked to distant sites where renewable resources such as solar, wind, wave, or tides are harnessed as shown in FIGS. 2 and 3 by pipelines or electricity grids in addition to rail and truck deliveries.

Figure 4:
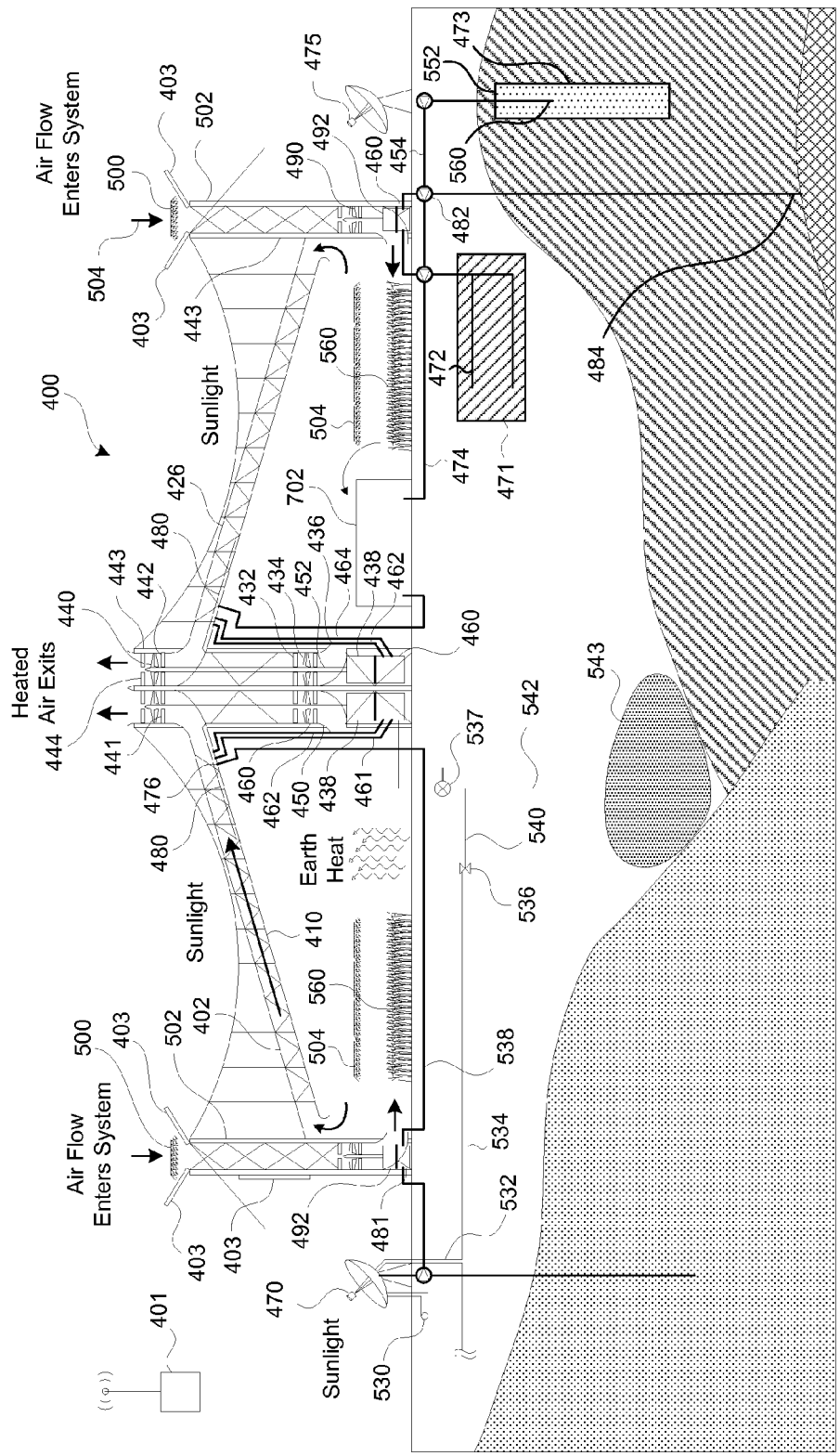
FIG. 4 is a schematic illustration of integrated components of a system operated in accordance with the principles of the present invention.
Figure 5:
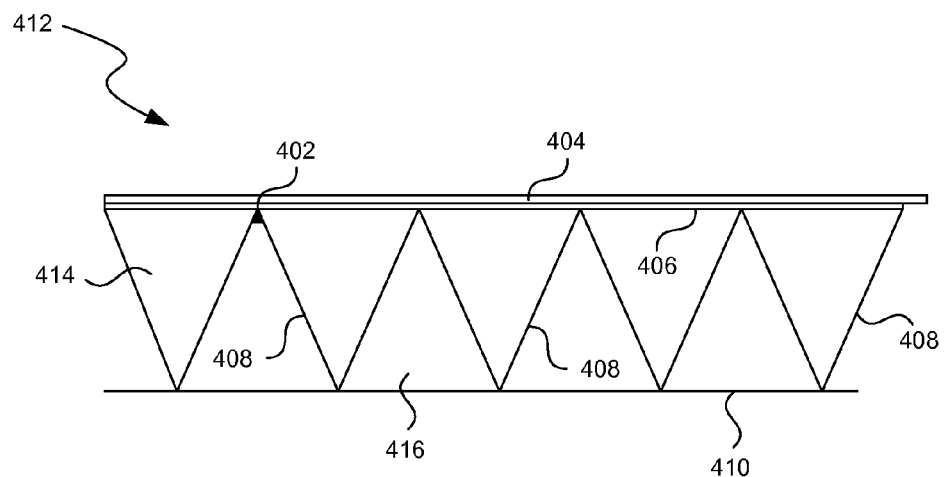
FIG. 5 shows a section view of an embodiment of the system of FIG. 4.

In instances that large-scale conversion of renewable energy is needed to replace dependence upon fossil and fissionable fuels the system embodiment 400 of FIG. 4 provides full spectrum solar conversion with geothermal energy enhancement and storage. FIG. 5 shows a section view of an assembly of support cables 402 and glazings 404, 406 and 408 for trapping virtually all wavelengths of the full solar spectrum of energy to heat air within the zone underneath assembly 412 or that passes through passageways 414 and 416 as shown. Cable(s) 402, which may be made of any suitable material such as bar, wire, or fibers of steel, glass, ceramic, polymer, carbon, or combinations of such materials, supports one or more transparent glazings 404 and 406 along with film 410 to convert a large area of solar and/or geothermal energy for production of energy. Solar radiation enters the trap of FIG. 5 along with infrared radiation from the earth below and is converted into thermal energy to heat air in passageways 414 and 416 and below as shown.

FIG. 4 shows a system 400 for utilizing glazings such as shown in FIGS. 5 and/or 6 for producing electricity and/or hydrogen. Air is heated by geothermal and/or solar and/or heat rejected by various energy conversion processes and is drafted upward to impel vertical shaft turbines. Rotors 490, 432 and/or 434 in conjunction with a stator such as 450 as shown deliver air into the plenum between the ground or some other suitable boundary and membrane(s) 410 or 421 as shown. Such moving air collects solar energy and removes heat rejected from geothermal sources, other generator(s) and heat engines such as solar engine-generator 475 by heat exchanger 476 and internal combustion turbine, piston or rotary engine(s) 460, 481 and heat exchanger 480, as shown. Such rejected heat includes engine jacket and oil cooling along with heat removed from electricity generators preferably by hydrogen after which it is combusted in a heat engine or recycled through heat exchangers. It is preferred to add higher quality heat from the exhaust stream of internal combustion engines after the last stages of solar heating by insulated exhaust pipes 461 and 464 as shown to increase the work achieved by expansion turbines 440 and 444 and/or in conjunction with one or more stators such as 442.

It is preferred to operate internal combustion piston and rotary engines with an integral exhaust turbine that drives an electrical generator or a compressor before the exhaust is then added to the gases at one or more power rotors as depicted at 440 and 444. The output from power rotors 440 and 444 may be increased or decreased in speed and used to drive compressor/motor rotors 432 and 434 along with electricity generator(s) 438 as shown.

In many areas it also advantageous to provide heat gain from natural geothermal sources and/or from subterranean heat storage and exchange at the depth of heat exchanger 484 as shown. Heat exchanger 480 rejects heat from geothermal energy conversion systems such as fluid pump 482 and engine 481, and/or thermo-electric and/or a thermochemical processes that ultimately reject heat after performing mechanical work, operation of chemical processes, and/or production of electricity. Such rejected heat adds to the energy that is extracted at turbines 440 and 444 and increases the capacity of the combined plant systems while improving the heat rejection process and thus synergistically improving the efficiency of the solar and geothermal energy conversion processes.

After performing such synergistically beneficial cooling by accepting additions from heat exchanges within the zone beneath membranes 410 and 421, air is circuited into the channels between membranes 410 or 421 and 406 or 420 as shown to gain additional solar energy. Heated air is then delivered to one or more power rotors, which are depicted as 440 and 444. Variable pitch flow controllers 443, 441 and 442 are coordinated with rotors 490, 440 and 444, which may also provide variable pitch as needed to optimize the energy conversion process. Air velocity at flow directors 443, 441 and 450 is substantially influenced by the availability of solar energy and heat from other contributors, and humidity in this multiply combined and hybridized cycle system.

When solar, geothermal and/or rejected heat from the other devices shown is adequate and the ambient air is relatively dry, it is advantageous to create greater humidity in the air moving through the system. Water transpired and/or sprayed on crops within and/or surrounding the system 560 and/or distributed by suitable sprayers 500 and 504 into air passing within down-flow structure(s) 502 and 510 to cool the ambient air masses and thus creates increased impetus in down draft air past turbines 432, 434, and 490 to power generators 438 and 492 and to cool photovoltaic collectors 403 as shown. Humidifying the air is also highly advantageous for increasing the energy delivery to turbines 490. 440 and 444 as shown and these operations are adaptively optimized by computer controller 401.

Providing a wide variation in pitch by flow directors 443, 441 and 442 along with rotors 432, 434, 440, 444, and 490 enables synchronous operation of generators 492 and 438 throughout the heat gain range of weather, geothermal, and combined-cycle operations.

This precision adaptive control of heated airflow thus produces maximum turbine efficiency at all levels and combinations of solar intensity, geothermal, and ambient conditions. An important advantage of flow controllers 441, 442, and 450 along with 443 is the delivery of denser directed air at higher velocity to power turbines 490, 434, 432, 440, and 444 as shown. This includes increased air speed and delivery at the optimum portion of variable pitch blades of rotors 490, 440, and 444 to maximize torque production and conversion of molecular kinetic energy and flow into shaft energy.

Providing positive airflow when needed from pump(s) 432 and 434 within the plenum(s) that are formed reduces the temperature at which heat is rejected from peaking or base-load heat engines 460, 475, and 480 to improve the thermal efficiency of such engines and thus the overall system efficiency. Solar engines 475 such as Stirling cycle engines and thermochemical processes in 522 may be of any suitable type including those disclosed in the co-pending U.S. patent application Ser. No. 08/700,577.

Further improvements in the efficiency of solar engines 475 is provided by collection of rainwater that falls in the area of application including runoff, from sloping membrane(s) 404 and/or 426 into reservoir(s) 471 and 473 as shown. Rainwater is collected in lined reservoir 473 and delivered by pump 550 to one or more electrolyzer(s) 702 and 704. Collected water is also used to improve heat transfer rates and to cool in-ground heat exchangers 472 within well(s) 471 after as much heat as can be delivered by heat exchangers 476 to air proceeding towards solar and/or geothermal heating below and in channels served by membranes 404, 406, 408 and 410 as shown.

Figure 6:
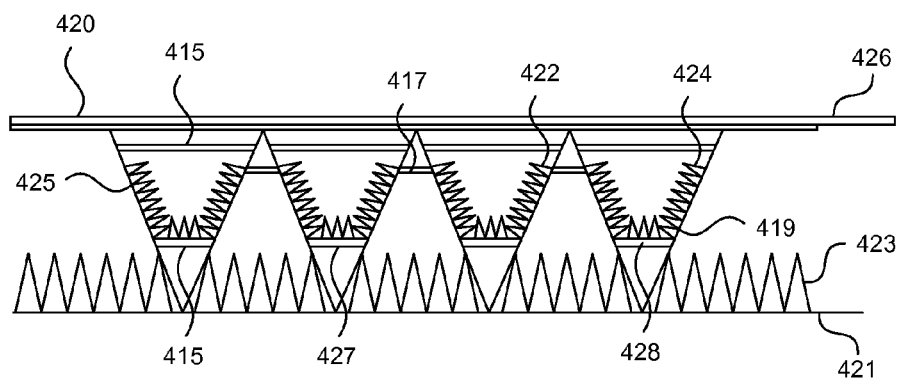
FIG. 6 shows a section view of another embodiment of the system of FIG. 4.

Depending upon the thermal stability of the membrane materials selected, and the geothermal energy available from the ground below, it is preferable to provide membrane 410 as an infrared trapping membrane and 421 as a flat black membrane with considerable angularity in the surface or to serve in conjunction with membranes of such angularity. FIG. 6 illustrates incorporation of multitudes of radiation trapping and heat transferring wrinkled or generally "W" shaped folds to considerably increase the solar and/or geothermal absorptivity, heat transfer area, and the air temperature achieved by heat transfer membranes 515, 424 and 425. One or more transparent parallel membranes may be placed in membrane 417 spans as shown, and one or more transparent membranes may be provided in the span shown for membrane 415 to establish separated air cell channels. These air channels may be provided with suitable valves to controllably provide restricted airflow to insulate and increase dwell time in the central channel that houses membrane 423 to produce much higher temperature air. This enables rapid achievement of substantially warmed air such as 94° C. (200° F.) to 204° C. (400° F.) in the central channel that gains heat from contact and by radiation from opaque extended surface membranes 423 and 424 as shown.

In the embodiment of FIG. 6 it is generally preferred to provide membrane 419 with one or more reflective layers between alternating dielectric layers and to place this membrane somewhat separated from gas seal membrane 427 as shown. This increases solar trapping and heating of extended surface membrane 424 and thus improves the efficiency of the solar to thermal energy conversion process. Heat that escapes into the zone below reflective membrane 419 is trapped by the air cell below or the extended surface membrane 423 that is constructed more or less as described for membrane 424 and air is heated as it passes through the channels that are formed. Restriction of the rate of airflow through the air channels that are heated by extended surface membrane 421 provides for improvements in achieving the desired temperature for delivery to rotors 440 and 444 as shown. Generally it is desirable to control airflow rates through insulating air channels above membrane 421 at velocities that minimize heat losses to the ambient outside air. Flow rates through all air channels can be adjusted according to available solar and/or geothermal and/or heat rejected by peaking engines and/or base load engines to achieve optimized temperatures at turbines 440 and 444 as shown.

Some commonly produced materials suitable for membranes of embodiments shown in FIGS. 4, 5, and 6 include high temperature, U.V. protected nylon, polyester, various fluoropolymers, and silicones. Where membranes are required to reflect radiation and develop insulative qualities, very thin coatings of aluminum, silver, chromium, nickel, zinc, copper, gold or rhodium and/or materials to provide dichromatic reflection may be utilized. It is generally desired to sandwich reflective surfaces between thin layers of protective polymer. Efficient insulation or blocking of heat transfer can be provided by using 1 to 8 layers of reflective surfaces with clear polymers between each layer.

It is preferred to utilize one or more coatings or provide surface geometry on membranes 404 and/or 406 to increase solar entry transmission at low angles of incoming radiation and to provide membranes 415 and 428 as transparent windows for trapping the solar spectrum entry but serve as a reflector or blocker of longer-wave infrared radiation from below. It is also preferred to provide reflective membrane 421 below membrane 423 for the purpose of preventing heat loss and providing increased heat addition to air in the cell channels formed above 423. Membrane 421 is preferably made of multiple films that have very thin layers of aluminum or similar reflective substances sandwiched between two dielectric layers. This enables very thin vacuum deposited or sputtered layers of mirror bright aluminum to be protected from oxidation and damage.

Cables 402 and 422 preferably provide a support network for membranes such as 404, 406, 410, 420, 421, and 426 including square, parallelogramic and hexagonal patterns similar to a "chicken fence" support network. This provides strong but flexible support and enables such membranes to allow very high solar radiation admission to the energy trap that is supported and enables a large amount of accommodation for thermal contraction and expansion while assuring the ability to withstand and shed large rain or snow loads and high winds. Thus the diameters of the cables in the resulting networks and ultimate tensile strengths may be the same or different to meet strength of materials requirements to span across supports and to withstand virtually any wind condition or heavy snow loading. However, in most instances it is intended that such cable networks are permanent and that relatively inexpensive membranes would be recycled and replaced as needed.

During conditions of relatively low ambient humidity is it preferred to admit air through towers 502 and to add humidity as disclosed for purposes of extracting electricity from turbine generators 490-492. During high ambient humidity conditions it is preferred to admit air into central inlet 510 for motors/compressors 432 and 424 by passage between exhaust towers 443. The hot air rising from towers 443 causes cool air to travel along and parallel to membrane 404 to minimize mixing of rising hot exhaust air with entry air passing between the towers to 510. Cool ambient air thus travels along membranes 404 or 426, around and between towers 22 to enter the inlets for air-handlers 432 and 434 as shown.

Overall energy conversion efficiency is limited by entropy gain and the temperatures delivered by the various heat-gathering and energy conversion systems that comprise some embodiments of the invention. The overall hybrid system operates as a giant heat engine with one or multiple heat sources and energy conversion operations at any instant. On a typical summer day of operation the ambient air at the intake to compressor 432 and/or tower(s) 502 of about 311° K or 38° C. (100° F.) and if the air delivered to turbine(s) 440 is heated to 422° K or 149° C. (300° F.), the Carnot limit of one sub-system for energy conversion efficiency would be:

$$\text{Efficiency}=1-(T_L/T_H) \text{ or } 1-(311/422)=26\% \qquad \text{Equation 3}$$

In the winter, ambient air delivered to compressor 432 might be about 283° K or 10° C. (50° F.) and if the air delivered to turbine(s) 440 is heated to 422° K or 149° C. (300° F.), the Carnot limit to energy conversion efficiency would be:

$$\text{Efficiency}=1-(T_L/T_H) \text{ or } 1-(283/422)=33\% \qquad \text{Equation 4}$$

Solar engine 475 is similarly benefited by cooler conditions for rejecting heat. A typical temperature for heated working fluid within engine 475 is about 1088° K or 815° C. (1500° F.) and if the heat rejection temperature is 311° K or 38° C. (100° F.), the Carnot limit to energy conversion efficiency would be:

$$\text{Efficiency}=1-(T_L/T_H) \text{ or } 1-(311/1088)=71\% \qquad \text{Equation 5}$$

In the winter and at times that water cools heat exchanger 472, heat can be rejected at about 283° K or 10° C. (50° F.) or lower and the Carnot limit to energy conversion efficiency would be improved as shown by Equation 4:

$$\text{Efficiency}=1-(T_L/T_H) \text{ or } 1-(283/1088)=74\% \qquad \text{Equation 6}$$

In instances that the system is utilized for base load supplies of electricity it is preferred to combine solar energy with several other sub-systems that utilize renewable energy resources. Heat engines 460 are preferably fueled with fuels such as hydrogen and/or mixtures of hydrogen and methane or natural gas that are stored or sourced from geothermal formations as previously disclosed and to exhaust the products of combustion into or near the first stage power turbine 440 as shown to effectively increase turbine efficiency. Such heat engines typically have exhaust temperatures of 815° K, 538° C. (1000° F.) or greater and can energize an attached exhaust turbine 462 to drive a generator or compressor. Exhaust, typically between 450 and 600° K, from the attached gas turbine driven by the internal combustion engine's waste heat is still sufficiently warm to substantially increase the temperature achieved by the solar trapping glazing systems of FIGS. 5 and 6.

Table 3 shows the comparative advantage of using such exhaust waste heat to increase the temperature of gases entering power turbine(s) 440.

TABLE 3

SUBSYSTEM CARNOT EFFICIENCY LIMITS

| Turbine Entry Temperature | Exhaust Temperature | Efficiency Limit |
|---|---|---|
| 422° K. or 149° C. (300° F.) | 311° K., 38° C. (100° F.) | 26% |
| 477° K. or 204° C. (400° F.) | 311° K., 38° C. (100° F.) | 34% |
| 533° K. or 260° C. (500° F.) | 311° K., 38° C. (100° F.) | 41% |
| 588° K. or 315° C. (600° F.) | 311° K., 38° C. (100° F.) | 46% |

In addition to increasing the temperature of gases entering turbine 440 and 444 it is preferred to add considerable velocity in the solar heated air column by transfer of the momentum of high velocity gases exiting the internal combustion engines 460 and/or exhaust turbine(s) 462. This increases the torque development, thermal efficiency and thus the output of rotors 440 and 444.

Electricity production in excess of base-load requirements is used to electrolyze water or organic electrolytes in electrolyzer 102 as provided in the copending U.S. patent application Ser. No. 09/969,860. Hydrogen thus produced is stored in suitable containers, in delivery pipelines such as 534 by pressure regulator or turboexpander 536, or in distant or local underground reservoirs 543 as shown. Potential energy in heat and pressurized flow of hydrogen and/or Hy-boost fuels is extracted by turbognerator 537 as shown to deliver the desired pressure drop as needed to operate engines such as 460 as shown. In the alternative such pressure drops are delivered to the expansion stroke of engines as disclosed in the copending patent application disclosures.

In many local and distant hydrogen storage formations it is preferred to provide distribution to and from the formation by a pipe or access perforation that extends through the formation as illustrated by the horizontal extent of access 542 to reservoir storage 543 as shown.

Utilization of on-site and pipeline accessed underground storage of hydrogen enables the use of fuel cells such as reversible electrolyzer 702 in the regenerative mode and/or heat engines including 460, 475, and 481 to be powered by fuel or supplemented with working fluid as needed to meet electricity generation needs. Similarly such hydrogen is the preferred working fluid to cool electrical equipment including generators 492 and 438 along with electrolyzer 702 and various transformers and inverters that are utilized throughout the balance of plant equipment and operations. After performing windage drag reduction for such equipment and cooling it is preferred to use such hydrogen to fuel the heat engines shown.

It is preferred to size pipeline 534 for considerable storage of hydrogen that is produced. During times of low solar gain and at night it is preferred to meet electricity demands by utilizing hydrogen from the pipeline and/or storage reservoir to power engines such as 460, 481 and reversible fuel cell(s) 702. Additional storage is preferably provided by geothermally benefited and/or depleted petroleum formations and by other suitable formations such as salt or limestone caverns.

Virtually every area of North America and every other continent have geological formations that are suitably porous and sealed at a depth sufficient to safely and efficiently store hydrogen. Many of these formations are coincidental with considerable geothermal energy sourcing. Illustratively such formations have stored methane for millions of years in instances that organic materials were deposited at the time of their geological development. In other instances hydrogen has been produced by continental drift induced collision of hot olivine and limestone and stored for millions of years in such formations.

It is preferred to provide engines 460 as rapid start engines that can quickly provide electricity and additional heat to turbines 440 and 444 to improve output as may be needed to meet rapidly increased demand for electricity generation. Another fast response can be provided if needed by direct combustion of hydrogen and/or other fuels in the output of stator(s) 441.

A particularly efficient utilization of solar energy is accomplished by application of solar energy to dissociate hydrocarbons into hydrogen and carbon. Hydrogen can be used as disclosed in heat engines and/or fuel cells to provide shaft work and/or electricity. Carbon provided by the process can be utilized to manufacture durable goods including equipment to harness wind, wave, hydro and solar resources. This includes the invention embodiments disclosed in my copending U.S. Patent applications concerning dissociation of carbon and/or hydrogen donors. In the instance that hydrogen and/or other fuels are utilized in a heat engine or fuel cell at or near the location of embodiment 400 it is preferred to add heat rejected by such energy conversion systems to the air moving through the system at a point that minimizes entropy increase.

In another embodiment the invention reduces entropy gain by addition of solar energy to reduce the electrical energy required for electrolysis. About 18 grams (one gram mole) of water is decomposed by electrical work equivalent to the free energy of formation $\Delta G$ which is 237.13 kJ. This process is endothermic and consumes additional energy equal to ($T\Delta S$) of 48.7 kJ/mol which the work done in expanding the produced hydrogen and oxygen to standard temperature and pressure.

$$\Delta H = \Delta G + T\Delta S \quad \text{Equation 7}$$

$$285.83 \text{ kJ/mol} = 237.13 \text{ kJ/mol} + 48.7 \text{ kJ/mol.} \quad \text{Equation 5.2}$$

Because the dissociation process is endothermic, it is advantageous to add solar energy and/or waste heat from other processes. Such heat addition is particularly advantageous if it elevates the temperature of electrolysis because it reduces the amount of Gibbs free energy ($\Delta G$) that must be provided as electrical work. Thus the total voltage that must be applied is less than required to dissociate water at room temperature.

Assuming that the endothermic energy comes from a waste heat source or the environment, the minimum voltage that must be applied to dissociate water is:

$$\Delta G = -nFE° \quad \text{Equation 8}$$

As this minimum voltage requirement (E°) is dependent upon the change in free energy ($\Delta G$), E° is equivalent to $\Delta G$ divided by the number of electrons exchanged (n) times the Faraday constant (F=9.648×10$^4$) or (nF). As the electrolysis temperature increases above standard temperature of 25° C., the free energy approaches zero as the temperature of electrolysis approaches the temperature that would be produced by and adiabatic stoichiometric combustion reaction.

Increasing the pressure of electrolysis is desirable to produce pressurized hydrogen and oxygen storage at desired density. Increasing the pressure requires higher voltage for electrolysis. Equation 5.4 illustrates the relationship of pressure and voltage requirements. Electrolysis voltage (Ep) can be found by adding the Nernst adjustment for pressure rise to E°.

$$Ep = E° + RT/nF \ln P_{H2}(P_{O2})/P_{H2O} \quad \text{Equation 9}$$

Assuming that the hydrogen and oxygen are produced at the same pressure and the feed water is liquid at the same pressure, Equation 9 is simplified to:

$$Ep = E° + 3RT/4F (\ln P_f/P_{atm}) \quad \text{Equation 10}$$

The increase in voltage to produce 10,000 PSI oxygen and hydrogen from 10,000 PSI water is:

$$3RT/4F \ln P_f/P_{atm} = 3RT/4F \ln 680.3 = 3(8.3144 \text{ J/molK})298K(6.522)/4(9.648\times10^4) = 0.125 \text{ V}$$  Equation 5.

Elevating the temperature to produce steam lowers the voltage required to dissociate water as noted by Nernst and/or Gibbs energy accounting ($\Delta G°_T = \Delta H°_{T(298K)} - T\Delta S°_{298K}$.

Thus the voltage required for dissociation approaches zero as $T\Delta S°_{298K}$ approaches $\Delta H°_{T(298K)}$, which is 285.83 kJ/mol. The change in entropy at standard temperature ($\Delta S°_{298K}$) is 0.1634 kJ/mol, therefore:

285.83kJ/mol/0.1634kJ/mol=1,749K or 1,476° C.(2,689° F.)

As an illustration of hybridization opportunities on nearly every continent for seasonal enhancement of geothermal energy, Table 1 shows that substantial summer energy is available in the longer days and relatively clear-sky conditions such as the Fairbanks area of central Alaska and other northern plains areas compared to warmer areas such as Gainesville, Fla. The Fairbanks area of Alaska and similar areas in Canada receive more solar energy during the long days of sunny summers than eight of the "seemingly warmer" cities of North America as shown.

Figure 7:
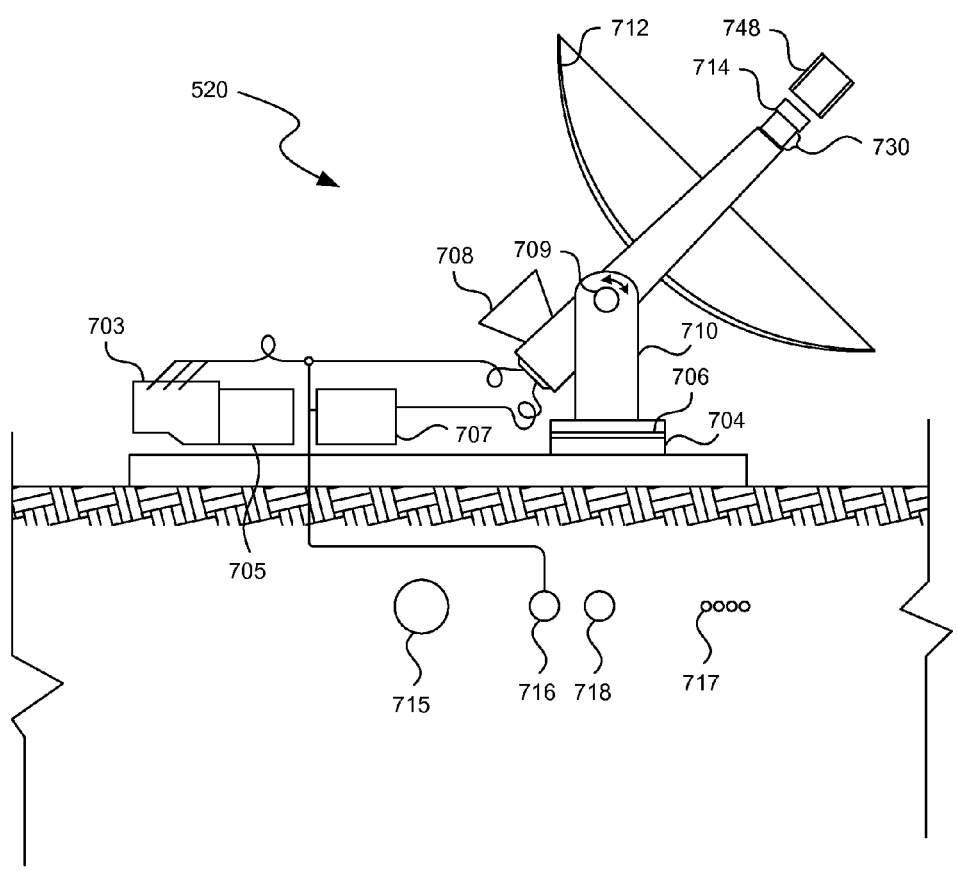
FIG. 7 shows a schematic illustration of an embodiment that is operated in accordance with the principles of the present invention.

FIG. 7 shows an embodiment 522 for solar heat addition to a hydrogen donor such as methane or water supplied by delivery line 530 in the focal point of a parabolic collector 520 to provide for dissociation of such pressurized hydrogen donors at reduced or no voltage. Pressurized hydrogen thus provided is delivered by line 532 for storage and/or delivery by pipeline 534 as shown. In one aspect the electrolyzer, including those disclosed herein can provide the feedstock, including pressurized hydrogen.

FIG. 7 generally shows components of the process circuit including a solar concentrator 520 that tracks the sun to constantly focus the reflected solar energy received by mirror 712 on receiver zone 730 of reactor 714 to produce a high operating temperature. Stationery base 704 houses a drive system and provides transfer of materials to and from reactor 714. Fuels and feedstocks such as landfill methane for reactor 714 are delivered by connection to pipeline 718 and/or 530.

In instances that a fluid feedstock such as sewage components is processed by reactor 714 it is preferably delivered by connection to appropriate pipeline 715. Electricity produced or delivered is transferred by cable group 717. Hydrogen and/or other fluids produced by reactor 714 is delivered to pipeline 716 to geothermal reservoir 543 for local or distant storage and distribution to meet market demands. Stage 706 rotates around a central vertical axis to provide sun tracking of reactor 714, which is assembled with mirror 712 as shown. Coordinated rotation around horizontal axis 709 in support 710 as shown is provided to track the sun and produce point focused solar energy that is reflected from mirror assembly 712. Organic solids and semisolids to be heated are loaded into hopper 708, which feeds such materials into screw conveyer 724 a portion of which is shown in FIG. 8.

Figure 8:
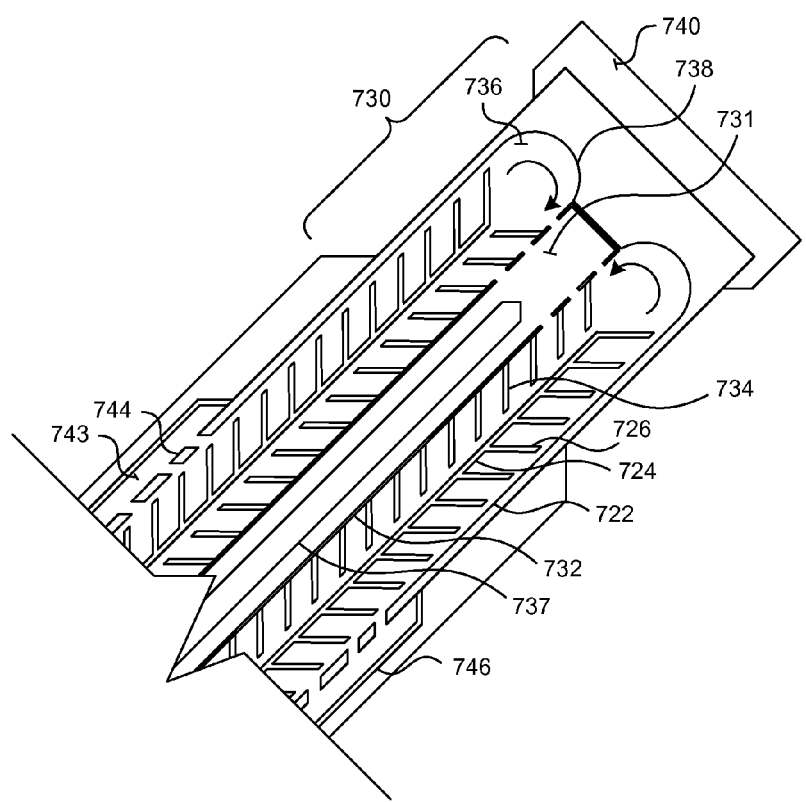
FIG. 8 shows details of an embodiment of FIG. 7.

FIG. 8 shows details of embodiment 720 of receiver 714 including stationery receiver tube 722 and rotary screw conveyer and extruder tube 724 in which integral helical screw flights 726 force reactive ingredients such as organic material into zone 730 where it is rapidly heated to a high temperature by concentrated solar energy. Sufficient concentration of solar energy is readily achieved by parabolic, spherical, or arrayed heliostatic mirrors to produce typical operating temperatures of 500° C. to 2500° C. as allowed by the physical and chemical properties provided by the material and configuration specifications of containment tube 722.

Other forms of renewable heating are readily adapted such as inductive or resistive heating using electricity from a generator powered by falling water, wind, wave action, or by photovoltaic arrays 403 that receive concentrated or non-concentrated solar energy or by solar engine-generator 475 or an internal combustion engine such as 460 using fuel produced by the various operations described herein. Similarly, it is contemplated to combust a portion of the fuel produced by reactor 714 to adequately heat zone 730 for accomplishing the reactions of Equations 11, 12 and 15. This group of alternate heat sources to zone 730 illustrate preferred provisions for supplementation or replacement of solar energy as needed to assure continued operation in case of down time for repairs, intermittent cloud cover, or nightfall.

Supplemental heating or replacement of solar heat for zone 730 by partial combustion of previously produced hydrogen and/or carbon monoxide is preferably accomplished by delivering oxygen through tube 737 from electrolyzer 707 within bore 731 of tube 732. An important synergistic benefit is provided by operation of heat engine 7033 on landfill methane and/or hydrogen and powering electricity generator 705. Any surplus electricity generating capacity can be used to produce oxygen and hydrogen in electrolyzer 707. Hydrogen produced by such operation can readily be stored in pipeline 716 and/or 534 for contract sales and oxygen can be used to greatly improve the process efficiency of heat generation by partial combustion of fuel produced by reactor 714.

Elimination of nitrogen ordinarily supplied by air greatly reduces the cost of hydrogen purification by condensing or filtering water from the gas mixture within tube 732 when oxygen is used to produce heat by partial combustion. Tube 737 delivers oxygen as shown to combust the amount of fuel needed with minimum heat loss and minimum heating of nitrogen which would be present if air is used as an oxidant.

Tube 722 thus performs the functions of containing organic feedstocks in an anaerobic condition and transferring solar energy to biomass that is conveyed into the concentrated flux heating zone 730 to facilitate the following general reactions:

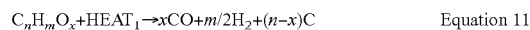

$$C_nH_mO_x + HEAT_1 \rightarrow xCO + m/2H_2 + (n-x)C \quad \text{Equation 11}$$

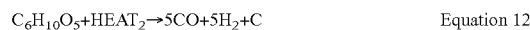

$$C_6H_{10}O_5 + HEAT_2 \rightarrow 5CO + 5H_2 + C \quad \text{Equation 12}$$

Small amounts of $NH_3$, $H_2S$, $N_2$, and $H_2O$ may also be found in the gaseous products with the CO and $H_2$ that are forced by the compacted solids into the center bore 731 of rotary screw tube 732 as shown. $H_2S$ is preferably reacted with iron to form iron sulfide or collected in carbon produced by the process as hydrogen is released. It is preferred to collect fixed nitrogen typically as ammonia and sulfur as iron sulfide and to utilize these substances as soil nutrients along with ash collected by the invention.

Solids such as carbon and ash 736 are extracted from zone 730 by the rotating motion of screw tube 732 along flights 734 as shown. High temperature insulation 740 is preferably used to cover the end of receiver 714 as shown and insulated area 742 provides heat conservation along the countercurrent exchange of heat made between carbon rich solids being extracted by screw conveyer 732 and biomass moving towards the heated zone 730 of the receiver and reactor assembly. During times that solar energy is not available, insulator sleeve 748 is used to cover zone 730 and is preferably supported and guided to and from the stored position shown by telescoping tube guides which are removed to enable illustration of other components as shown.

Water and other gases removed at early stages of compaction and countercurrent pre-heating are preferably vented through louvers or holes 744 to allow extraction through collection tube 746. For many feedstocks such as manure and sewage, this water generally contains fixed nitrogen and other soil nutrients and preferably is utilized to replenish soil tilth and productivity.

In instances that pure carbon and pure hydrogen are preferred, the biomass may be pre-treated to remove ash forming materials such as calcium, magnesium, phosphorus, iron, and other minerals. Ash ingredients of biomass are often wastefully impounded in landfills or allowed to escape to the rivers, lakes and oceans as effluent is dumped from sewage and garbage disposal operations. Some embodiments of the invention provide for ash minerals to be readily collected and returned to useful applications as a soil nutrient. This may be accomplished by a combination of mechanical separation and dissolution of the biomass in a suitable solvent to separate ash components.

As previously disclosed, embodiment 72 provides anaerobic digestion of biomass such as carbohydrates and cellulose according to the following general reactions:

$$n(C_6H_{10}O_5)+nH_2O+HEAT_3 \rightarrow n(C_6H_{12}O_6) \qquad \text{Equation 13}$$

$$n(C_6H_{12}O_6) \rightarrow 3n(CH_4)+3nCO_2+HEAT_4 \qquad \text{Equation 14}$$

Soil nutrients captured in the aqueous liquor remaining after the processes of Equations 13 and 14 are efficiently transferred to depleted soils by various techniques including addition to irrigation water. Carbon dioxide is readily removed from the products of Equation 14 by cooling to produce phase change separation or by adsorption in a suitable solvent such as water. Carbon dioxide is soluble in water to the extent of about 21.6 volumes of gas per volume of water at 25 atmospheres pressure and 12° C. (54° F.). Increasing the pressure and/or decreasing the temperature increases the amount of carbon dioxide dissolved per volume of water. After separation of carbon dioxide from methane, lowering the pressure or increasing the temperature releases dissolved carbon dioxide.

Figure 9:
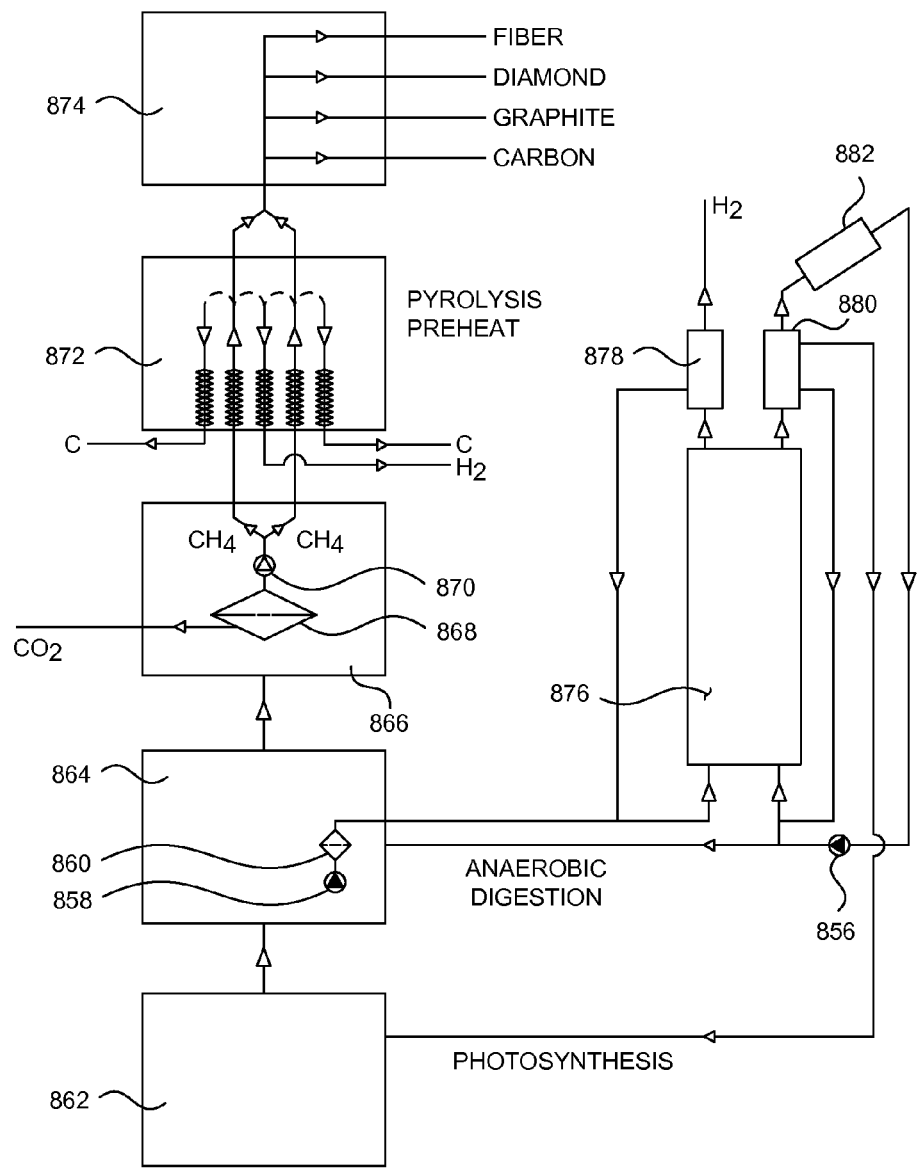
FIG. 9 shows details of processes to accomplish objectives in accordance with the present invention.

FIG. 9 shows a block diagram of process 760 including photosynthesis 762 to produce organic materials, anaerobic dissociation and or digestion 764 to produce methane and carbon dioxide, cooling and phase separation or a pressure swing adsorption system 768 for separating carbon dioxide from methane and/or hydrogen by differential absorption of carbon dioxide within a suitable medium such as water or a hindered amine. Mixed gases including carbon dioxide, methane, nitrogen and other gases are forced into the liquid solution. After removal of methane and other gases that are not absorbed or condensed, the carbon dioxide collected from separation system is preferably utilized to prepare polymer foam insulation and lightweight concrete for construction of energy-efficient dwellings.

Hydrocarbons such as methane added to tube 722 of reactor 720 is decomposed in hot zone 730 to form carbon and release hydrogen as shown by Equation 15:

$$CH_4+HEAT_5 \rightarrow C+2H_2 \qquad \text{Equation 15}$$

Production of carbon by processes characterized by Equation 15 provides a source of carbon for storage or specialization into various forms for enhancing the performance of durable goods and products. Carbon produced from hydrocarbons by the general process of Equation 15 avoids the production of about 3.67 tons of carbon dioxide per ton of carbon that is utilized in such durable goods. Hydrogen that is produced from hydrocarbons by the general process of Equation 15 can be reacted with nitrogen from the atmosphere to form ammonia or with a suitable source of carbon dioxide such as a power plant, brewery, bakery or calcining plant to produce methanol. Such ammonia and methanol thus serve as hydrogen storage substances that provide more hydrogen per volume than cryogenic liquid hydrogen and this embodiment performs as a net carbon dioxide reduction system by avoidance of 3.67 tons of carbon dioxide per ton of carbon collected by processes such as summarized by Equation 15.

Substances such as ammonia and methanol can be injected into geothermal formations at relatively low pressure and after gaining heat are transformed to vapors at considerably higher pressure. This enables much greater return of energy for operations such as described regarding FIGS. 1-6 than the amount of energy that could be obtained by burning the hydrocarbon feedstock of Equation 15. In addition this embodiment provides far more profitable business opportunities along with avoiding more than three tons of carbon dioxide per ton of carbon that is utilized for production of durable goods.

The amount of heat required in the process of Equation 15 to produce a given amount of sequestered carbon is considerably less than the energy required to collect and dissociate carbon dioxide from the atmosphere. The apparatus required to practice the process of Equation 15 is far less involved and much simpler and more rugged than would be required to extract carbon dioxide from the atmosphere and break it into carbon and oxygen. Similarly the amount of energy to produce hydrogen by dissociation of a hydrocarbon such as methane is much less than the requirement to produce hydrogen from water. Such hydrogen can be utilized locally or at great distance including local or distant intermittent storage in one or more geothermal formations such as 86, 176, or 543 along with subsequent expansion in motor-generators 94, 178, or 537 to ultimately fuel combined heat and power (CHP) applications such as 107, 109, 131, 137, and or 460 to provide much greater overall energy utilization efficiency than prior-art conventional approaches.

In the process of converting hydrocarbons including biomass solids and methane into carbon and hydrogen, the products of dissociation reactions such as those shown regarding Equations 11, 12, and 15 tend to occupy more volume than the reactants. Apparatus 720 of assembly 714 for carrying out these endothermic reactions can readily seal the reaction zone 730 with carbon rich material that is compacted by extruder flights 726 along the inlet to zone 730 and with carbon rich material along extruder flights 734 of the outlet of zone 730 so that the hydrogen and other gases passing out through bore 731 may be pressurized to the desired extent and maintained by a rotary union and pressure regulation means on the outlet of bore 731.

It is preferred to pressurize cool methane to the desired delivery pressure of hydrogen from reactor 720 with a suitable pressurization technique before methane entry into reactor 720. If the gases produced in anaerobic digestion are separated by liquefaction, this is readily accomplished by vaporizing the methane to the pressure desired. Pressurization by various pumps and compressors 770 may also be used for this purpose.

Types of carbon that may be produced vary greatly depending upon market demand and the corresponding temperature and pressure at which the process of Equation 15 is accomplished. Methane delivered to manufacturing stage 772 may be processed as needed to produce fibers, carbon black, diamond-like plating on suitable substrate, graphite crystals and in many other forms corresponding to the copending disclosures including those of U.S. patent application Ser. Nos. 08/921,134, now U.S. Pat. No. 6,889,054; Ser. No. 08/921,134, now U.S. Pat. No. 6,015,065, and Ser No. 09/370,431, now U.S. Pat. No. 6,503,584.

It is also contemplated as a heat conservation advantage for certain applications that screw conveyer 732 would be designed as the feed path and preheater with hydrogen being delivered through bore 731 and carbon produced by the reaction in zone 730 conveyed by appropriately designed extruder 724 in countercurrent heat exchange with incoming feedstock. This arrangement provides for countercurrent heating of the incoming feedstock from inside and from the outside before reaching zone 730 by parallel flows of products passing in the opposite direction of feedstock.

Carbon formed by the reaction of Equation 15 is carried by screw conveyer 732 in countercurrent heat exchange with tube 724 to preheat the incoming methane and thus increase the overall efficiency and rate that solar energy completes the process of Equation 15. Hydrogen produced is collected in bore 731 of tube conveyer 732 and heat is removed in countercurrent heat exchange with reactants passing towards zone 730. Renewable hydrogen produced can be used fuel cells or in existing engines that actually clean the air and provide cleaner exhaust than the ambient atmosphere.

Carbon continuously forms a gas-tight seal between conveyer flights 726 and the inner wall of tube 722 as it is produced by the process summarized in Equation 15. This is preferably assured by making the extruder screw flight lead shorter where the greatest compaction is desired. It is generally desired to provide the greatest carbon compaction and sealing effect after the material undergoing conversion to hydrogen passes zone 730 on the outlet in screw conveyer past zone 730.

It is contemplated that conveyance of reactants in processes shown in Equations 11, 12, 15, 16, and 18 would be by numerous other means in addition to screw conveyers as shown. Illustratively biomass could be forced to the reaction zone by a reciprocating plunger in place of screw conveyer 724 and carbon can be extracted from the hot end by other extraction methods including a chain drive conveyer in place of screw conveyer 732.

In instances that it is desired to produce a liquid fuel or vapors of a solvent such as one or more turpenes along with other valuable products, the reaction temperature may be adjusted usually to reduced temperature or the throughput rate of ingredients increased. Useful compounds such as hydrogen, carbon, methanol, and turpentine may be produced and collected in tube bore 731 as summarized in Equation 16 for a portion of a typical biomass waste feedstock with the average compound formula shown:

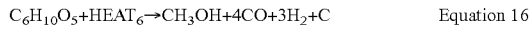

$$C_6H_{10}O_5 + HEAT_6 \rightarrow CH_3OH + 4CO + 3H_2 + C \qquad \text{Equation 16}$$

If a greater yield of liquid fuel and/or solvent is desired, carbon monoxide and hydrogen produced in the typical process of Equation 16 may be reacted, preferably in the presence of a suitable catalyst, to produce additional methanol and hydrogen.

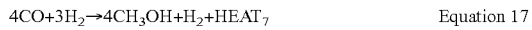

$$4CO + 3H_2 \rightarrow 4CH_3OH + H_2 + HEAT_7 \qquad \text{Equation 17}$$

The rate of biomass travel into zone 730 and the rate of extraction of solid residues by helical conveyer 32 is preferably controlled by a computer that responds to instrumentation of the pressure, temperature, and other indicators of the kind and quality of products in the gas, vapor and solid residue streams.

Carbon monoxide may be decomposed or converted to desired forms of sequestered carbon by disproportionation as shown by the process summarized in Equation 18:

$$2CO \rightarrow C + CO_2 + HEAT_8 \qquad \text{Equation 18}$$

Dissociation or disproportionation as in Equation 18 is exothermic and will proceed under conditions of 10-40 Atmospheres pressure at 500° C. to 800° C.

If market conditions favor hydrogen production for fuel cells or heat engines that clean the air, carbon monoxide can be reacted with steam in an exothermic reaction to produce hydrogen as shown in Equation 19:

$$CO + H_2O \rightarrow CO_2 + H_2 + HEAT_9 \qquad \text{Equation 19}$$

Figure 10:
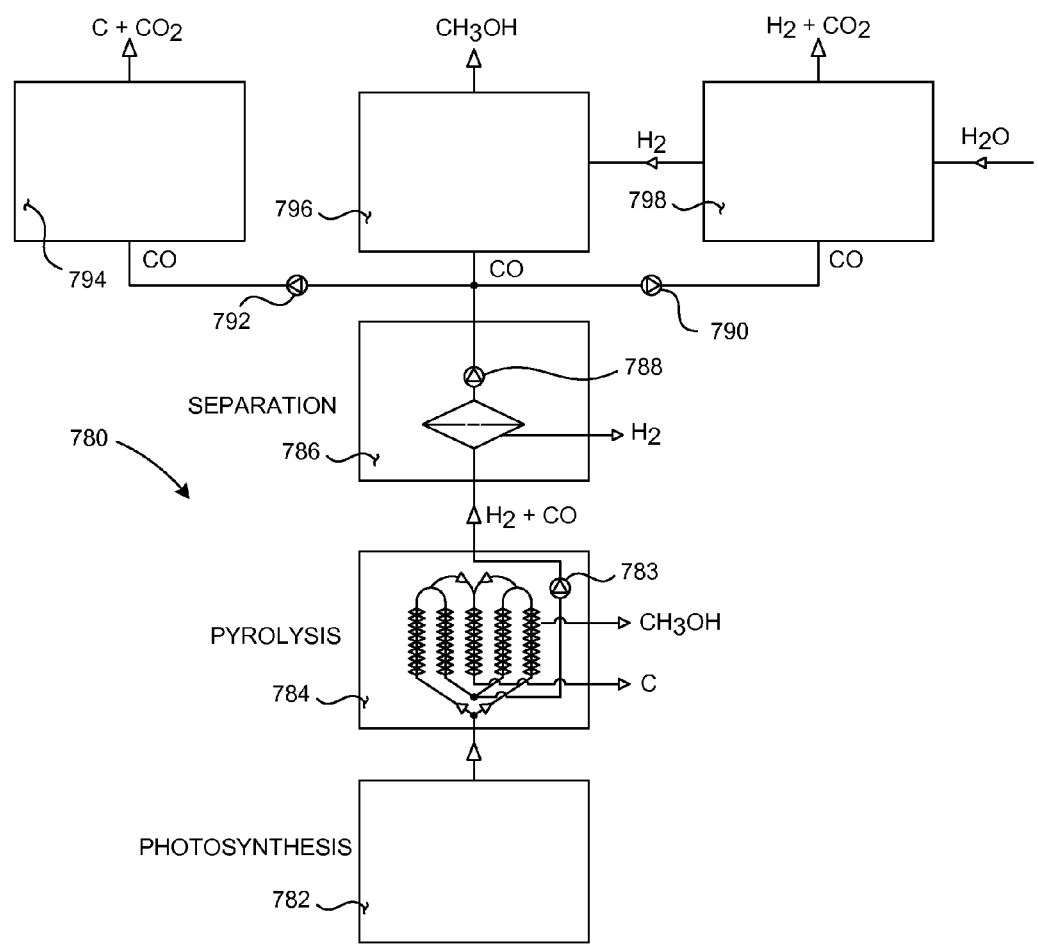
FIG. 10 illustrates processes operations in accordance with the present invention.

Carbon monoxide produced by the processes summarized in Equations 11 and 12 can be converted into numerous products to meet market demand as selected from processes requiring hydrogen and/or carbon production as illustrated in FIGS. 9 and 10. It is preferred to utilize heat released by the processes of Equations 17, 18, and 19 as part of the heat additions needed for endothermic reactions like the processes of Equations 12, 15 and 16.

FIG. 10 shows the preferred process steps for producing valuable fuels, solvents, chemical precursors, and a wide variety of sequestered carbon products starting with photosynthesis through which organic feedstocks such as manure, garbage and sewage are produced as denoted in 782 and converted by countercurrent regenerative preheating and anaerobic pyrolysis to carbon-rich residues and fluids such as methanol, hydrogen, and carbon monoxide in the process depicted as 784 preferably by the embodiment disclosed regarding FIGS. 7 and 8.

Gases such as hydrogen and carbon monoxide produced by anaerobic pyrolysis are delivered by pump 783 and separated to produce the desired degree of purification in 786. Pump 788 delivers carbon monoxide to be appropriately proportioned by metering pumps 790 and 792 and further converted into a wide variety of products such as those depicted in processes 794, 796, and 798.

In process 794 Heat$_8$ is produced as carbon monoxide dissociates into carbon and carbon dioxide. In process 796 Heat$_7$ is released as carbon monoxide is combined with hydrogen to produce methanol. Process 798 reacts steam with carbon monoxide in an exothermic reaction to produce hydrogen and carbon dioxide. Heat released by these exothermic processes is utilized to produce steam used in process 798, to dry biomass feedstocks before additional heat is provided in process 784, for heating anaerobic digester 764 to increase the rate of methane and/or hydrogen production, in process 772, and for many other useful purposes.

Thus some embodiments of the invention offer a practical process for sequestration of carbon from the atmosphere consisting of photosynthesis, collection of photosynthesized biomass, and heating the biomass to yield products selected from the group including carbon, hydrogen, methanol, turpenes, and ash. Biomass wastes that are ordinarily allowed to rot into the atmosphere and which contribute to carbon dioxide and/or methane buildup can now be utilized to efficiently produce hydrogen, carbon and soil nutrients. Practical systems with thermodynamic and thermochemical advantages extract carbon and or hydrogen from a hydrogen and or carbon donor compound and provide for such hydrogen to be utilized in one or more local subsystem applications or at considerable distance after one or more occasions of intermittent storage in one or more geothermal formations. Such hydrogen excels in facilitating heat exchanges and expansion in one or more expansion motors prior to ultimately being utilized in a fuel cell or combusted by internal combustion engines, external combustion engines, combined cycle heat engines, and/or in combined heat and power applications.

A disturbing trend of warming the air and soil has developed in zones of the Earth's surface that have previously stored organic substances in swamps, lakes, on the ocean floors, as frozen components of polar ice masses, tundra, and permafrost. Such deposits particularly including methane hydrates and organic materials preserved in ice and frozen organic deposits may in places be 2000 feet deep and have been estimated to contain far more carbon than all the carbon presently in deeper deposits of coal, oil and natural gas. Even relatively small conversions of such organic carbon sources into releases of carbon dioxide or methane would more than double the concentration of carbon substances in the global atmosphere.

Global warming produced by millions of tons of carbon dioxide, methane, and other greenhouse gases that are being released each year is warming the planet's permafrost and enabling bacteria and other microorganisms to convert the organic contents into products such as methane and carbon dioxide along with other greenhouse gases and releases of phosphates and nitrates.

Illustratively, natural habitats are threatened by quick growths of plant species that die and cause waters that previously supported fish to be anaerobic dead zones. Losses of fisheries due to such sediments from melting of sea ice and thawing permafrost exacerbate erosion of costal areas cause villages to be abandoned or moved.

Figure 11:
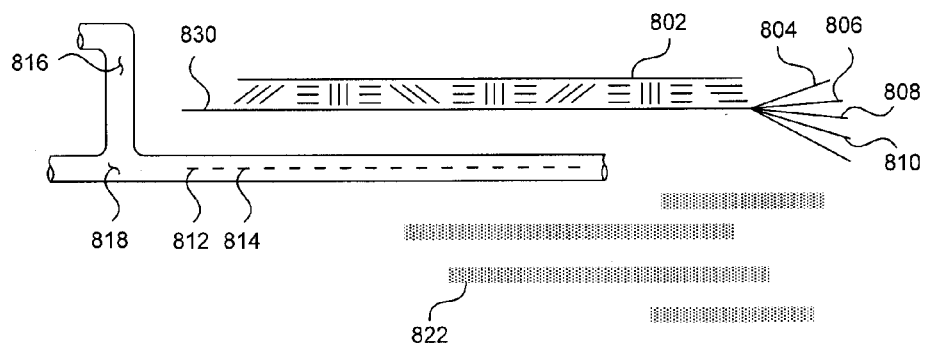
FIG. 11 shows processes in accordance with the purpose of the present invention.

FIG. 11 shows an embodiment 800 may be employed on a large area of the ocean floor to collect methane from anaerobic production of methane or that provides for collection of methane and carbon dioxide from thawing permafrost by porosity or perforations 814 in pipes 812 that are beneath an impervious membrane 830 that may have one or more layers such as 810 that in some applications may be metalized to provide reflectivity of radiation at selected wavelengths. Membrane 830 may include multiple layers of insulating material such as polymer films and each layer may include suitable reflective coatings or films such as aluminum, silver, chromium, zinc or diachromatic reflective coatings to control the passage of radiation. In other applications membrane 830 may facilitate radiative transfer for purposes such as allowing rejection of heat to night sky conditions or to gain radiation for adding heat to the materials contained below membrane 830.

Figure 12:
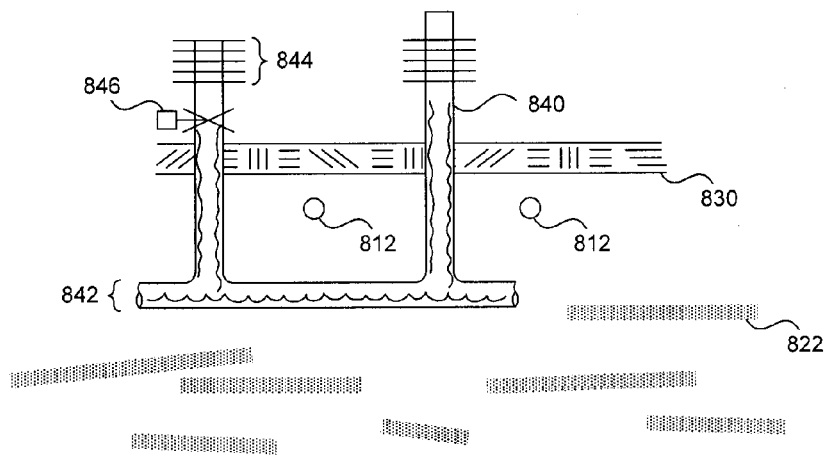
FIG. 12 schematically illustrates embodiments of the present invention.

Heat pipes such as 840 may be utilized to move heat from below membrane 830 to the surface for purposes of removing heat and preserving the permafrost 822 that is below membrane 830 as shown in FIG. 12. Heat is transferred or removed as a suitable liquid is evaporated in zone 842 and the evaporant condenses in zone 844 to release heat to the ambient. Condensate produced in zone 844 drains to zone 842 to remove more heat by evaporation as the cycle continues. Thus when the ambient temperature in zone 844 is below the temperature in zone 842 heat is removed to the surface. When the temperature in zone 844 is equal or exceeds the temperature in zone 842 heat pipe 840 stands by until conditions conducive for continued heat transfer develop. Modulation of the rate of heat removal may be provided by operation of valves such as 846 to control thermal expansion or contraction in zones such as roadways over permafrost 822 to prevent road damage due to heaving or gas pockets that destroy roadways.

In operation a top layer of snow, gravel, dirt, or soil 802 may be utilized to hold membrane 830 in place and or to protect it from penetration by passing caraboo or other surface traffic. Methane that is released from the zone below membrane 830 may be collected and processed by equipment that performs the steps such as the illustrative procedures summarized in Equations 20, 21 and 22.

$$CH_4 + Heat \rightarrow C + 2H_2 \quad \text{Equation 20}$$

$$CH_4 + C \rightarrow C_2H_4 \quad \text{Equation 21}$$

$$nC_2H_4 \rightarrow (C_2H_4)n \quad \text{Equation 22}$$

Methane is collected and dissociated to produce carbon and hydrogen. Such hydrogen may be used to store energy and or in a suitable energy conversion process to produce power for operation of equipment that performs the processes summarized in Equations 21 and 22. Carbon provided by the process of Equation 20 may be reacted with methane to produce ethylene as shown that is polymerized to produce dense storage of carbon or as various polymers that may be suitable for production of pipe, fittings and valves that are utilized in the present processes.

In other aspects, storage of energy as potential energy of various forms such as thermal, chemical, pressure, and height in a suitable geological formation can provide numerous advantages including interaction with the formation to increase the temperature, pressure, and chemical potential of stored substances. This enables an energy conversion system that subjects one or more substances of a fluid to a geological formation for purposes including storage of chemical potential energy, storage of pressure potential energy, storage of chemical and pressure potential energy, heat transfer from the formation to such fluid, transfer of substances from said formation to such fluid, and production of substances from said formation as a result of the presence of said fluid.

This further enables work production by at least one of the substances in one or more energy conversion devices wherein at least one of the fluid substances is conditioned to provide a state such as liquid, mixed liquid and vapor, vapor, or gas that is delivered to drive appropriate energy conversion devices.

In geological formations that contain hydrocarbons, the system can provide substances that generally or specifically extract one or more types of hydrocarbons from the geological formation.

The working fluid can be further heated by solar or heat rejected from industrial, commercial, fuel cell and heat engine sources whereby one or more fluid substances receives supplemental heat from transfers from solar, industrial, commercial, fuel cells and heat engine sources.

Developing and conditioning the working fluid at a considerable height increases the process efficiency. The height develops a pressure head and more kinetic energy of the falling working fluid. This enables one or more fluid substances to be provided or produced at an altitude such as a wind turbine tower, a hill or other topographical feature at elevated altitude, a communication tower, and an erected tower including instances in which the fluid rises to the altitude as a vapor or gas and after condensation serves as a liquid that falls to gain kinetic energy that is harnessed by a suitable motor.

The fluid or working fluid can be produced by extracting the hydrogen, carbon dioxide, carbon monoxide, methane, etc. through a variety of processes. The conditioning involves converting the working fluid into the desired state. This enables a process for producing and conditioning a fluid including a process such as catalytic release from an anaerobic digester liquor, electrolytic production from a compound containing hydrogen, and combined electrical and catalytic impetus of working fluid production from anaerobic digester liquor. This enables sewage, garbage, farm wastes and forest slash to be converted into working fluid constituents that may be stored in a geological formation for the purpose increasing energy security and enabling dispatchable energy conversion on demand. The working fluid may be delivered to a geological formation for purposes such as storage of chemical potential energy, storage of pressure potential energy, storage of chemical and pressure potential energy, heat transfer from said formation to such fluid, transfer of substances from such formation to such fluid, and production of substances from the formation as a result of the presence of such fluid. The working fluid can be comprised of hydrogen, carbon dioxide, or hydrogen and carbon dioxide mixtures or methane, or it may be comprised of other selections such as those illustratively listed in Table 2. This enables a process for combined storage, delivery of a substance, and production of work production by at least one fluid substance in one or more energy conversion devices wherein at least one of the fluid substances is conditioned to provide a state such as liquid, mixed liquid and vapor, vapor, or gas that is delivered to drive the energy conversion devices.

The system may develop a working fluid that it delivers it to operate or drive an energy conversion device followed by utilization of heat supplied by or stored in a geological formation including surface, near surface or deeper strata to condition the working fluid for purposes such as providing further energy conversion steps and supporting or nourishing a variety of plant types.

Further the system may store and or produce and utilize geothermal heat to develop and deliver conditioned fluid such as carbon dioxide, methane, and hydrogen for a purpose such as increasing the temperature and supplying carbon dioxide for aqueous plant production including types selected for fuel, chemical extraction, and food production purposes, greenhouse plant production, a hydroponics plant production.

This system provides for the extraction of hydrogen or fluid fuels from organic materials and is economically more efficient because it takes less energy to make polymers from selected crops compared to the replacement of fossil petrochemical substances. Such systems also enable the return of fixed nitrogen and trace minerals to the soil of farming, landscaping and other agricultural operations.

In another aspect the system includes converting organic material into one or more fluid substances such as methane, ethane, propane, methanol, ethanol, hydrogen, hydrogen sulfide, carbon monoxide, and carbon dioxide to provide an effective economic development engine that incorporates farm practices to produce value added activities for agriculture. This can overcome the overcome the inefficient practice of delivering one calorie of edible substance at the expenditure of more than ten petroleum calories to plant, fertilize, cultivate, harvest, and process such edibles.

Another embodiment provides for collection and storage of rainwater to produce crops, provide evaporative cooling and humidification benefits in energy conversion processes.

Another embodiment provides a system that separates selected constituents of fluid substances by selective removals by suitable filters, pressure swing absorption, temperature swing absorption, solution absorption, and membrane separation and includes such selective removals to return fixed nitrogen and or trace minerals to agricultural operations or selective removal of chemical substances for value added applications.

Another embodiment provides a system that provides extraction of hydrogen or fuel fluids from an organic material by use of heat for thermal dissociation and stores such extracted substance in a geological formation.

Another embodiment provides a system that provides counter current heat exchange for converting organic material into one or more fluid substances that are derived by endothermic processes utilizing heat sources such as combustion of a portion of one or more said fluid substances, solar heating, electrical heating, and heat exchange with an energy conversion device such as an internal combustion engine, an external combustion engine, an expansion motor, and a fuel cell.

Another embodiment provides a system in which organic material is converted into a fluid substance such as hydrogen and or a fluid hydrocarbon for energy conversion operations and carbon is extracted for manufacturing and production of durable goods to prevent such carbon from entering the environment as a constituent of pollution.

An improvement of the system above includes the conversion is done at site where the organic materials collected at one site and the fluid substance is transported to another site to have the carbon extracted.

In another embodiment said organic materials are converted into said fluid substances at a location where said organic materials are plentiful and one or more of said fluids are transported to locations where carbon is separated from one or more of said fluids to produce solid products for purposes of preventing said carbon from entering the atmosphere as a gaseous compound. Heat exchange is used to dry the organic materials prior to conversion into the fluid substances. Sources of the heat exchange include combustion of the fluid substances, high temperature of fluid substances, and an energy conversion device such as an engine or fuel cell.

In an aspect of this embodiment said organic materials are dried prior to conversion into said fluid substances by countercurrent heat exchange from sources selected from combustion of a portion of one or more of said fluid substances, one or more of said fluid substances after being produced at a temperature higher than said organic material, one or more said fluid substances after being heated to a temperature higher than said organic material, and heat exchange with an energy conversion device selected from the group including an internal combustion engine, an external combustion engine, an expansion motor, and a fuel cell.

Another aspect of this embodiment includes pressurization of said fluid substances by one or more processes selected from the group including compaction by compaction by a screw conveyer, compaction by a ram, and phase change from a solid to a more voluminous fluid.

Another embodiment provides a system for countercurrent heat exchange comprising a hydrogen donor exchanging heat with the products of dissociation of said hydrogen donor. In an aspect of this embodiment dissociation is caused by heat selected from the population of sources comprised of trapped solar heat, concentrated solar heat, combustion heat, geological formation heat, rejected heat from a noncombustion source.

Another embodiment provides extracting carbon or hydrogen from a carbon or hydrogen donor compound wherein said hydrogen is utilized in one or more subsystem applications locally or at a distance after one or more occasions of intermittent storage in one or more geologic formations. In an aspect of this embodiment said hydrogen performs expansion in one or more expansion means prior to ultimately being utilized in a fuel cell or combusted by means selected from the group comprised of internal combustion engine, external combustion engine, combined cycle heat engine, and means for combined heat and power applications.

Another embodiment provides a catalyst aided release of hydrogen from a substance prepared by action of microorganisms on biomass. In an aspect of this embodiment said catalyst is organic. Another aspect of this embodiment includes an impetus selected from the group including radioactive, vibrational, electromotive, and magnetic force is utilized in conjunction with said catalyst.

Another embodiment provides an energy conversion apparatus comprising elements as described herein, including features associated with wind column updrafts and downdrafts, wells, geologic formations, pipelines, watershed collection and polymer material. In an aspect of this embodiment the apparatus supports varied micro-climate zones; and said zones further comprise sub-zones; and said sub-zones that contain unique thermal, humidity, natural resources, or energy transfer characteristics that can be manipulated for work.

Another embodiment provides a sustainable economic development engine system comprising: a method for economic incentives that increase productivity; a method for removing disincentives that decrease productivity; a method for creating jobs in plant husbandry, manufacturing, energy production, information and energy management; and a method for implementing a macro-economic algorithm of sustainability Another embodiment provides a farming process comprising a method to improve crop yields by decreasing the cost of energy used to produce crops; a method to decrease the need for fertilizers by returning trace minerals to the soil; a method of fertilizing crops with algae; a system for water management; a system for energy production and management; and the use of CO2 to increase crop potential.

Another embodiment provides a system for raising crops in a micro climate that can be enclosed as necessary or monitored access to the environment to add air (up/down draft) or precipitation; and a macro food production system to harvest the crop waste (stem, stalk, stover) into carbon or hydrogen.

Another embodiment provides a fish spawning system comprising: a method to provide nutrients, oxygen, and clean water for supporting fish spawning; a system for monitoring and controlling temperature to support environment; and a system to extract protein, carbohydrates, fat, vitamins, minerals from biomass/liquor as nutrition for fish.

Another embodiment provides a poultry, swine, bovine (animal husbandry) system comprising: a system to raise animals in a controlled environment; and a system for raising feed crops without pesticides or fertilizers; and a water management system to purify water by extraction of hydrogen from acid rain and other sources of acidified water including water conditioned to an acidified state by reducing agents.

Another embodiment provides a process for energy conversion comprising the steps of subjecting one or more fluid substances to a geological formation for purposes selected from the group comprised of heat gain, intermittent storage of chemical and or pressure energy, and extraction of valuable substances from said formation wherein work production is accomplished by at least one of said one or more fluid substances in one or more energy conversion devices, wherein at least one of said one or more fluid substances is conditioned to provide a state selected from the group consisting of liquid, mixed liquid and vapor, vapor, or gas that is delivered to drive said one or more energy conversion devices. Another aspect of this embodiment includes wherein said geological formation contains hydrocarbons. Another aspect of this embodiment includes wherein after subjecting one or more fluid substances to a geological formation said one or more fluid substances receives supplemental heat from sources selected from the group comprised of solar, industrial, commercial and heat engine sources. Another aspect of this embodiment includes wherein said liquid is produced at an altitude provided by an embodiment selected from the group comprised of a wind turbine tower, a hill or other topographical feature at elevated altitude, a communication tower, and an erected tower.

Another embodiment provides a process for producing and conditioning a fluid by a process selected from the group comprised catalytic release from an anaerobic digestion liquor, electrolytic production from a compound containing hydrogen, combined electrical and catalytic impetus of working fluid production from anaerobic digestion liquor. Another aspect of this embodiment includes said fluid is selected from the group comprised of hydrogen, carbon dioxide, hydrogen and carbon dioxide. Another aspect of this embodiment includes wherein said fluid is delivered to a geological formation for purposes selected from the group comprised of storage of chemical potential energy, storage of pressure potential energy, storage of chemical and pressure potential energy, heat transfer from said formation to said fluid, transfer of substances from said formation to said fluid and production of substances from said formation as a result of the presence of said fluid. Another aspect of this embodiment includes said fluid is used to propel an energy conversion device.

Another embodiment provides a process for producing and utilizing geothermal heat to develop, and deliver fluids selected from the group comprised of carbon dioxide, methane, and hydrogen for a purpose selected from a group comprised of an aqueous plant production, a greenhouse plant production, a hydroponics plant production and use as the working fluid for operation of one or more energy conversion devices. Another aspect of this embodiment includes said aqueous plant is selected from the group comprised of algae.

Another embodiment provides a system for converting organic materials into one or more fluid substances selected from the group including methane, ethane, propane, methanol, ethanol, hydrogen, hydrogen sulfide, carbon monoxide, and carbon dioxide wherein removal of a portion of said substances selected from the group including hydrogen sulfide, carbon monoxide, and carbon dioxide is accomplished by a selective removal process selected from the group including pressure swing absorption, temperature swing absorption, solution absorption, and membrane separation, and wherein said process for conversion of organic material into fluids is accomplished with countercurrent heat exchange from sources selected from combustion of a portion of one or more of said substances, one or more of said substances after being produced at a temperature higher than said organic material, one or more of said substances after being heated to a temperature higher than said organic material, and heat exchange with an energy conversion device selected from the group including an internal combustion engine, an external combustion engine, an expansive motor, and a fuel cell. Another aspect of this embodiment includes said energy conversion device utilizes a substance selected from said fluid substances. Another aspect of this embodiment includes said organic materials are converted into said fluid substances and carbon is sequestered from one or more of said substances to produce solid products for purposes of preventing such carbon from entering the atmosphere as a gaseous compound. Another aspect of this embodiment includes said organic materials are converted into said fluid substances at a location where such organic materials are plentiful and one or more of said fluids are transported to locations where carbon is sequestered from one or more of said fluids to produce solid products for purposes of preventing such carbon from entering the atmosphere as a gaseous compound. Another aspect of this embodiment includes said organic materials are dried prior to conversion into said fluid substances by countercurrent heat exchange from sources selected from combustion of a portion of one or more of said fluid substances, one or more of said fluid substances after being produced at a temperature higher than said organic material, one or more said fluid substances after being heated to a temperature higher than said organic material, and heat exchange with an energy conversion device selected from the group including an internal combustion engine, an external combustion engine, an expansion motor, and a fuel cell. Another aspect of this embodiment includes pressurization of said fluid substances by one or more processes selected from the group including compaction by compaction by a screw conveyer, compaction by a ram, and phase change from a solid to a more voluminous fluid.

Another embodiment provides a process for operation of an internal combustion engine means in which a fluid fuel is introduced into said engine at times controlled by a normally closed valve means that is actuated by a mechanical motion means that occurs at a frequency equivalent to the power production event in said engine wherein said fuel introduction is controlled to accomplish tasks selected from the group including idle of the engine, power production that exceeds idle conditions, full power production. Another aspect of this embodiment includes said valve means is controlled by a means selected from the group including an electromagnetic means that is operable before said actuation by a mechanical motion means, an electromagnetic means that is operable during said actuation by a mechanical motion means, after said actuation by an electromotive means wherein said electromotive means is selected from the group including an electromagnetic solenoid, a piezoelectric device, a magnetic fluid device. Another aspect of this embodiment includes said valve means is actuated by said mechanical motion means provided by a process means selected from the group including a rotary cam means, a rotary cam means coupled with mechanical push-rod means to enable substantial separation of said valve means from said cam means, a rotary cam means coupled to rocker arm means that actuates said normally closed valve means to enable substantial separation of said valve means from said cam means. Another aspect of this embodiment includes said fuel is introduced into locations and according to conditions selected from the group including a combustion chamber means after said combustion chamber means has been closed in preparation for combustion, said combustion chamber means at a site that ignition occurs by spark ignition means, said combustion chamber means at a site that ignition by catalytic ignition means occurs, the combustion chamber means at a site in which ignition by thermal ignition means occurs, a location selected for the purpose of utilizing the momentum of said fuel to induce enhanced flow of gaseous oxidant into said combustion chamber means.

Another embodiment provides a process for operation of an internal combustion engine in which a fluid fuel is introduced into a combustion chamber means of said engine by means that distributes said fuel to locations within a gaseous oxidant to provide conditions selected from the following: distribution of said fuel within said oxidant that is in surplus of the amount that can be chemically combined with said fuel, distribution to of said fuel within said oxidant so as to complete combustion of said fuel with said oxidant before said fuel contacts any solid surface that defines said combustion chamber in addition to said fuel introduction means, and distribution by said fuel introduction means to asymmetric locations within said combustion chamber.

Another embodiment provides a system for countercurrent heat exchange by a hydrogen donor and products of dissociation of said hydrogen donor. Another aspect of this embodiment includes dissociation is caused by heat selected from the population of sources comprised of trapped solar heat, concentrated solar heat, combustion heat, geological formation heat, rejected heat from a noncombustion source.

Another embodiment provides an extraction system comprising: extracting carbon or hydrogen from a carbon or hydrogen donor compound wherein said hydrogen is utilized in one or more subsystem applications locally or at a distance after one or more occasions of intermittent storage in one or more geologic formations. Another aspect of this embodiment includes said hydrogen performs expansion in one or more expansion means prior to ultimately being utilized in a fuel cell or combusted by means selected from the group comprised of internal combustion engine, external combustion engine, combined cycle heat engine, and means for combined heat and power applications.

Another embodiment provides a hydrogen release system comprising: a catalyst aided release of hydrogen from substances prepared by action of microorganisms on biomass. Another aspect of this embodiment includes said catalyst is organic. Another aspect of this embodiment includes an impetus selected from the group including radioactive, vibrational, electromotive, and magnetic force is utilized in conjunction with said catalyst.

Another embodiment provides an energy conversion apparatus comprising elements as described herein, including features associated with wind column updrafts and downdrafts, wells, geologic formations, pipelines, watershed collection, and polymer material. Another aspect of this embodiment includes said apparatus supports varied micro-climate zones; and said zones further comprise sub-zones; and said sub-zones that contain unique thermal, humidity, natural resources, or energy transfer characteristics that can be manipulated for work.

Another embodiment provides a sustainable economic development engine system comprising: a method for economic incentives that increase productivity; a method for removing disincentives that decrease productivity; a method for creating jobs in plant husbandry, manufacturing, energy production, information and energy management; and a method for implementing a macro-economic algorithm of sustainability; farming within microclimates (man-made) communities (cities that are sustainable); farm equipment from carbon extracted; and health benefits.

Another embodiment provides a farming process comprising: a method to improve crop yields by decreasing the cost of energy used to produce crops; a method to decrease the need for fertilizers by returning trace minerals to the soil; a method of fertilizing crops with algae; a system for water management; a system for energy production and management; CO2 to increase crop potential; a system for raising crops in a micro climate that can be enclosed as necessary or monitored access to the environment to add air (up/down draft) or precipitation; a macro food production system to harvest the crop waste (stem, stalk, stover) into carbon or hydrogen.

Another embodiment provides a fish spawning system comprising: a method to provide nutrients, oxygen, and clean water for supporting fish spawning; a system for monitoring and controlling temperature to support environment; and a system to extract protein, carbohydrates, fat, vitamins, minerals from biomass/liquor as nutrition for fish.

Another embodiment provides a poultry, swine, bovine (animal husbandry) system comprising: a system to raise animals in a controlled environment; a system for raising feed crops without pesticides or fertilizers; water management system to purify water by extraction of hydrogen from acid rain and other sources of acidified water including water conditioned to an acidified state by reducing agents a system for utilizing drip irrigation of crops.

Another embodiment provides a water management system comprising: a system to purify water, a method of neutralizing and purifying acid rain; a method to extract hydrogen from acid rain; a system for utilizing drip lines with crop.

In another aspect, a method for sustainable economic development comprising a means for conversion of solar, wind, moving water, organic or geothermal resources into electricity, hydrogen, compounds containing hydrogen, or compounds containing carbon wherein said carbon is utilized to produce durable goods means, equipment means to enable said conversion, or transportation component means. The method can further include a means for adding, storing, and distributing said hydrogen or said compounds containing hydrogen or said compounds containing carbon in natural gas pipeline means and for storing said hydrogen or said compounds containing hydrogen or said compounds containing carbon in petroleum geological formation means or in other geological formation means. The method can further include a means for removing, adding, storing, and distributing substances from said petroleum geological formation means or other geological formation means along with said hydrogen or said compounds containing hydrogen or said compounds containing carbon. In another aspect, the method can further include a means for removing heat from said petroleum geological formation means or other geological formation means along with said hydrogen or said compounds containing hydrogen or said compounds containing carbon. In another aspect, the method can further include a means for conversion of said heat from said petroleum geological formation means or other geological formation means into motive work. The method can further include a means for combining the conversion of solar, wind, moving water, organic or geothermal resources into electricity, hydrogen, compounds containing hydrogen, or compounds with conversion of said heat from said petroleum geological formation means or other geological formation means into motive work. The method can further include a means for conversion of said solar energy into biomass means selected from the group including food means, fiber means, fuel means, and feedstock means for manufacturing means.

The following embodiments disclose an electrolyzer for use in the above embodiments.

In one embodiment of the present invention an electrolytic cell is provided comprising a containment vessel; a first electrode; a second electrode; a source of electrical current in electrical communication with the first electrode and the second electrode; an electrolyte in fluid communication with the first electrode and the second electrode; a gas, wherein the gas is formed during electrolysis at or near the first electrode; and a separator; wherein the separator includes an inclined surface to direct flow of the electrolyte and the gas due to a difference between density of the electrolyte and the combined density of the electrolyte and the gas such that the gas substantially flows in a direction distal to the second electrode.

In another embodiment, an electrolytic cell is provided comprising a containment vessel; a first electrode; a second electrode; a source of electrical current in electrical communication with the first electrode and the second electrode; an electrolyte in fluid communication with the first electrode and the second electrode; a gas, wherein the gas is formed during electrolysis at or near the first electrode; a gas extraction area; and a separator wherein separator comprises two inclined surfaces forming a "V" shape; wherein the separator directs flow of the electrolyte and the gas due to a difference between density of the electrolyte and the combined density of the electrolyte and the gas such that the gas substantially flows in a direction distal to the second electrode, and wherein the separator is further configured to promote circulation of the electrolyte between the first electrode, the gas extraction area, and the second electrode to provide fresh electrolyte to the first electrode and the second electrode.

In yet another embodiment, an electrolytic cell is provided comprising a containment vessel; a first electrode; a second electrode; a source of electrical current in electrical communication with the first electrode and the second electrode; an electrolyte in fluid communication with the first electrode and the second electrode; a gas, wherein the gas is formed during electrolysis at or near the first electrode; and a separator; wherein the separator includes an inclined surface to direct flow of the electrolyte and the gas due to a difference between density of the electrolyte and the combined density of the electrolyte and the gas such that the gas substantially flows in a direction distal to the second electrode.

In another embodiment, an electrolytic cell and method of use is provided. While the electrolytic cell may be used in many applications, it is described in this embodiment for use in the production of hydrogen and oxygen. An electrolytic cell according to the present embodiment provides for reversible separated production of pressurized hydrogen and oxygen and tolerates impurities and products of operation. The embodiment further provides the option for operating an electrolysis process which comprises the steps of supplying a substance to be dissociated that is pressurized to a much lower magnitude than desired for compact storage, applying an electromotive force between electrodes to produce fluid products that have less density than the substance that is dissociated and restricting expansion of the less dense fluid products until the desired pressure for compact storage is achieved. This and other embodiments can improve the energy utilization efficiency of dwellings such as homes, restaurants, hotels, hospitals, canneries, and other business facilities by operation of heat engines or fuel cells and to utilize heat from such sources to cook food, sterilize water and deliver heat to other substances, provide space heating or to facilitate anaerobic or electrically induced releases of fuel for such engines or fuel cells. Moreover, one skilled in the art will appreciate that aspects of the embodiments disclosed herein can apply to other types of electrochemical cells to provide similar advantages.

Contrary to conventional electrochemical electrodes which depend largely upon relatively slow diffusion, convection, and concentration gradient processes to produce mass transport and/or deliver ions for production of desired constituents, the present embodiment provides more efficient mass transport including rapid ion replenishment processes and deliveries to desired electrodes by pumping actions of low-density gases escaping from a denser liquid medium as described herein. This assures greater electrical efficiency, more rapid dissociation, and greater separation efficiency along with prevention of undesirable side reactions. Increasing the rate and efficiency of ion production and delivery to electrodes increases the system efficiency and current limit per electrode area.

Figure 13:
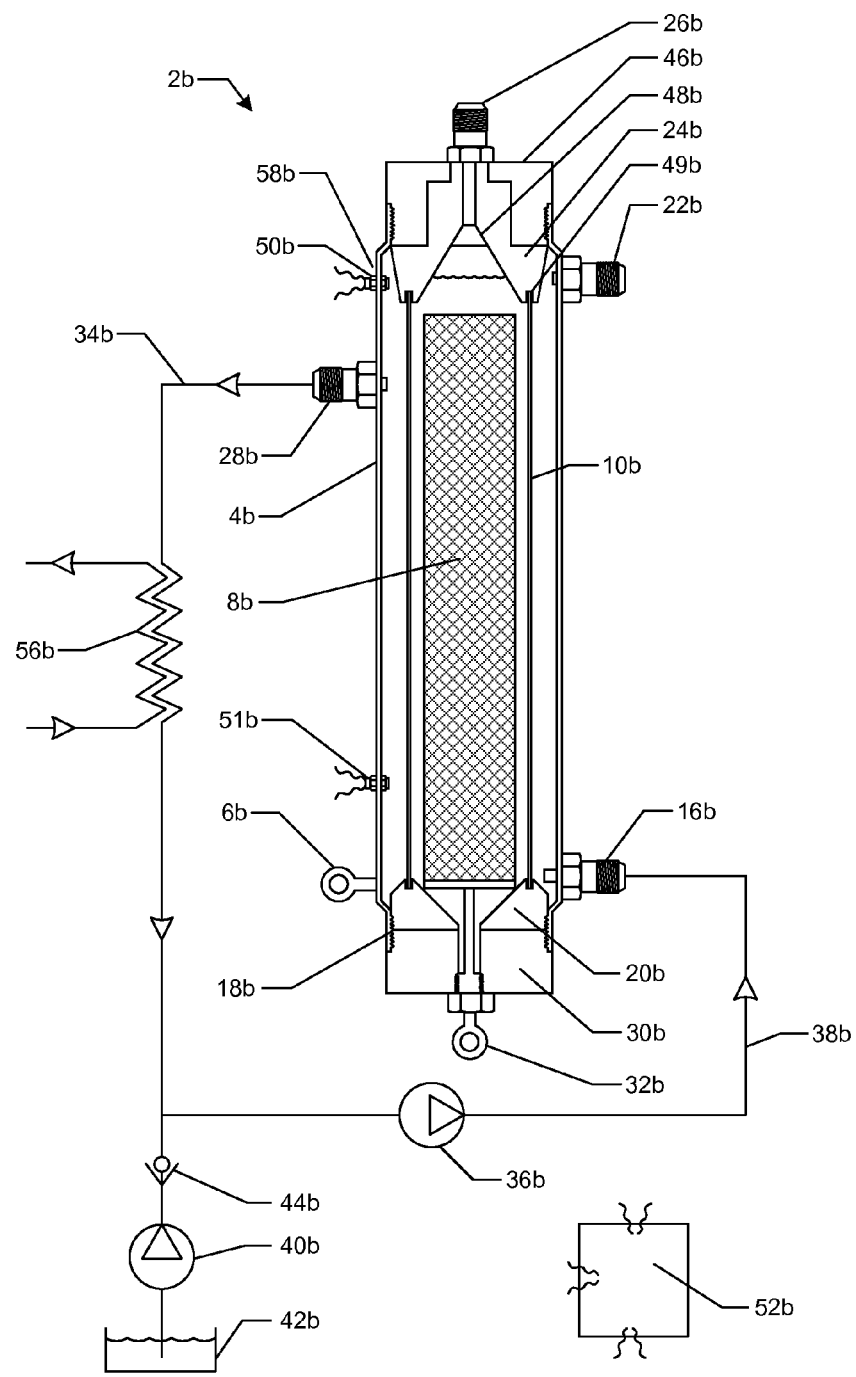
FIG. 13 shows an electrolytic cell in accordance with an embodiment of the present invention.

Referring to FIG. 13, an electrolytic cell 2b in which a container 4b such as a metallic tube serves as a containment vessel is shown. Optionally, the container 4b may also serve as an electrode as shown in FIG. 13. A porous electrode such as cylindrical conductive wire screen electrode 8b is coaxially located and separated from tubular electrode 4b by an electrolytic inventory of liquid such as an acid or base. Liquid electrolyte occupies the interior space of container 4b to the liquid-gas interface in insulator 24b. A layer of plated, plasma sprayed, or composited electrode material on a dielectric sleeve or a conductive cylindrical inner liner electrode 4b' (not shown) may be provided within container 4b to serve as an electrically separated element of the assembly to enable convenient replacement as a maintenance item or to serve as one of a number of segmented electrode elements for purposes of optional polarity, and/or in series, parallel, or series-parallel connections. In the present reversible embodiment for the electrolysis of water, electrode 8b may be considered the electron source or cathode such that hydrogen is produced at electrode 8b, and electrode 4b may be considered the anode such that oxygen is produced at electrode 4b. Container 4b may be capable of pressurization. Pressurization of the contents of container 4b is restrained by sealed caps 30b and 46b. Support, electrical insulation, and stabilization of components including electrode 8b, gas separator 10b, and electrical connection 32b are provided by dielectric insulator bodies 20b and 24b as shown. Pressurization of the electrolytic cell 2b can be accomplished by self-pressurization due the production of gas(es) during electrolysis, by an external source such as a pump or by any combination thereof.

Separator 10b is configured to be liquid permeable but to substantially prevent gas flow or transport from the cathode side of the separator to the anode side of the separator and vice versa, include substantially preventing the flow of gas dissolved in the electrolyte or after nucleation of gas bubbles. Optionally, electrode 8b may be configured to act as separator 10b such that a distinct separator is not necessary. Alternatively, separator 10b may include the electrode 8b or electrode 8b may include separator 10b. In addition, separator 10b may also include the anodic electrode 4b or anodic electrode 4b may include separator 10b.

Insulator 24b is shaped as shown and as needed to separate, collect and/or extract gases produced by electrodes such as 4b and 8b including utilization in combination with separator 10b. In the concentric cylindrical geometry shown, insulator 24b has a central conical cavity within which gases released on electrode 8b are collected. Concentrically surrounding this central cavity is an annular zone that collects the gases released from the surfaces of electrode 4b' or from the inside of container electrode 4b.

Optionally, a catalytic filter 48b may be placed in the upper collection passage of 24b as shown. Oxygen that manages to reach catalytic filter 48b including travel by crossing separator 10b can be catalytically induced to form water by reacting with hydrogen, which may then return to the electrolyte. The vast excess of hydrogen can serve as a heat sink to prohibit the heat released by this catalytic reaction from affecting the electrolytic cell. Purified hydrogen is supplied at fitting 26b as shown. Similarly it may be preferred to provide a catalytic filter 49b in the upper region of the circumferential annulus that collects oxygen as shown, for converting any hydrogen that reaches the oxygen annulus into water. Oxygen is removed at fitting 22b as shown. Alternatively, the catalytic filters may be placed at, near or inside fittings 22b and 26b.

In illustrative operation, if water is the substance to be dissociated into hydrogen and oxygen, a suitable electrolyte is prepared such as an aqueous solution of sodium bicarbonate, sodium caustic, potassium hydroxide, or sulfuric acid and is maintained at the desired level as shown by sensor 50b that detects the liquid presence and signals controller 52b to operate pump 40b to add water from a suitable source such as reservoir 42b as needed to produce or maintain the desired inventory or pressure. Controller 52b is thus responsive to temperature or pressure control sensor 58b which may be incorporated in an integrated unit with liquid level sensor 50b or, liquid inventory sensor 51b and control pumps 36b and 40b along with heat exchanger 56b which may include a circulation pump of a system such as a radiator or heater (not shown) to receive or deliver heat. Similarly, a heating or cooling fan maybe utilized in conjunction with such operations to enhance receipt or rejection of heat from sources associated with the electrolytic cell 2b.

In some embodiments where the electrolytic cell 2b is to be applied cyclically, e.g., when surplus electricity is inexpensive and not otherwise demanded, electrolytic cell 2b can be operated with considerable variation of the water inventory. At times that surplus electricity is not available or it is turned off, hydrogen and oxygen supplies may be extracted from container 4b and the system is allowed to return to ambient pressure. Ambient pressure water can then be added to fully load the system, which can be provided to have a large annular volume around the circumference of insulator 24b as may be desired to facilitate such cyclic low-pressure filling and electrolysis operations to deliver hydrogen or oxygen at the desired high pressure needed for pressure or chemical energy to work conversions, compact storage, and provide rapid transfers to vehicles, tools, or appliance receivers.

Upon application of current and generation of voluminous gaseous supplies of hydrogen and oxygen from a much smaller inventory of liquid, the system may be pressurized as desired and remains pressurized until the inventory of water in solution is depleted to the point of detection by sensors 50b or 51b which enables controller 52b to either interrupt the electrolysis cycle or to add water by pressure pump 40b from reservoir 42b as shown. It may be preferable to add water across a valve such as check valve 44b as shown to allow multiple duties or maintenance on pump 40b as needed.

Figure 14:
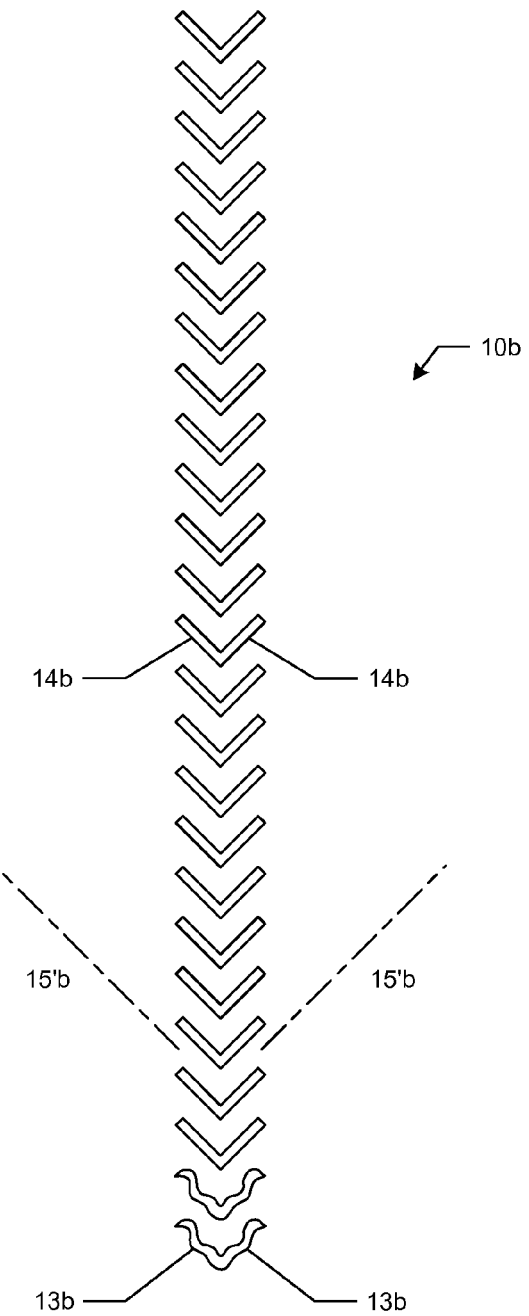
FIG. 14 shows a magnified view of a portion of the embodiment of FIG. 13.
Figure 15:
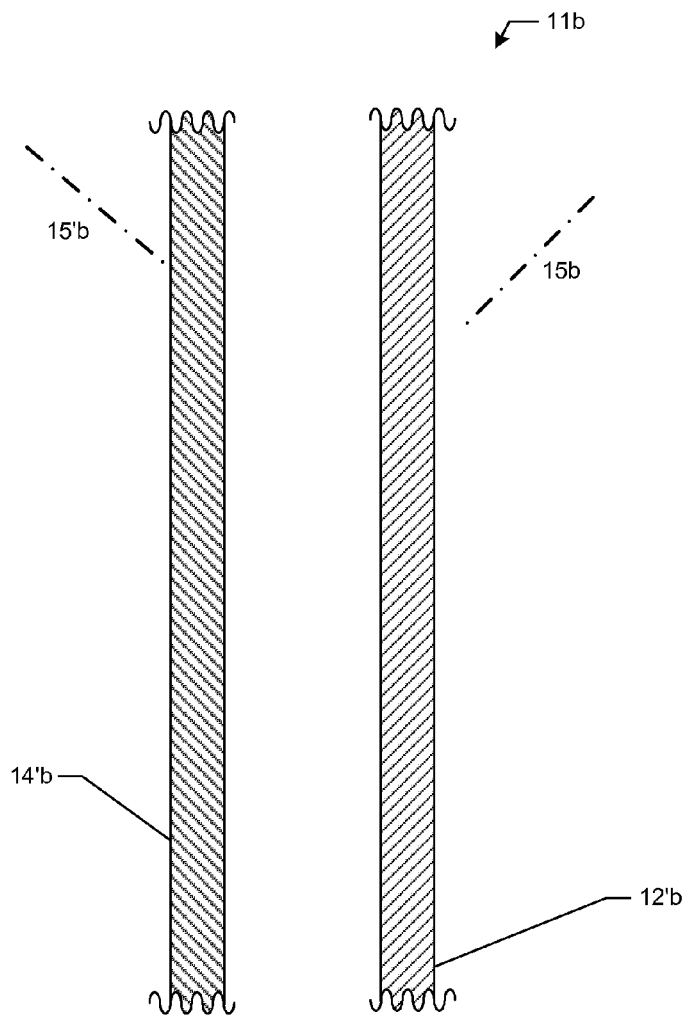
FIG. 15 shows a variation of the embodiment of FIG. 14.

Referring to FIGS. 13, 14 and 15, FIG. 14 shows one embodiment of the separator 10b of FIG. 13 in which the separator includes two inclined surfaces 14b forming a "V" shape. If the electrolyte is water based, electrons are added to porous electrode 8b such as a woven wire cylinder through connection 32b and are removed from container 4b through electrical connection 6b to continuously convert hydrogen ions into hydrogen atoms and subsequently diatomic molecules that can nucleate to form bubbles on or near electrode 8b. Hydrogen and oxygen bubbles are typically much less dense than water based electrolytes and are buoyantly propelled upward. Oxygen bubbles are similarly propelled upward and separated from hydrogen by the geometry of coaxial separator 10b as shown in the magnified section view of FIG. 14. The configuration shown in FIG. 14 may be used in any application in which the flow of gas formed during operation of the electrolytic cell 2b is desirable. Further, said separator configuration may be employed in other configurations of electrochemical cells known in the art. Alternatively, if the materials formed during electrolysis is of a higher density than the electrolyte, separator 10b may be inverted forming a "Λ" shape. Similarly if one material formed at the cathode by electrolysis is less dense than the electrolyte and another material formed at the anode is more dense that the electrolyte, separator 10b may be comprised of a slanted "/" or "\" shapes to deflect the less dense material away from the more dense material.

Mixing of hydrogen with oxygen that is released from 4b' or the inside of container 4b is prevented by a liquid-permeable barrier, separator 10b which efficiently separates gases by deflection from the surfaces 12b' and 14b which are inclined against oxygen and hydrogen entry, flow, or transmission as shown. Alternatively, separator 10b may include a helical spiral that is composed of an electrically isolated conductor or from inert dielectric material such as 30% glass filled ethylene-chlorotrifluoroethylene in which the cross section of the spiraled strip material is in a "V" configuration as shown to serve as an electrical insulator and gas separator.

Passageways for fluid travel can be increased as desired to meet fluid circulation and distribution needs by corrugating the strip occasionally or continuously particularly at each edge to produce clearance between each layer of the helix, or alternatively at the stack of formed disks that make up the section shown in FIG. 14 as a magnified corrugations as shown at 13$b$ in section view. It is generally advantageous to have each of such corrugations undulate about an appropriately inclined radial axis more or less as shown with respect to axis 15$b$ and 15$b'$. This allows the overall liquid-porous but gas-barrier wall thickness of separator 10$b$ that is formed to be a desired thickness, for example, about 0.2 mm (0.008") thick or less.

Separator 10$b$ may be of any suitable dimensions including very small dimensions and with respect to surface energy conditions sufficient to allow the liquid electrolyte to pass toward or away from electrode 8$b$ while not allowing passage of gases because of the buoyant propulsion and upward travel of the gas. An alternative embodiment applicable in, for example, relatively small fuel cells and electrolyzers, is provided by a multitude of closely-spaced flattened threads with the cross section shown in FIG. 14 in which such threads are woven or adhered to threads that provide mostly open access of liquids and are disposed in the mostly vertical direction on one or both sides of the "V" shaped threads. This allows the overall liquid-porous but gas-barrier wall thickness of separator 10$b$ that is formed to be about 0.1 mm (0.004") thick or less.

Upward buoyant propulsion deflects gas bubble collisions on the inclined surfaces 12$b$ and 14$b$. This feature overcomes the difficulties and problems of the prior art conventional approaches that cause inefficiencies due to one or more of electrical resistance, fouling, stagnation, corrosion, and polarization losses. Moreover, some configurations can promote electrolyte circulation in concentric layers due to the buoyant pumping action of rising bubbles that produces flow of electrolyte upward and, as the gas(es) escape at the top of the liquid, the relatively gas-free and denser electrolyte flows toward the bottom as it is recycled to replace the less dense electrolyte mixed with bubbles or including dissolved gas. A heat exchanger 56$b$ may be operated as needed to add or remove heat from electrolyte that is circulated from the top of container 4$b$ to the bottom as shown. Pump 36$b$ may be used as needed to increase the rate of electrolyte circulation or in conjunction with pump 40$b$ to add make up water.

In some embodiments high current densities are applied, including systems with rapid additions of organic material. In such embodiments, it may be advantageous to circulate the electrolyte with pump 36$b$ which returns relatively gas free electrolyte through fitting 28$b$ through line 34$b$ to pump 36$b$ to return to container 4$b$ through line 38$b$ and fitting 16$b$ as shown. It may be preferred to enter returning electrolyte tangentially at fitting 16$b$ to produce a swirling delivery that continues to swirl and thus synergistically enhances the separation including the action by separator 10$b$ that may be utilized as described above. Depending upon the pressure of operation, hydrogen is about fourteen times less dense and more buoyant than the oxygen and tends to be readily directed at higher upward velocity by separator 10$b$ for pressurized collection through filter 48$b$ at fitting 26$b$. At very high current densities and in instances that electrolytic cell 2$b$ is subjected to tilting or G-forces as might be encountered in transportation applications, the velocity of electrolyte travel is increased by pump 36$b$ to enhance swirl separation and thus prevents gases produced on an anode from mixing with gases produced by a cathode.

Some embodiments of non-conductive gas barrier and liquid transmitting embodiments including separator 10$b$ enable much less expensive and far more rugged and efficient reversible electrolyzers to be manufactured than previous approaches including those that depend upon proton exchange membranes to separate gases such as hydrogen and oxygen. In one aspect, separator 10$b$ can be designed to improve electrolyte flow during electrolysis. For example, separator 10$b$ can be configured to promote the spiral flow of ions in liquid electrolyte inventories traveling upward from port 16$b$ to port 28$b$. This assures that each portion of the electrodes receives freshly replenished ion densities as needed for maximum electrical efficiency. Such electrode washing action can also rapidly remove bubbles of hydrogen and oxygen as they form on the respective electrodes of the electrochemical cell.

FIG. 15 shows the edge view of representative portions of component sheets or helical strips of another aspect of separator 10$b$ for providing electrical isolation adjacent electrodes including flat plate and concentric electrode structures while achieving gas species separation as described above. In assembly 11$b$, sheets 12$b'$ and 14$b'$ form a cross section that resembles and serves functionally as that of separator 10$b$. Flat conductive or non-conductive polymer sheet 12$b'$ is prepared with multitudes of small holes on parallel centerlines that are inclined to form substantial angles such as shown by first angle 15$b$ of approximately 35° to 70° angles with the long axis of sheet 12$b'$ as shown. Polymer sheet 14$b'$ is similarly prepared with multitudes of small holes on parallel centerlines that are substantially inclined as shown by second angle 15$b'$ to form approximately 35° to 70° angles with the long axis of sheet 14$b'$ as shown.

In other embodiments the angles 15$b$ and 15$b'$ can be varied depending on the material to be separated during the electrolysis process. For example the angles could be declined, for electrolysis of compounds that have no gaseous constituent or only one gaseous constituent. If a compound such as $Al_2O_3$ is dissociated by electrolysis in cryolite-alumina electrolyte to form aluminum and oxygen, the aluminum is more dense than the cryolite-alumina electrolyte and the aluminum separating cathode electrode or associated separator would be configured (by, e.g., declined angles) to send the aluminum downward and away from the oxygen traveling upward.

Figure 16:
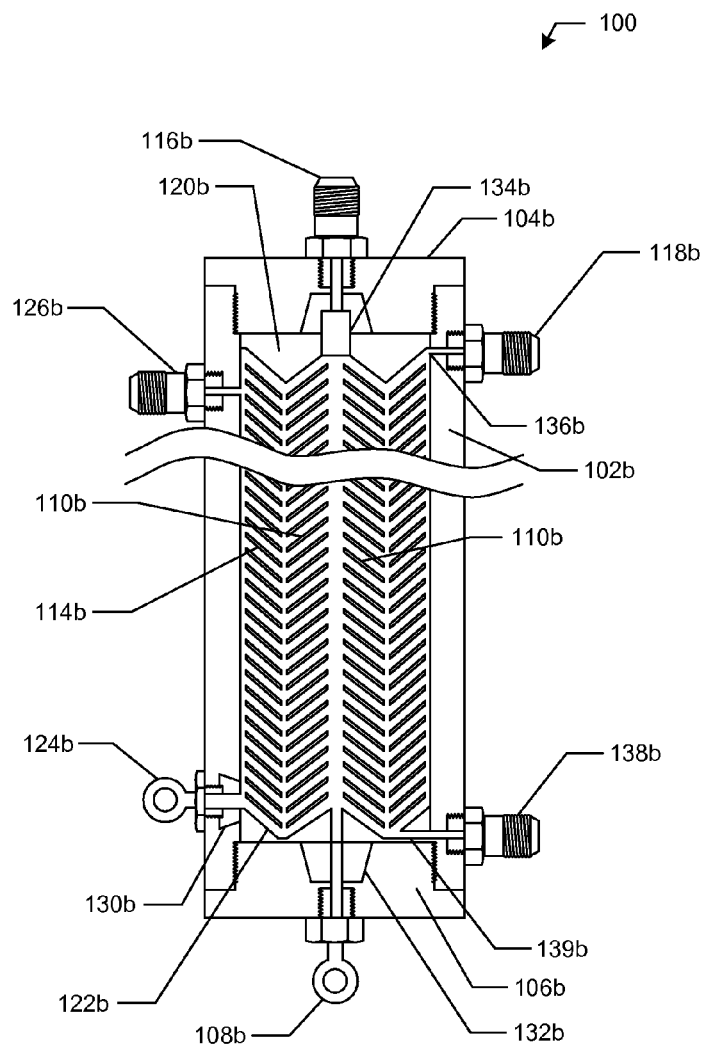
FIG. 16 shows an electrolytic cell in accordance with an embodiment of the present invention.

Multitudes of such small holes with diameters of about $\frac{1}{12}$ to $\frac{1}{3}$ of the sheet thickness dimension can readily be made in sheets 12$b'$ and 14$b'$ by suitable technologies including laser drilling, hot needle piercing, or by high-speed particle penetrations. Sheets 12$b'$ and 14$b'$ each of which are typically about 0.025 to 0.25 mm (0.001" to 0.10") thick can be held together by welding or otherwise bonding, thread ties, elastic bands, or one or more spiral wraps of conductive or nonconductive wire on the resulting outside diameter to form as an assembly with electrode 8$b$. Sheets 12$b'$ and 14$b'$ may also be joined occasionally or continuously by adhesives or by thermal or solvent fusion. Thus, where the inclined holes of sheet 12$b'$ overlap the holes of sheet 14$b'$ passageways are formed to enable liquid and/or electrolyte travel while prohibiting gas transmission through the gas barrier membrane that is formed. Referring to FIGS. 13 and 16, tubular constructions of the assembled gas barrier sheets may be formed with the appropriate diameter for embodiments 2$b$ or 100$b$ by adhering or welding the butt seam or by providing an overlapped seam that performs as the intended separation gas barrier.

For electrolysis of water, a variety of electrolytes are suitable. In one embodiment potassium hydroxide may be used with low carbon steel for the containment vessel 4$b$. Extended life with increased corrosion resistance may be provided by nickel plating cylinder 4b or by utilization of a suitable stainless steel alloy. In other aspects, increased containment capacity can be provided by overwrapping cylinder 4b with high-strength reinforcement such as glass, ceramic, or carbon filaments or a combination thereof.

Depending upon the particular application and strength requirements it may be advantageous to use about 30% glass filled ethylene chlorotrifluoro-ethylene for insulating separators 20b and 24b. Electrode 8b may be made of woven nickel or type 316 stainless steel wires. Separator 10b may be made from about 30% glass filled ethylene-chlorotrifluro-ethylene strip.

In another embodiment, it is also intended to utilize controlled applications of electricity to produce methane or hydrogen separately or in preferred mixtures from organic electrolytes. In some aspects, the embodiment can operate in conjunction with the embodiments of copending patent application including Ser. No. 09/969,860, which is incorporated herein by reference. Anaerobic digestion processes of organic materials that ordinarily produce methane can be controlled to produce an electrolyte that releases hydrogen at considerably lower voltage or by a reduced on-time of a pulse-width modulated duty cycle and resulting electricity expenditure than that required to dissociate water.

Acidity or pH of the organic solution that is produced by microbial digestion can be maintained by a natural bicarbonate buffered interaction. The bicarbonate buffer may be supplemented by co-production of carbon dioxide in the digestion process. The process may be generalized for various steps in anaerobic digestion processes of organic compounds by illustrative digestion of a simple carbohydrate or glucose that may have many competing and complementary process steps such as:

$$C_6H_{12}O_6 + (\text{Anaerobic Acid formers, Facultative bacteria}) \rightarrow CH_3COOH \quad \text{Equation 1}$$

$$CH_3COOH + NH_4HC_6O_3 \rightarrow CH_3COONH_4 + H_2O + CO_2 \quad \text{Equation 2}$$

$$3CH_3COONH_4 + 3H_2O(\text{Bacteria}) \rightarrow 3CH_4 + 3NH_4HCO_3 \quad \text{Equation 3}$$

In instances that methane from such solutions is desired, pH control near 7.0 may be needed. At ambient pressure, pH of about 7.0, and 35-37° C. (99° F.), methanogenesis is favored. Most domestic wastewater contains biowastes with both macro and micronutrients required by the organisms that provide methanogenesis. Maintaining relatively large concentrations of dissolved and distributed hydrogen or monosaccharides present in the anaerobic reactor may inhibit operations of methane-forming microorganisms.

In another aspect, increased production of fuel values from organic substances can be accomplished by application of an electric field to cause dissociation of substances such as acetic acid ($CH_3COOH$) that are produced by bacterial breakdown of glucose and other organic compounds and by other acid-production processes that yield hydrogen ions.

$$CH_3COOH \rightarrow CH_3COO^- + H^+ \quad \text{Equation 4}$$

Hydrogen ions migrate or are delivered to the negatively charged electrode and gain electrons to produce hydrogen gas.

$$2H^+ + 2e^- \rightarrow H_2 \quad \text{Equation 5}$$

Two electrons are supplied by the negatively charged electrode. At the other electrode the electrochemical reaction includes oxidation of the acetate ion to carbon dioxide and hydrogen ions as summarized in Equation 6.

$$CH_3COO^- + 2H_2O \rightarrow 2CO_2 + 7H^+ + \text{Electrons} \quad \text{Equation 6}$$

In this electrode reaction, acetate ions lose electrons, subsequently react with the water and break up into carbon dioxide gas and hydrogen ions. Carbon dioxide saturates the solution and is released from the liquid solution interface as set forth in the above embodiments. Hydrogen ions are circulated and/or migrate until electrons are received from the opposite electrode to produce hydrogen atoms and then diatomic molecules as summarized in Equation 5 for separate co-collection in such systems. Separated collection is highly advantageous, for example, separated collection to cause pressurization or at high pressure as a result of liquid pumping instead of gas compression, is especially efficient and greatly reduces the capital equipment ordinarily required to separate and then mechanically compress the hydrogen, methane or carbon dioxide produced.

Decomposition by anaerobic digestion of compounds such as acetic acid to produce hydrogen and carbon dioxide requires much less energy than electrolysis of water, because, in part, the digestion reactions yield hydrogen ions and exothermic energy. Initialization and maintenance of the exothermic decomposition of acids such as acetic acid may be accomplished at lower voltage applications or by intermittent or occasional electrolysis instead of continuous electrolysis as typically required to decompose water. The free energy of formation of water at ambient temperature is quite large (at least 1 KWH=3,412 BTU of released hydrogen) compared to the electrolysis of digester substances and acids such as urea and acetic acid to hydrogen and carbon dioxide, which requires relatively minimal activation and/or catalytic action particularly by organic catalysts. Accordingly, selected catalysts including modifications to Rancy-Nickel catalysts, nickel-tin-aluminum alloys, selections from the platinum metal group, platinum-nickel and other platinum-transition metal single crystal alloy surfaces, and various organic catalysts utilized in conjunction with the electrode systems set forth herein further improve the rate and/or efficiency of hydrogen production.

In another aspect, it may be preferred to utilize numerous cells of electrode pairs connected in switchable series or parallel or series-parallel for purposes of matching the available source amperage and voltage with the voltage required for dissociation by series connection of cells such as shown in FIG. 13. In one aspect of this embodiment, each cell may require about 0.2 to 2 volts depending upon the aqueous electrolyte chosen or biochemically produced from organic substances so a home-size 6-volt photovoltaic source could have 3 to 30 cells in series and an industrial 220-volt service may have about 100 to 1,000 electrode cells connected in series. Product gases could readily be delivered by parallel or series collection arrangements. Depending upon the desired flexibility for adjusting the number of series and/or parallel connections, support and flow control feature 18b may be by an insulating or non-insulating material selection.

At various current densities, including at medium and low current densities, it may be preferred to allow buoyant propulsion of the bubbles that are generated to accomplish circulation of the electrolyte to prevent ion depletion and stagnation problems. At start-up or higher current densities one can operate pump 36b and heat exchanger 56b to provide the desired operating temperature and presentation of ion-rich electrolyte at the electrode surfaces. This enables extremely high rates of energy conversion in which energy such as off-peak electricity available from solar, wind, falling water, or wave resources is utilized to quickly and efficiently produce high-pressure supplies of oxygen and hydrogen or hydrogen and carbon dioxide or hydrogen and methane along with carbon dioxide for separated storage and use.

In one aspect of this embodiment, the problem of regenerative braking of vehicles or power-plant spin-down in which sudden bursts of large amounts of energy must be quickly converted into chemical fuel potential is addressed. A conventional fuel cell for truck, bus, or train propulsion cannot tolerate high current densities that are suddenly applied to the fuel cell electrodes. This embodiment overcomes this limitation and provides extremely rugged tolerance of high current conditions while achieving high electrolysis efficiency without the problems of PEM degradation or electrode-interface failures that regenerative PEM fuel cells suffer. Because of the rugged construction and extremely ample opportunities for cooling that are provided, extremely high current operations are readily accommodated. Conversely, this embodiment readily starts up and operates efficiently in severe cold or hot conditions without regard for various PEM-related difficulties, limitations, and failures.

In another aspect, in order to achieve much higher return on investment in energy conversion systems such as a hydroelectric generating station, wind farm, system of wave generators, or conventional power plants, the embodiment allows off-peak electricity to be quickly and efficiently converted into hydrogen and oxygen by dissociation of water or hydrogen and carbon dioxide by dissociation of substances generated by anaerobic digestion or degradation of organic matter. A compact version of the embodiment can occupy a space no larger than a washing machine and convert off-peak electricity that might otherwise go to waste into enough hydrogen to operate two family size vehicles and provide the energy requirements of the home.

As set forth above, some embodiments provided herein provide more efficient mass transport including rapid ion replenishment processes and deliveries to desired electrodes by pumping actions of low-density gases escaping from denser liquid medium. This assures greater electrical efficiency, more rapid dissociation, and greater separation efficiency along with prevention of undesirable side reactions. Increasing the rate and efficiency of ion production and delivery to electrodes increases the system efficiency and current limit per electrode area. Applications that convert organic substances into carbon dioxide and hydrogen or methane are particularly benefited by: enhanced rates of delivery of organic substances to microorganisms that participate in the process, incubation and delivery of incubated microorganisms to extend and self-repair biofilm media, more rapid separation of produced gases and delivery of organic substances along with more efficient delivery of intermediate ions to electrodes.

Referring to FIG. 16, another embodiment, electrolytic cell 100b is shown that is particularly beneficial in applications in which it is not desired to apply voltage or to pass current through the inside walls of containment vessel 102b. The embodiment also facilitates series connections of bipolar or multiple electrode sets or cells such as 110b and 114b within the electrolytic cell 100b to simplify gas collection and voltage matching needs.

In one aspect in which that containment vessel 102b is cylindrical and the components within are concentric, electrode assemblies 110b and 114b may be formed from numerous nested truncated conical components or one or both electrodes may be formed as a helical electrode as described above. Electrodes 110b and 114b may be of the same, similar or different configurations. In another aspect, electrode 114b may be assembled from nested truncated conical sections or it may be a spiral electrode that continuously encircles electrode 110b.

Figure 17:
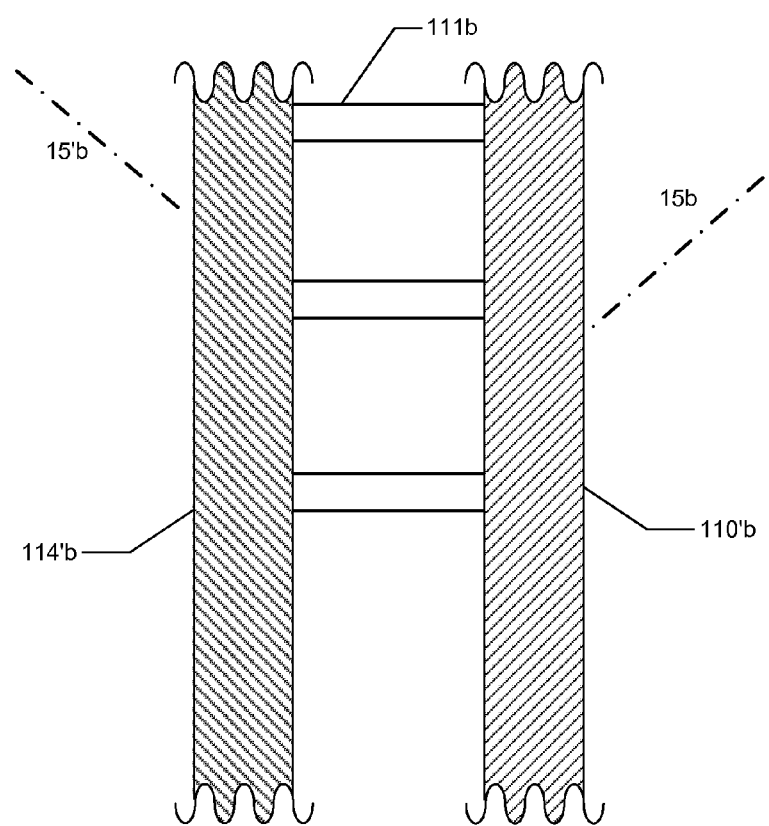
FIG. 17 shows a magnified view of an alternative embodiment for a portion of the electrolytic cell of FIG. 16.

Electrical separation of electrodes 110b and 114b to prevent short circuits may be accomplished by various means including by controlled tolerances for the operating dimensions and/or by the use of dielectric threads or filaments placed between electrodes 110b and 114b and/or by another form of separator 10b or 111b as disclosed regarding FIGS. 14 and 17.

The electrolytic cell 100b may be pressurized. Pressure containment is provided by upper and lower caps 104b and 106b as shown. Insulators 120b and 122b are supported by caps 104b and 106b as shown. The circuit components and hardware for electrical and fluid connections are illustrative and can be accomplished by penetrations through caps 104b and 106b as needed to meet specific application needs.

In the current embodiment, both electrodes 110b and 114b are formed to have inclined surfaces that direct the substance produced such as gas released to respective collection zones as shown. Illustratively, if water is to be dissociated from a suitable electrolyte, electrode 110b may receive electrons that are supplied through connection 108b, which is sealed in cap 106b by plug seal 132b. Electrons are thus taken from electrode 114b through plug seal 130b, which provides insulation of contact 124b as a gas such as carbon dioxide or oxygen is released on electrode 114b.

Such gases are thus propelled by buoyant forces and travel more or less upward as delivered by electrode 114b and along the inside wall of container 102b. Hydrogen is propelled upward as delivered by electrode 110b and within the center core formed by numerous turns or conical layers of electrode 110b and collected as shown at insulator 120b. Purified hydrogen at design pressure is delivered by pressure fitting 116b. Catalytic filter 134b may be used to convert any oxidant such as oxygen that reaches the central core to form water. A similar catalytic filter material may be used to produce water from any hydrogen that reaches the outer collection annulus in insulator 120b as shown. Pressurized filtered oxygen is delivered by pressure fitting 118b.

Optionally, to improve the efficiency of the electrolytic cell 100b, one or more gas collection vessels (not shown) may be in fluid communication with electrolytic cell 100b to collect gas formed during electrolysis. The gas collection vessel can be implemented to capture the gas at an elevated pressure prior to substantial expansion of the gas. The gas collection vessel can be further configured to capture work as the gas expands according to methods known in the art. Alternatively, the gas collection vessel can be configured to provide gas at pressure for storage, transport or use wherein the gas is desired to be delivered at an elevated pressure. It is further contemplated that said aspect can be implemented in various electrochemical cells.

Referring to FIG. 14, in another aspect, a gas expander may be included at, near or inside fitting 22b, fitting 26b or in a gas collection vessel in fluid communication with fitting 22b or fitting 26b. Similarly, referring to FIG. 16, a gas expander may be included at, near or inside fitting 116b, 118b or in a gas collection vessel in fluid communication with fitting 116b or fitting 118b.

In another aspect, a method and apparatus for electrolysis to pressurize a fluid coupled with a device to extract work from such pressurized fluid is provided. The fluid may be pressurized liquid, liquid-absorbed gas, vapor or gas. Conversion of pressurized fluid to vapor or gas may occur in or after fitting 116b and a device to convert the pressure and flow from such fittings could be selected from a group including a turbine, generator, vane motor, or various piston motors or an engine that breathes air and injects pressurized hydrogen from 116b. Similarly conversion of pressurized fluid to vapor or gas could be in or after fitting 118*b* and a device to convert the pressure and flow from such fittings could be selected from a group including a turbine, generator, vane motor, or various piston motors or an engine that expands and/or combusts pressurized fluid such as oxygen from 118*b*.

In another aspect, an apparatus and method to overcome the high cost and power losses of a transformer and rectifier circuit is provided. This is accomplished by adjusted matching of load voltage with source voltage by series connection of electrode cells or electrodes within a cell, such as connecting the negative polarity of a DC source to the lowest three turns of electrode 110*b* to the next three turns of electrode 114*b* to the next three turns of electrode 110*b* to the next three turns of electrode 114*b* and to the next three turns of electrode 110*b* et seq. and starting from the opposite (highest) end to connect the positive lead from the DC source to three turns of electrode 114*b* to the next three turns of electrode 110*b* to the next three turns of electrode 114*b* to the next three turns of electrode 110*b* to the next three turns of electrode 114*b* et seq. Turns and/or stacks of truncated cones may be adjusted to develop the area needed to match the source amperage.

In another aspect of this embodiment, in addition to providing separation of the gases produced by electrolysis, the pumping action developed by some embodiments of the invention provide for delivery of nutrients to microorganisms that, depending upon the relative scale of operations, are hosted in suitable media such as carbon cloth, activated carbon granules, expanded silica, graphite felt, coal, charcoal, fruit pits, wood chips, shredded paper, saw dust, and/or mixtures of such selections that are generally located within portions of electrode 110*b* and/or between portions of electrode 114*b* and container 102*b*. Corresponding functions and benefits include thermal stabilization of the system, circulation of feedstocks and removal of products such as carbon dioxide and production of hydrogen from acids that may be produced by the incubation, nutrition, and growth of such microorganisms.

At low and medium current densities, buoyant forces induced by low density solutions and bubbles can circulate the electrolyte within container 102*b*. At higher current densities it is advantageous to adaptively control temperature, pressure, and circulation of the electrolyte as previously disclosed. External circulation of electrolyte may be from fitting 126*b* to fitting 138*b* as shown and includes situations in which one or numerous electrode cells connected in optional series and/or series-parallel circuits are contained within container 102*b*.

In another aspect, the embodiment can be optimized for high current densities to deliver commensurately higher electrolyte fluid flow rates through one or more holes or grooves 139*b*, which direct fluid at a tangent to the annular space between electrodes 110*b* and 114*b*. Electrolyte flows upward along the helical spaces formed by the electrodes and is replenished by electrolyte entering helical paths provided by 110*b* and 114*b* from the annular space between 110*b* and 114*b*. The angular momentum of the electrolyte entering the space between electrodes 110*b* and 114*b* increases the impetus of bubble lift pumping by electrolytic products such as hydrogen and oxygen respectively produced on electrodes 110*b* and 114*b* and adds to such momentum.

This circulation of electrolyte is highly beneficial for purposes of assuring rapid replacement of ions that become hydrogen and oxygen atoms or other gases such as carbon dioxide upon charge exchanges to and from electrodes 110*b* and 114*b* and for removing such gases for collection and removal with minimum electrical polarization loss during electrolysis. Thus very high current densities are readily accepted to efficiently electrolyze the circulated fluid. In another aspect, further accommodation of high current densities is provided by the vast cooling capacity of the design resulting from improved electrolyte circulation, which prevents harmful stagnation of products of electrolysis and/or phase changes such as steam nucleation, and reduction of effective electrode areas.

In another aspect, electrodes 110*b* and 114*b* may constitute spring forms that can be advantageously operated at a resonant frequency or perturbed by various inducements including piezoelectric drivers, rotating eccentrics, and the action of bubble formation and the acceleration thrust by less-dense mixtures of electrolyte and bubbles as higher density electrolyte inventories are delivered to the surfaces of electrodes 110*b* and 114*b* by the pumping action that results. In response to perturbation, electrodes 110*b* and 114*b* vibrate at natural or induced frequencies to further enhance dislodgement of bubbles from surfaces including nucleation sites and thus enable higher current densities and greater energy-conversion efficiency.

Induced vibration of helical spring-form electrodes such as 110*b* and 114*b* can also cause peristaltic mechanical action to enhance bubble acceleration toward the respective collection paths and exit ports of electrolytic cell 100*b*. During this vibration, cyclic increases and decreases of the average distance and angle between adjacent layers of electrode turns produce fixed or traveling nodes depending upon the magnitude and frequency of the inducement(s).

FIG. 17 shows a representative section view of a set of electrodes 110*b*' and 114*b*' for operation in conjunction with an electrically insulative spacer 111*b* between 110*b*' and 114*b*' including selections such as insulator 10*b* shown in FIG. 14 that includes a helical flow delivery configuration for various applications or electrolytes. The assembly of concentric electrode 110*b*', spacer 111*b*, and electrode 114*b*' provides a very rugged, self-reinforcing system for enabling efficient dissociation of fluids such as water, liquors from anaerobic digesters, or seawater with improved efficiency and resistance to fouling. Electrodes 110*b*' and 114*b*' may be constructed from conductive carbon papers, cloth, or felt; woven or felt carbon and metal filaments, graphite granules sandwiched between woven carbon or metal filaments; or metal-plated polymers or metallic sheet stocks such as mild steel, nickel plated steel, or stainless steel that are drilled more or less as previously disclosed with multitudes of holes on parallel centerlines that are inclined as shown for respective separations of hydrogen from co-produced gases such as oxygen, chlorine, or carbon dioxide depending upon the chemical make up of the electrolyte.

In instances that electrode 110*b*', spacer 111*b*, and electrode 114*b*' are utilized in concentric electrode deployments such as shown in FIG. 16, hydrogen is delivered to port 116*b* and depending upon the substance undergoing dissociation, products such as oxygen, chlorine or carbon dioxide delivery is provided at port 118*b*. In some instances it is preferred to provide the multitude of holes in 110*b*' and 114*b*' such that each hole is slightly tapered from the hole diameter on surface contacting spacer 111*b* to a larger diameter at the exit surface away from spacer 111*b*.

It is preferred to select the helical pitch, width between electrodes, and thickness of the strip comprising spacer 111*b* for delivery of electrolyte from 138*b* to and through electrodes 110*b*' and 114*b*' to fitting 126*b* at rates that are commensurate with the electrical power available and the system heat transfer requirements to optimize the resulting width space between electrodes. This results in abundant deliveries of ions for electrolysis processes at electrodes 110*b*' and 114*b*' while assuring separation of hydrogen to the zone within electrode 110b' and delivery of co-produced gases such as oxygen, carbon dioxide, or chlorine to the space outside of electrode 114b'.

In another aspect, it is possible to operate the system regeneratively by providing gas flow grooves in the hydrogen electrode and gas flow grooves in the oxygen electrode along with appropriate fittings for adding hydrogen to the bottom of the hydrogen electrode and oxygen at the bottom of the oxygen electrode. In this case it may be advantageous to utilize concentric spiral electrodes particularly in small fuel cells where a single canister assembly meets energy needs.

Figure 18:
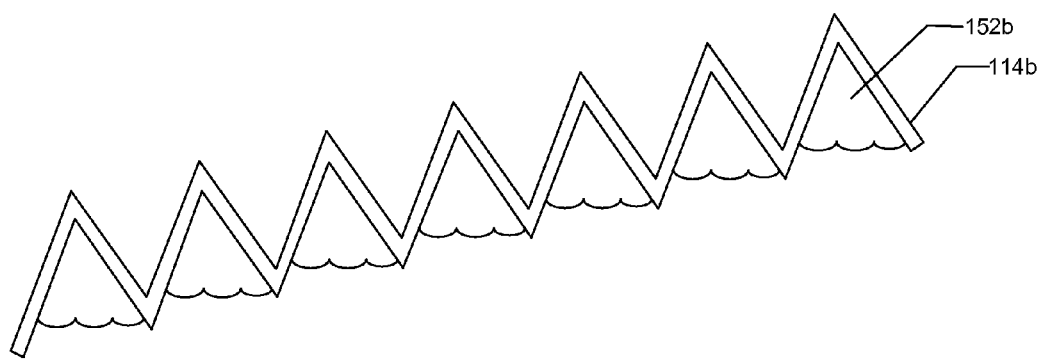
FIG. 18 shows a cross-section of a spiral electrode for use in a reversible fuel-cell.

Referring to FIG. 18, a cross-section of a spiral electrode(s) for use in instances that reversible fuel-cell operation is shown. This provides improvement of the surface to volume ratio, section modulus, and column stability of electrode 114b or of a similar helical version of electrode 110b. Electrode 114b is illustrated in the section with gas 152b flowing along spiral grooves formed by corrugating the strip stock that is used to form the spiral and provide delivery of oxygen for fuel-cell operation and in electrolysis operation to deliver oxygen to annulus 136b and fitting 118b. The same configuration works well for electrode 110b in fuel-cell and electrolysis modes for conversion of organic acids into carbon dioxide and hydrogen and in the electrolysis mode and assures plentiful gas delivery to the desired collection or source ports as previously described.

In another aspect, improved electrode performance is provided by facilitating the growth and maintenance of microorganisms that convert aqueous derivatives of organic substances such as carbonic, acetic, butyric and lactic acids along with compounds such as urea into hydrogen. On the electrode chosen for production of hydrogen ions and/or the release of carbon dioxide, increased microbe productivity is facilitated by preparing such electrode surfaces with topographical enhancements that increase the effective surface area including high aspect ratio filaments or whiskers that reduce electrical resistance to the substrate electrode and help hold microbes and biofilm in place along with the desired film substances provided by digestive processes.

Without being limited by theory, it is believed that the specific features of the electrode and/or separator, such as the topographical treatments or enhancement, promote turbulence, including cavitation or super cavitation, of the electrolyte at a desired location which in turn promotes nucleation at the location. Conversely, the specific configuration of the electrode and/or separator can inhibit turbulence, including cavitation or super cavitation at a desired location, for example, the point of electron transfer, which in turn inhibits nucleation at that location. It is contemplated that elements including these features can be implemented at any location in the electrolytic cell at which nucleation is desired. Moreover these same features and principles can be applied to a gas collection vessel or similar in fluid communication with the electrolytic cell, or to fluid communication with passages or valves there between.

Suitable filaments and or whiskers include metals or doped semiconductors such as carbon, silicon or nano-diameter filaments of carbon or boron nitride to provide increased surface area, reduce ion-transport and ohmic loses, increased microbe productivity and more effective nucleation activation for more efficient carbon dioxide release. Such filaments may also be utilized to anchor graphite granules that further improve microbe productivity, enhanced efficiency of enzyme and catalyst utilization, and related beneficial hydrogen ion production processes. Similarly, at the electrode where hydrogen ions are provided with electrons to produce hydrogen atoms and nucleate bubbles of diatomic hydrogen, filaments and whiskers may be utilized to increase the active area and reduce the voltage required for the overall process.

In addition to carbon whiskers, filaments grown from metals such as tin, zinc, nickel, and refractory metals deposited from vapor or grown from plating on suitable substrates such as iron alloy electrodes, have been found to provide reduced electrical resistance and improved process efficiency. Such filaments or whiskers may be made more suitable for biofilm support and process enhancement by addition of conducive surfactants and or surface plating with suitable substances such as carbon, boron nitride, or silicon carbide deposited by sputtering or from decomposition of a substance such as a carbon donor from illustrative precursors such as acetylene, benzene, or paraffinic gases including methane, ethane, propane, and butane.

The embodiment of FIG. 16 and variation thereof can provide advantageous separation of low density gaseous derivatives of fluid dissociation including hydrogen separation from organic liquors as summarized in Equations 1-6 to deliver hydrogen or selections of hydrogen-enriched mixtures to port 116b while carbon dioxide or carbon dioxide enriched mixtures including fixed nitrogen components are delivered to port 118b. In some applications it may be desirable to reverse the polarity of these electrodes to reverse the delivery ports for gases that are separated. Such reversals may be long term or intermittent to accomplish various purposes. Depending upon selections of helical pitch(es) of electrodes 110b and 114b and each electrode's resonant or imposed frequency of vibration, and the relative fluid velocity at each electrode, hydrogen may be delivered to port 116b but the system may be operated to include methane and carbon dioxide. However, carbon dioxide delivered to port 118b may include methane and other gases of greater density than hydrogen. In applications that it is desired to provide Hy-Boost mixtures of hydrogen and methane to enable unthrottled operation of internal combustion engines, various burners, furnaces or fuel cells, the embodiment of FIG. 16 operating with hydraulic and electrical circuit control provisions such as provided by pump 36b and controller 52b, facilitates the option of producing and separating desired fuel mixtures with controlled ratios of hydrogen and methane for delivery at port 116b.

An unexpected but particularly beneficial arrangement for production of vigorous anaerobic colonies of microbes that produce the desired conversion of organic feedstocks to hydrogen and/or methane is provided by adding media such as colloidal carbon, carbon filaments including nanostructures, exfoliated carbon crystals, graphene platelets, activated carbon, zeolites, ceramics and or boron nitride granules to the electrochemical cell. Such media may be doped or compounded with various agents to provide enhanced catalytic productivity. Illustratively, desirable functionality may be provided by doping with selected agents having electron structures more or less like boron, nitrogen, manganese, sulfur, arsenic, selenium, silicon, tellurium, and or phosphorous. Circulation induced by the gases released by the electrolysis process can promote sorting of such media into advantageous locations and densities for more efficient charge current utilization.

Without being limited to a particular theory, it is hypothesized that such synergistic results relate to increased surface areas in critical locations and development of stringers, regions, or filaments that enhance nucleation processes and or conduct electrons or hydrogen ions along with advantageous adsorption of enzymes, hydrogen, methane or carbon dioxide in biofilms and reaction zones that result. It is also indicated that microbes are incubated for circulation to efficiently utilized locations in the operations performed and flow paths produced in various embodiments disclosed herein.

In addition to whiskers and filaments such as carbon, graphite, various metal carbides, and silicon carbide and other inorganic substances and particles that catalytically enhance performance, it is beneficial to utilize activated substances and particles that present desired nutrients or catalysts to assist microbial processes. Illustratively, porous and/or exfoliated substrates of polymers, ceramics or activated carbon may adsorb conductive organic catalysts such as co-tetramethoxyphenylporphirine (CoTMPP) or poly(3,4-ethylenedioxythiophene) (PEDOT) and or favorably orient and present other catalytic substances including enzymes and graft polymers that may also be utilized to incorporate and present catalytic substances including additional enzymes.

Suitable substances or graft polymers may include those of conventional, dendrimers, fiberforms, and other organic functional materials to minimize or replace platinum and other expensive catalysts and conductors. Such replacement substances and their utilization includes mixtures or staged locations with respect to the fluid circulation resulting from some embodiments disclosed herein. Variously specialized conductive and or catalytic structures include acicular deposits and fibers that may be grown or attached to the electrodes 4b, 8b, 110b, or 114b and/or to overlaid carbon felts or woven structures or dispersed into developing biofilms. Illustratively, conductive and/or catalytic functionalities may be provided by filaments that retain and present hydrogenase and other enzymes, CoTMPP and or other catalysts such as poly (3,4-ethylenedioxythiophene) (PEDOT) as fibers that are synthesized from aqueous surfactant solutions as self-organized thin-diameter, nanofibers with an aspect ratio of more than 100 and provide low resistance to charge conductivity. Synthesis in aqueous solutions including anionic surfactant sodium dodecyl sulfate (SDS) can be adapted to produce various configurations by changing the concentrations of SDS and furthermore by adding $FeCl_3$ to produce polymerized structures. (An exemplary procedure is described in Moon Gyu Han et al., Facile Synthesis of Poly (3,4-ethylenedioxythiophene) (PEDOT) Nanofibers from an Aqueous Surfactant Solution, Small 2, No. 10, 1164-69 (2006), incorporated herein by reference.) Other examples include functional catalysts and micro-conductors in the form of nanocomposites derived from cellulose nanofibers and semiconducting conjugated polymers including polyaniline (PANI) and a poly (p-phenylene ethynylene) (PPE) derivative with quaternary ammonium side chains. Cellulose, carbon, or ceramic whiskers with anionic surface charges can be combined with positively charged conjugated polymers to form stable dispersions that can be solution cast from polar solvents such as formic acid.

Preparations include graft polymers and end caps of organometallic alkoxides, metal alkyls and application of the catalytic benefits of acetic acid and a polymeric catalyst containing COOH end group. Special function and bifunctional end groups along with mixtures of end groups may be chosen to produce multi-functional characteristics including catalytic functions, reactive stabilizers, grafting agents, and promoters of dispersion polymerization. Similarly, specialized activation of carbon or other substrates by hydrogen and or enzymes produced by anaerobic microorganisms provides a locally hydrogen-rich environment to enhance or depress methane production and enhance additional hydrogen production from various organic substances.

Referring to FIGS. 13-15, optionally it may be advantageous to provide one or more supplemental felts and or woven screens of carbon filaments to the outside and inside surfaces of cylindrical components 8b, 10b, 11b, 110b, and/or 114b. Such supplemental felts and or woven screens may commensurately collect or distribute electrons in conjunction with electrodes 4b, 8b, 110b, and or 114b and or separators 10b or 11b and help anchor or preferentially locate granules, filaments, and or other structures to reduce pressure losses or more equally distribute liquor flows and facilitate microbial functions in the desired energy conversion operations.

Among the complementary and competing reactions and processes to provide net production of hydrogen and carbon dioxide are various steps of processes summarized in Equation 8.

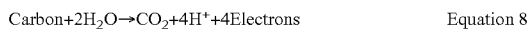

$$Carbon + 2H_2O \rightarrow CO_2 + 4H^+ + 4Electrons \qquad \text{Equation 8}$$

Carbon is consumed as summarized in Equation 8 including carbon that may be supplied as a constituent or a carbonaceous substance mixed with liquor from an anaerobic digester or electrolyzer or as a result of various manufacturing outcomes. Illustratively, carbon may include scrap from grinding, machining, electro-discharge-machining (EDM), and various thermochemical operations to produce electrodes, electrode coatings on electrodes including tank liners, or particles, or filaments, or flocculants, or selected carbides by thermal dissociation and reaction processes, including colloidal or other suspensions as an outcome of various degrees of dehydrogenization of organic substances.

Such carbon and/or carbon-donor feedstocks may be renewably supplied by bacteria, phytoplankton, or larger algae that receive carbon dioxide and other nutrients from the liquor supplied or by circulation of carbon dioxide to hydroponic and or soil-supported plants. It is advantageous to utilize such forms of carbon with high surface to volume ratios and to provide a voltage gradient to zones where they are delivered for the purpose of driving the reaction indicated and for delivering hydrogen ions to electrode surfaces including complementary conductive media such as filaments and conductive filter substances for production, nucleation, and release of hydrogen bubbles to increase the overall rate of hydrogen production.

Suitable provisions for increasing active surfaces and or flocculants include those with organic constituents such as bacteria, proteins, simple and complex sugars, cellulose, thermally dissociated cellulose, live and dissociated phytoplankton along with various forms of colloidal carbons, activated carbons, and carbides. Illustratively, phytoplankton and or larger algae may be grown, dried, mixed with a binder such as corn syrup, thermally dehydrogenated to various extents and milled to provide finely divided flocculants. Alternatively, activated carbon feedstocks may be milled to provide finely divided particles that are utilized as enzyme receivers or flocculent media or it may be used in conjunction with the previously disclosed substances to enhance the desired production or efficiency of enzymes, to support incubation of desired microorganisms, or to increase hydrogen or methane production and or consumption of carbon to produce hydrogen ions for electrolysis as indicated by Equation 8.

If needed, occasional use of salt water or additions of small amounts of salt to water-based electrolytes can produce chlorine to quickly disinfect or to prevent harmful fouling of the electrolyzer systems shown. Utilization of some embodiments, for example FIG. 17, enables the resulting system to be inherently free of harmful fouling even when utilizing electrolytes such as wastewater, commercial process water, wood-ash water, sea water, fly-ash water, canal and ditch water, or anaerobic digester liquor. Further, such systems can be quickly cleaned if needed by backflow of electrolyte or cleaning water from fitting 118b to 138b to dislodge particles that may have been delivered to the electrodes.

Applications of some embodiments include large community waste disposal operations to nano-size electrolyzers, include improvements to conventional waste digesters from which solutions or "liquor" containing organic substances is supplied for production of hydrogen and/or methane and or carbon dioxide and other plant nutrients. In this capacity some embodiments can provide rapid and efficient conversion of byproducts produced by anaerobic digesters and convert hydrogen ions into hydrogen and overcome acid degradation of the methane production operations. In operation, liquor from an anaerobic digester is utilized to produce hydrogen and carbon dioxide to provide beneficial restoration and or maintenance of pH near 7.0 instead of more acidic conditions that may stymie methane production systems. This enables increased overall energy conversion efficiency as it overcomes the requirement for expensive provisions for addition of chemical agents to adjust the pH in digesters. In such medium and large applications it is beneficial to design and engineer multifunctional components including electron distribution circuits that may also provide desired retention of granules such as carbon, boron nitride, zeolites, polymers, and ceramics including such substances in variously activated conditions for enhanced performance.

In another aspect, an electrolyzer such as disclosed herein may be applied to provide rapid conversion of acids that are typically produced by anaerobic digestion including applications with municipal waste water and landfills along with wastes form slaughter houses, dairies, egg farms, and other animal feeding centers or similar. Production of methane is slowed or inhibited if acids that are produced by anaerobic conditions cause the pH to fall much below 7. Such acids can form if the feed rate of organic material exceeds the capacity of the methanogenic colony of microorganisms. By extracting hydrogen from such acids the rate of organic material processing by anaerobic digestion can be increased. The combination of methane and hydrogen provides much greater net energy production per ton of wastes, and the wastes are processed faster to increase the capacity of the process.

A particularly useful embodiment of the some embodiments is in waste-to-energy applications that utilize organic substances such as sewage along with hydrolyzed garbage, farm wastes, and forest slash in the anaerobic electro-digestion process summarized in Equations 1-6 to produce hydrogen with minimal or no oxygen production. The rugged configuration and recirculation operations enable great tolerance for dissolved solids including organic solids and particles in anaerobic process liquors that are utilized as electrolytes. Production of hydrogen without commensurate release of oxygen as would be released by electrolysis of water facilitates higher efficiency and safety for utilization of the waste-sourced hydrogen as a cooling gas in electrical equipment such as an electricity generator.

Figure 19:
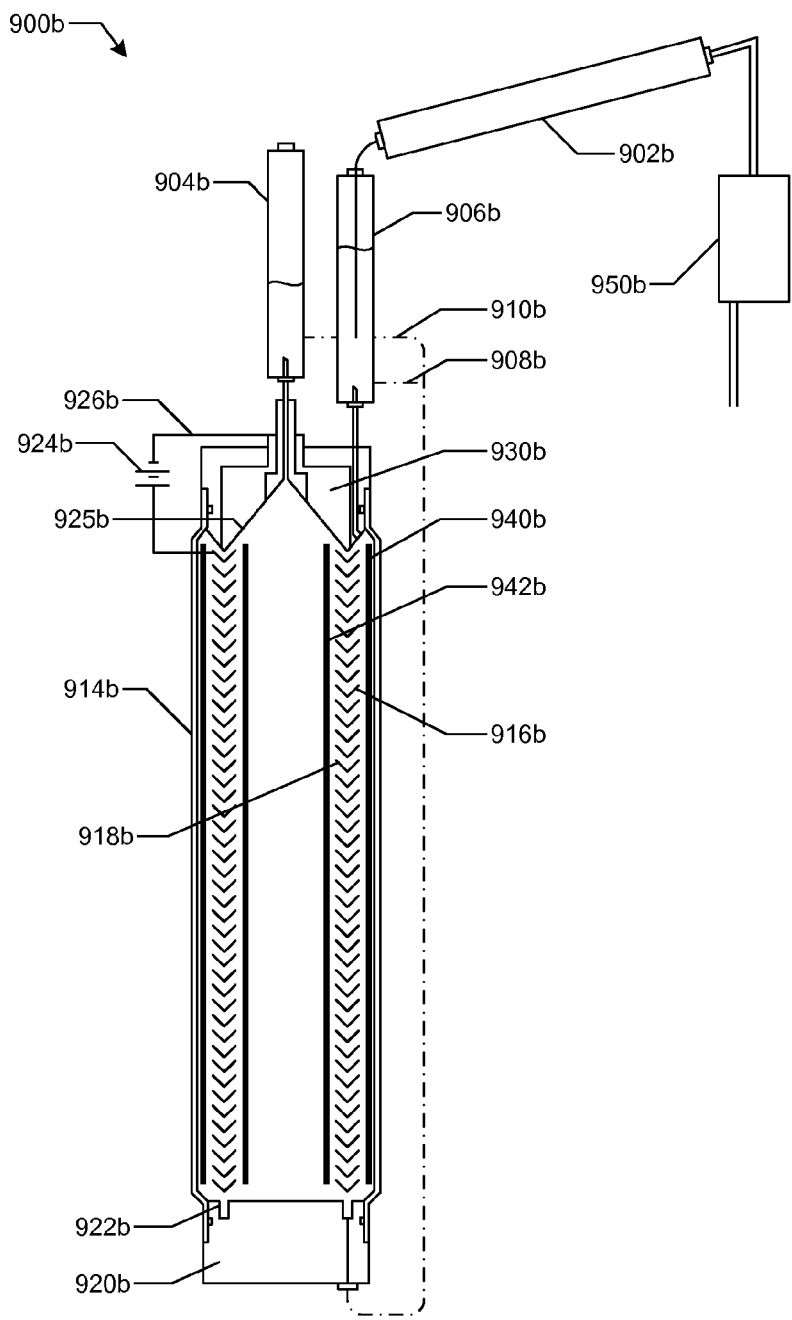
FIG. 19 shows a system for converting organic feedstocks such as those produced by photosynthesis into methane, hydrogen, and or carbon dioxide.

In another application of some embodiments disclosed herein, electrolyzer system 900b as shown in FIG. 19 provides for tissue and/or cellular disruption of biomass by enzyme, mechanical, thermal, acoustic, electrical, pressure and/or chemical actions and processes in conditioner 950b to enable faster or more complete processing, digestion and/or support of incubator purposes. Fluid including such disrupted cells from conditioner 950b and related feedstocks that are produced by converter 902b is circulated to electrolyzer 914b through annular distributor 922b of base 910b as shown. Anaerobic microorganisms are supported by media 940b and 942b and receive liquid recirculated from hydrogen separator 904b through conduit 910b and liquid recirculated from carbon dioxide separator 906b through conduit 908b as shown. Electrode 918b and/or media 942b releases hydrogen and electrode 916b and/or media 940b releases carbon dioxide. Electromotive bias is provided to electrodes 916b and 918b through circuit 926b by source 924b which may range from 0.1 to about 3 VDC depending upon the compound dissociation requirement and occasional needs for increased voltage to overcome insulating films that form. Hydrogen is ducted to collection and delivery to separator 904b by travel along the more or less conical surface 925b, which may be a conductive surface depending upon the desired series/parallel variations or contained and supported by insulator 930b as shown.

In operation, liquors are mingled in distributor annulus 922b and travel upwards to provide process reactants and nutrients to microorganisms hosted in activated carbon cloth and/or granules 940b and 942b and or conductive felts that encase and substantially retain such granules proximate to electrode 916b and or 918b. Smaller particles and filaments may be added to infiltrate locations throughout the electrolyzer system to enhance electrical charge conductivity, enzyme, and catalytic functions including those previously disclosed. Separator 902b may be a reverse osmosis membrane or a cation or anion exchange membrane or it may be constructed according to the embodiments shown in FIG. 14, 15, 16, or 17 and in some instances such separators may be used in conjunction with each other as may be desired to provide for various liquor circulation pathways and/or to produce hydrogen and carbon dioxide at different pressures or with a pressure differential between hydrogen and carbon dioxide.

Similarly, numerous circulation options are available if electrode 916b along with adjacent felt and or media 940b operate as electron sources to produce hydrogen from ions delivered from liquors that are circulated by the action of gas production lifts, convection currents, or by pump deliveries as shown. In this option, carbon dioxide is released as hydrogen ions are produced from acids delivered from 902b and 950b or that are produced by microorganisms hosted in fibrous or granular media 942b and associated felt materials that are electrically biased by electrode 918b to be opposite to electrode 916b as shown. Another exemplary option results if electrons are supplied by electrode 918b to produce hydrogen that is collected by insulator 930b for delivery to gas collector 904b as shown. In this instance electrode 916b and the media electrically associated with it are electron collectors as carbon dioxide is released to provide pumping in the fluid circuit shown as carbon dioxide is delivered past insulator 930b to collector 906b as shown.

Referring to FIG. 19, system 900b can be used for converting organic feedstocks such as those produced by photosynthesis into methane, hydrogen, and/or carbon dioxide and/or by microorganisms. Depending upon the microorganisms that are hosted, liquors that typically include acids such as acetic and butyric acids along with compounds such as urea are dissociated in electrolyzer 914b. Electrolyzer 914b provides current at sufficient voltage to produce hydrogen from such compounds and acids and may provide operation as a digester and an electrolyzer, or may be operated within an anaerobic digester (not shown) or may utilize liquors produced by anaerobic digestion in 914b as shown. Such operation is particularly useful for converting organic wastes from a community and or industrial park for purposes of supplying the community with fuel and feed stocks for manufacturing carbon enhanced durable goods.

Figure 20:
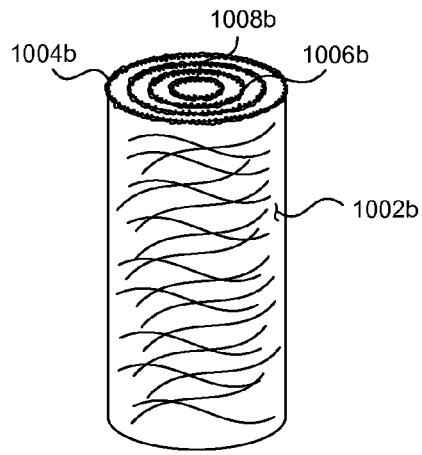
FIG. 20 shows a system for converting organic feedstocks such as those produced by photosynthesis into methane, hydrogen, and or carbon dioxide.

Referring to FIG. 20, in another aspect an arrangement of one or more electrically conductive electrodes for utilization in an electrolyzer, including those disclosed herein, is shown as including flat sheets (not shown) or concentric electrodes 1002b, 1003b, 1004b, or 1005b, as shown that may be electrically connected as mono-polar or di-polar components of an electrolyzer. Some or all of such conductive electrodes provide extensive surfaces as high surface to volume materials such as spaced graphene or layers of other thicknesses (e.g., carbon and/or BN "filters"). This serves the purpose of hosting microbes that decompose various organic materials including volatile fatty acids to release electrons and protons for production of hydrogen at cathode surfaces and can be implemented for use with any of the above embodiments.

In another aspect the essential enzymes that microbes produce to decompose volatile fatty acids and various other organic are added to activated carbon or polymer particles or filaments that are incorporated in the high surface to volume materials that comprise electrodes 1002b, 1004b, 1006b, 1008b. Alternatively, any microbe, enzyme or promoter described here can be incorporated into said surface. As such enzymes or other materials or promoters are depleted, degraded, or destroyed supplemental amounts of such enzymes, materials or promoters may be added as needed. This system allows optimization of the promoters, including allowing microbes to thrive at a location that is separated but to provide such enzymes to be utilized in the operation of the electrolyzer as shown.

In another embodiment the essential enzymes, microbes or promoters are artificially produced as duplicates or variously altered "designer enzymes" which are grafted to suitable natural polymers such as cellulose or lignocellulose or to various factory produced polymers or compounds.

In maintained enzyme systems that host live colonies of microbes, or enzymes that are transferred from live colonies of microbes, or factory duplicated or variously altered designer enzymes it is desired to minimize the electrical resistance of the electrolyte in the electrolyzer. This facilitates processes such as generally depicted in Equation 9 for acetic acid along with various acids and other substances such as urea that are consumed as hydrogen is produced at the desired elevated pressure, which again, can be implemented in any embodiment disclosed herein.

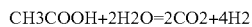

$$CH_3COOH + 2H_2O = 2CO_2 + 4H_2 \quad \text{Equation 9}$$

In another aspect systems for detection of chemically active substances and identification of the presence, capability, and viability of such substances or enzymes for the purpose of enabling an adaptive control system that adjusts the operating conditions including the amounts of chemically active nutrients and other operating conditions for purposes of optimizing the operation of maintained enzyme systems can be used with the present embodiments. Again, said systems can be implemented with any of the embodiments disclosed herein.

In other embodiments or aspects of any embodiment disclosed herein, it is desirable to operate with selected microbes and/or maintained enzymes at sufficient pressure to increase the amount of $CO_2$ that is dissolved or otherwise retained in solution for the purpose of increasing the conductivity of the electrolyte. This improves the system efficiency and operational capabilities in several ways including:

1) Hydrogen that is produced at elevated pressure can be delivered to compact, pressurized storage without incurring the capital cost, maintenance, or energy expense to operate a multistage hydrogen gas compressor.
2) Hydrogen that is produced at elevated pressure can be directly admitted into a pressurized pipeline for transmission to market.
3) Hydrogen that is produced at elevated pressure can be used to pressurize other reactants to enable or accelerate reactions. Illustratively pressurized hydrogen can be added to nitrogen in a suitable reactor to produce ammonia or other products.
4) Pressurization to prevent or minimize carbon dioxide releases on the electrode surfaces of the electrolyzer greatly simplifies the electrolyzer design.
5) Separation of hydrogen and carbon dioxide production by collection of hydrogen at elevated pressure from the pressurized electrolyzer or a suitable subsystem and collection of carbon dioxide upon depressurization at another location or by another sub-system.

Figure 21:
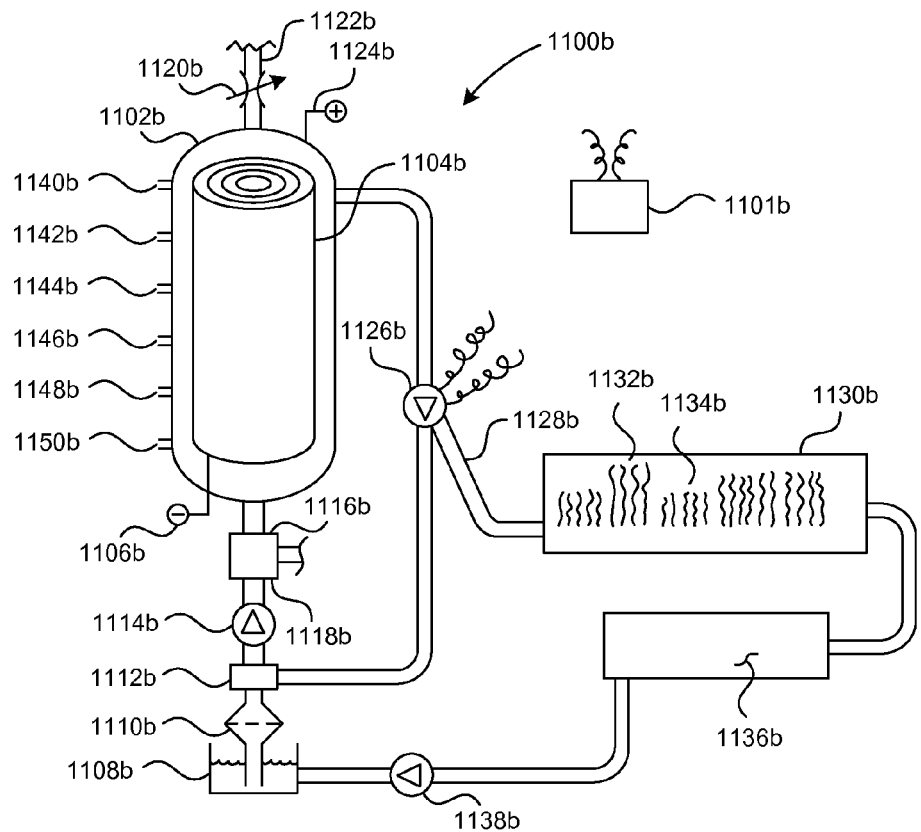
FIG. 21 shows a system for converting organic feedstocks such as those produced by photosynthesis into methane, hydrogen, and or carbon dioxide.

Referring to FIG. 21, a system 1100b is shown including elevated pressure electrolyzer 1102b, which may receive pressurized electrolyte and/or precursor fluids that form suitable electrolytes within electrolyzer 1102b from suitable pump 1114b. Pressurized hydrogen is produced as a result of the action of microbes and/or otherwise maintained enzymes on one or more electrodes depicted such as 1002b, 1004b, 1006b, 1008b etc., or 1104b along with voltage applied across taps 1106b and 1124b as shown. Elevated pressure hydrogen is delivered to a suitable application through conduit 1122b by pressure regulator 1120b.

Pressurized electrolyte containing carbon dioxide flows through fluid motor-generator 1126b to produce work by harnessing the kinetic energy of the flowing electrolyte and the expansion of carbon dioxide to ambient pressure as it is diverted to a suitable carbon dioxide use such as a hydroponic system or greenhouse 1130b for growing algae switch grass, kudzu or various other crops 1132b and/or 1134b. Electrolyte that has been depleted of carbon dioxide is recycled by pump 1114b through three way valve 1112b.

Biomass including materials grown in 1130b is ground or otherwise made into a slurry of activated substances consisting of broken cellular material that is produced by suitable mechanical, acoustic, chemical, thermal or radiation treatment in processor 1136b. Such activated organic feedstock is added to accumulator 1108b for suitable passage through filter 1110b and passage through three-way valve 1112b to pump 1114b for entry into pressure electrolyzer 1102b as shown.

Operation of system 1100b is provided by controller 1101b in response to pressure, temperature, and pH sensors 1142b, 1144b, 1146b along with chemically active agent sensors 1140b and 1150b as shown. This enables corrective substances to be added through port 1118b for purposes of providing the maintained enzyme conditions desired for optimized performance.

In another embodiment, suitable electrodes include systems that are formed from circular or other cross sections of wire such as square or rectangular or various "star" shapes or flat strip for providing plastically formed woven embodiments or helical embodiments as disclosed herein. Material selections such as iron or other transition metal based alloys are then heat treated to carburize and produce various amounts of carbon in solid solution including saturated zones that are further defined or grown by additional heat treatment to enable growth of such saturated zones particularly near the surface. The carbon zones that develop accelerate the deposition of additional carbon as a carbon donor such as a hydrocarbon or carbon monoxide is decomposed on such surfaces. Equations 10 and 11 show such overall processes of providing heat to the substrate being heat treated in an amount that is equal or greater than the heat of formation of the carbon donor:

$$CxHy + \text{Heat} \rightarrow xC + 0.5yH_2 \quad \text{Equation 10}$$

$$CO + \text{Heat} \rightarrow C + 0.5O_2 \quad \text{Equation 11}$$

In some aspects it is desirable to continue carbon deposition to produce carbon film of effectively coat the entire electrode at sufficient depth with bonding at initial saturation zones to produce a very durable composite of the desired shape and surface to volume ratio.

In another embodiment initial preparation and the orientation of the carbon rich zones that approach saturation conditions are modified by hot or cold working the embodiment to provide sufficiently uniform orientation of the carbon crystalline structure to provide a significantly epitaxially influenced deposit of the subsequent carbon deposition. The oriented carbon thus deposited such as predominantly edge exposed or as graphene layers that are more parallel to the original surface are competitively tested to provide support of the desired microbial processes. This allows "designer carbon" to be selected for each type of microbial process desired.

Figure 22:
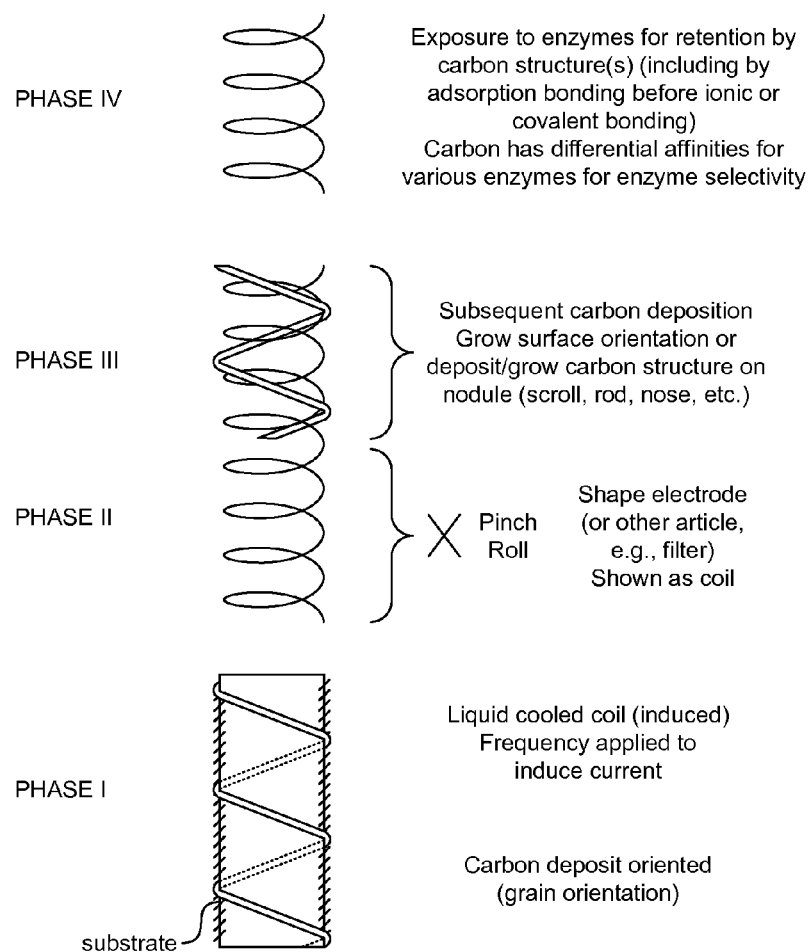
FIG. 22 shows a method for manufacturing an electrode in accordance with an embodiment of the disclosure.

Referring to FIG. 22, in another aspect, the manufacture of carbon/steel electrodes for use in the embodiments disclosed herein is disclosed. These electrodes can include surface treated carbon for attachment to selective enzymes, microbes or other promoters for improved operation of the electrolyzer. To manufacture electrodes according to this embodiment, a steel or steel alloy substrate is saturated with carbon. The grains of the saturated carbon are aligned by, for example, heat treating through induction to provide a desired grain orientation for the carbon as shown in phase I. Other known heat treating method may be employed. During this step the electrode can also be subjected to liquid cooling to prevent damage to the electrode or provide other benefits.

As shown in phase II, the electrode is then shaped through known processes, including pinch rolling. The shaping can be implemented in a manner to further align, flatten or modify the oriented carbon grains as desired.

As shown in phase III, carbon is then deposited on the electrode through known carbon deposition techniques including vapor deposition, by which the carbon is deposited or grown on the surface of the electrode. During this step the carbon can be deposited or grown in a manner to further enhance the grain orientation or selectively deposit the carbon at selected locations on the electrode depending on the desired use of the electrode. For example, the enzyme, microbe, or promoter can be deposited at one location and another enzyme, microbe or promoter can be deposited at another location for controlled use of the enzyme, microbe and promoter. In addition, the electrode with the deposited carbon can be further treated through heating by induction or other means to further align or orient the grains, and which again can include liquid cooling. This process can be repeated until the desired carbon amount and/or grain orientation and/or grain location is achieved.

As shown in Phase IV, upon completion of the surface treatment, the electrode is then exposed to one or more enzymes, microbes or promoters selected for the particular application of the electrode, for example enzymes that enhance the production of desired compounds during electrolysis such as hydrogen. In any of the above steps the method can target specific locations of the electrode. Moreover, different treatment conditions can be applied to different locations such that different enzymes can be deployed or different enzyme densities can be implemented at different locations depending on the desired configuration or use of the electrode. In this manner an electrode is manufactured to include carbon constructs having an affinity for particular enzymes, microbe or promoters, and to bond the enzymes, microbes or promoters to the electrodes at desired locations to permanently or substantially retain the enzymes at the desired locations for use during electrolysis or other operation of the electrode.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

What is claimed is:

1. A system for providing a substantially continuous energy supply using renewable energy resources comprising:
   a reactor having an inlet for receiving a feedstock, an outlet for releasing the feedstock, a reaction zone, and a conveyance apparatus that feeds the feedstock into the reaction zone;
   a first source of renewable energy imparting energy to the reaction zone, wherein the reaction zone increases the feedstock received by the reactor to one or more of a first pressure and a first temperature;
   an electrolyzer coupled to the outlet of the reactor, wherein the electrolyzer receives the feedstock from the outlet of the reactor and produce an energy carrier, the energy carrier having one or more of a second pressure that is higher than the first pressure and a second temperature that is higher than the first temperature of the feedstock, and the electrolyzer is selectably reversible as a fuel cell using the energy carrier as a fuel when operation of the electrolyzer is reversed; and
   an energy carrier storage coupled to the electrolyzer for receiving the energy carrier from the electrolyzer or providing the energy carrier to the electrolyzer.

2. The system of claim 1 wherein the first source of renewable energy is selected from the group consisting of solar, wind, moving water, organic and geothermal sources of energy.

3. The system of claim 1 wherein the energy carrier comprises hydrogen.

4. The system of claim 1 wherein the energy carrier comprises a carbon-based material.

5. The system of claim 1 where the energy carrier comprises a hydrocarbon.

6. The system of claim 1 where the energy carrier comprises a nitrogen-based material.

7. The system of claim 1 where the energy carrier comprises Ammonia.

8. The system of claim 1 wherein at least one of the first source of renewable energy, the electrolyzer or the energy carrier are configured to receive supplemental heat from a first heat source.

9. The system of claim 8 wherein the first heat source comprises the first source of renewable energy or the electrolyzer.

10. The system of claim 8 where in the first heat source is selected from the group comprising geothermal, solar, or other heat engine.

11. The system of claim 8 where the first heat source comprises a second source of renewable energy.

12. The system of claim 1 wherein the energy carrier storage is configured to transfer heat to the energy carrier.

13. The system of claim 12 wherein the energy carrier storage is configured such that an energy value of the energy carrier is increased during energy carrier storage.

14. The system of claim 13 wherein the energy carrier storage is configured such that an energy value of the energy carrier is increased during energy carrier storage by adding heat to the energy carrier during energy carrier storage.

15. The system of claim 14 wherein the energy carrier storage comprises a geological formation.

16. The system of claim 1 further comprising an expander configured to capture work from expansion of the energy carrier, wherein the expander is coupled to the electrolyzer or the energy carrier storage.

17. The system of claim 1 further comprising an expander configured to produce energy from expansion of the energy carrier, wherein the expander is coupled to the electrolyzer or the energy carrier storage.

18. The system of claim 1 further comprising a source of organic materials wherein the source of organic materials is coupled to the electrolyzer for electrolysis of the organic materials.

19. The system of claim 18 wherein the source of organic materials comprises biomass or biowaste.

20. The system of claim 1 further comprising an energy storage coupled to the first source of renewable energy and the electrolyzer.

21. The system of claim 1, wherein the conveyance apparatus is a screw conveyor, chain drive conveyor, or a reciprocating plunger.

* * * * *

UNITED STATES PATENT AND TRADEMARK OFFICE
CERTIFICATE OF CORRECTION

| | | |
|---|---|---|
| PATENT NO. | : 9,231,267 B2 | Page 1 of 3 |
| APPLICATION NO. | : 12/857541 | |
| DATED | : January 5, 2016 | |
| INVENTOR(S) | : Roy E. McAlister | |

It is certified that error appears in the above-identified patent and that said Letters Patent is hereby corrected as shown below:

On the Title page 3, in column 2, under "Other Publications", line 36, delete "Hyway."" and insert -- Highway." --, therefor.

In The Specification

In column 4, line 48, delete "and or" and insert -- and/or --, therefor.

In column 4, line 51, delete "and or" and insert -- and/or --, therefor.

In column 4, line 54, delete "and or" and insert -- and/or --, therefor.

In column 10, line 15, delete "TABLE 1" and insert -- TABLE 1A --, therefor.

In column 11, line 1, delete "TABLE 1-continued" and insert -- TABLE 1A-continued --, therefor.

In column 12, line 39, delete "and or" and insert -- and/or --, therefor.

In column 13, line 33, delete "and or" and insert -- and/or --, therefor.

In column 15, line 18, delete "and or" and insert -- and/or --, therefor.

In column 17, line 18, delete "and or" and insert -- and/or --, therefor.

In column 18, line 24, delete "and or" and insert -- and/or --, therefor.

In column 19, line 11, delete "buteric" and insert -- butyric --, therefor.

In column 19, line 29, delete "and or" and insert -- and/or --, therefor.

In column 20, line 15, delete "and or" and insert -- and/or --, therefor.

In column 20, line 27, delete "and or" and insert -- and/or --, therefor.

In column 22, line 33, delete "runoff," and insert -- runoff --, therefor.

In column 24, line 40, delete "$T_l/T_H$" and insert -- $T_L/T_H$ --, therefor.

In column 29, line 40, delete "and or" and insert -- and/or --, therefor.

In column 30, line 33, delete "and or" and insert -- and/or --, therefor.

In column 32, line 56, delete "and or" and insert -- and/or --, therefor.

In column 32, line 56, delete "and or" and insert -- and/or --, therefor.

Signed and Sealed this
Fourteenth Day of June, 2016

Michelle K. Lee
*Director of the United States Patent and Trademark Office*

CERTIFICATE OF CORRECTION (continued)
U.S. Pat. No. 9,231,267 B2

In column 33, line 24, delete "costal" and insert -- coastal --, therefor.

In column 33, line 38, delete "diachromatic" and insert -- dichromatic --, therefor.

In column 33, line 62, delete "and or" and insert -- and/or --, therefor.

In column 33, line 63, delete "caraboo" and insert -- caribou --, therefor.

In column 34, line 7, delete "and or" and insert -- and/or --, therefor.

In column 35, line 23, delete "and or" and insert -- and/or --, therefor.

In column 35, line 55, delete "and or" and insert -- and/or --, therefor.

In column 36, line 5, delete "and or" and insert -- and/or --, therefor.

In column 37, line 16, after "sustainability" insert -- . --.

In column 37, line 46, delete "and or" and insert -- and/or --, therefor.

In column 44, line 65, delete "ethylene-chlorotrifluoroethylene" and insert -- ethylene-chlorotrifluoro-ethylene --, therefor.

In column 47, line 8, delete "ethylene chlorotrifluoro-ethylene" and insert -- ethylene-chlorotrifluoro-ethylene --, therefor.

In column 47, line 11, delete "ethylene-chlorotrifluro-ethylene" and insert -- ethylene-chlorotrifluoro-ethylene --, therefor.

In column 48, line 31, delete "Rancy-Nickel" and insert -- Raney-Nickel --, therefor.

In column 53, line 57, delete "and or" and insert -- and/or --, therefor.

In column 53, line 60, delete "loses," and insert -- losses, --, therefor.

In column 54, line 11, delete "and or" and insert -- and/or --, therefor.

In column 54, line 50, delete "and or" and insert -- and/or --, therefor.

In column 54, line 56, delete "and or" and insert -- and/or --, therefor.

In column 54, line 64, delete "and or" and insert -- and/or --, therefor.

In column 55, line 11-12, delete "co-tetramethoxyphenylporphirine" and insert -- co-tetramethoxyphenylporphyrin --, therefor.

In column 55, line 13, delete "and or" and insert -- and/or --, therefor.

In column 55, line 24, delete "and or" and insert -- and/or --, therefor.

In column 55, line 30, delete "and or" and insert -- and/or --, therefor

In column 55, line 61, delete "and or" and insert -- and/or --, therefor.

In column 55, line 67, delete "and or" and insert -- and/or --, therefor.

In column 56, line 3, delete "and or" and insert -- and/or --, therefor.

In column 56, line 5, delete "and or" and insert -- and/or --, therefor.

In column 56, line 5, delete "and or" and insert -- and/or --, therefor.

In column 56, line 7, delete "and or" and insert -- and/or --, therefor.

CERTIFICATE OF CORRECTION (continued)
U.S. Pat. No. 9,231,267 B2

In column 56, line 32, delete "and or" and insert -- and/or --, therefor.

In column 56, line 41, delete "and or" and insert -- and/or --, therefor.

In column 56, line 46, delete "and or" and insert -- and/or --, therefor.

In column 56, line 56, delete "and or" and insert -- and/or --, therefor.

In column 57, line 7, delete "and or" and insert -- and/or --, therefor.

In column 57, line 14-15, delete "and or" and insert -- and/or --, therefor.

In column 58, line 16, delete "and or" and insert -- and/or --, therefor.

In column 58, line 18, delete "and or" and insert -- and/or --, therefor.

In column 58, line 24, delete "FIG." and insert -- FIGS. --, therefor.

In column 58, line 32, delete "and or" and insert -- and/or --, therefor.

In column 58, line 62, delete "and or" and insert -- and/or --, therefor.